United States Patent
Yarita et al.

(10) Patent No.: US 6,411,353 B1
(45) Date of Patent: Jun. 25, 2002

(54) LIQUID CRYSTAL DISPLAY DEVICE WITH ITS UPPER AND LOWER CASES CLAMPED BY CRIMPING PORTIONS THEREOF

(75) Inventors: Katsuhiko Yarita, Mobara; Kaoru Hasegawa, Chosei-gun; Kengo Kobayashi, Mobara; Yoshio Toriyama, Chosei-gun, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/294,346

(22) Filed: Apr. 20, 1999

(30) Foreign Application Priority Data

Apr. 22, 1998  (JP) ............................................ 10-111818

(51) Int. Cl.[7] ..................... G02F 1/1333; G02F 1/1345
(52) U.S. Cl. ............................. 349/59; 349/58; 349/150
(58) Field of Search .............................. 349/58, 62, 63, 349/67, 150, 46, 59, 61

(56) References Cited

U.S. PATENT DOCUMENTS

| | | | |
|---|---|---|---|
| 4,028,448 A | * 6/1977 | Hashimoto et al. | 264/37 |
| 4,558,346 A | * 12/1985 | Kida et al. | 357/74 |
| 4,963,815 A | * 10/1990 | Hafeman | 324/715 |
| 5,070,258 A | * 12/1991 | Izumi et al. | 307/303 |
| 5,767,569 A | * 6/1998 | Ohta et al. | 257/668 |
| 5,838,412 A | * 11/1998 | Ueda et al. | 349/150 |
| 5,998,875 A | * 12/1999 | Bodo et al. | 257/778 |
| 6,118,648 A | * 9/2000 | Kojima et al. | 361/311 |
| 6,121,613 A | * 9/2000 | Tew | 250/334 |

* cited by examiner

Primary Examiner—William L. Sikes
Assistant Examiner—Hoan Nguyen
(74) Attorney, Agent, or Firm—Antonelli, Terry, Stout & Kraus, LLP

(57) ABSTRACT

A liquid crystal display device includes a liquid crystal display element having a liquid crystal layer sandwiched between a pair of upper and lower substrates, a flexible circuit board disposed around a periphery of the liquid crystal display element, an illuminating light source having a line light source, a light guide and a reflector and disposed behind the liquid crystal display element, a metal upper case having a sidewall bent back and a display window, a resin lower case for housing the illuminating light source. The upper and lower cases are clamped by crimping plural nails formed in the sidewall of the upper case at an outer surface of the lower case after stacking the liquid crystal display element, the flexible circuit board and the illuminating light source between the upper and lower cases. An electrical connection between the upper case and a grounding pattern formed on the flexible circuit board is made by at least one component in chip form having a conductive region and being attached to a portion of the grounding pattern bent over the lower substrate, and a metal tape having one end thereof being interposed between opposing portions of the upper and lower cases which are pressed against each other and the other end thereof being positioned to be pressed against the conductive region of the at least one component.

9 Claims, 44 Drawing Sheets

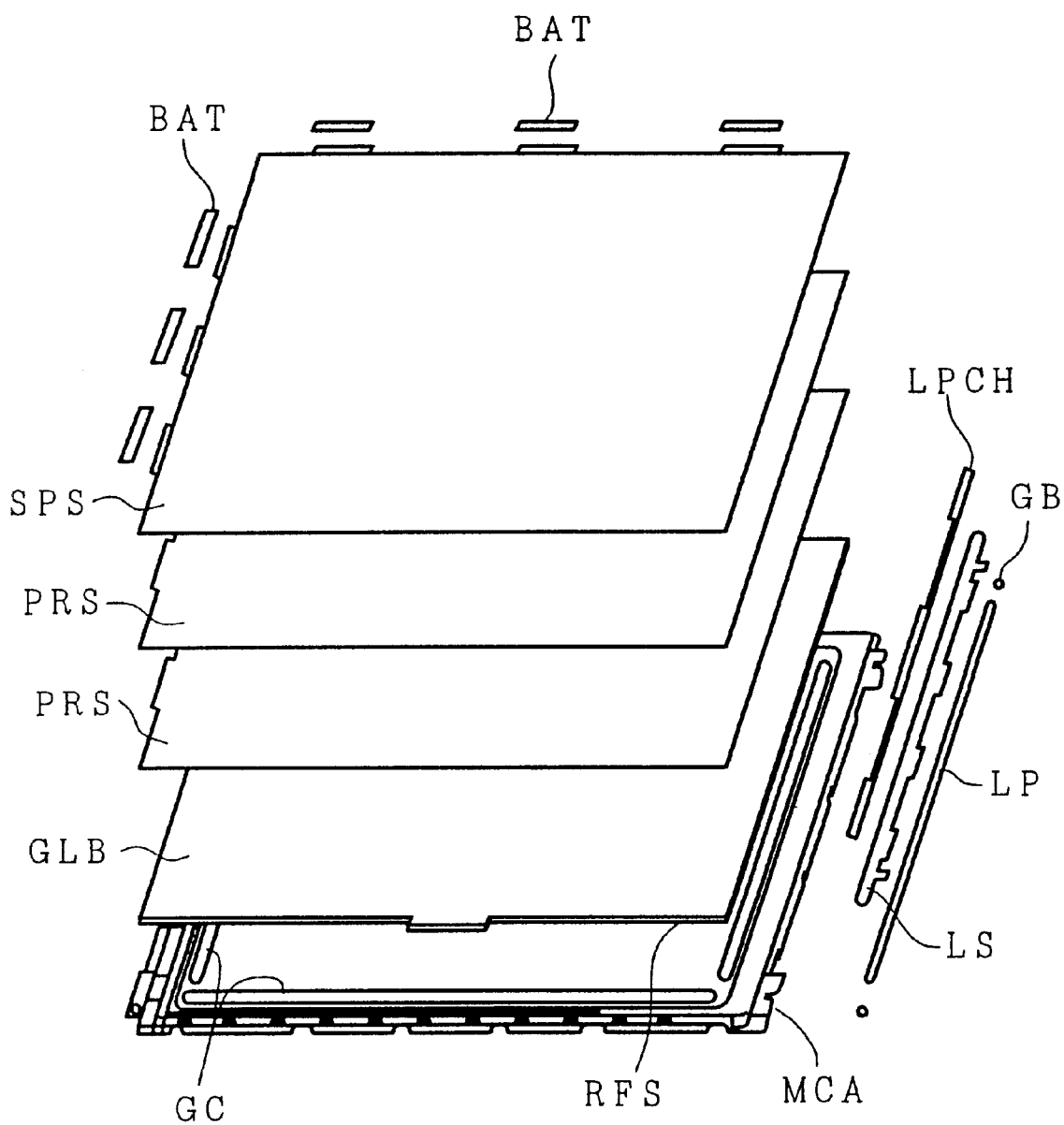

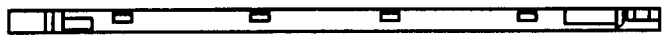
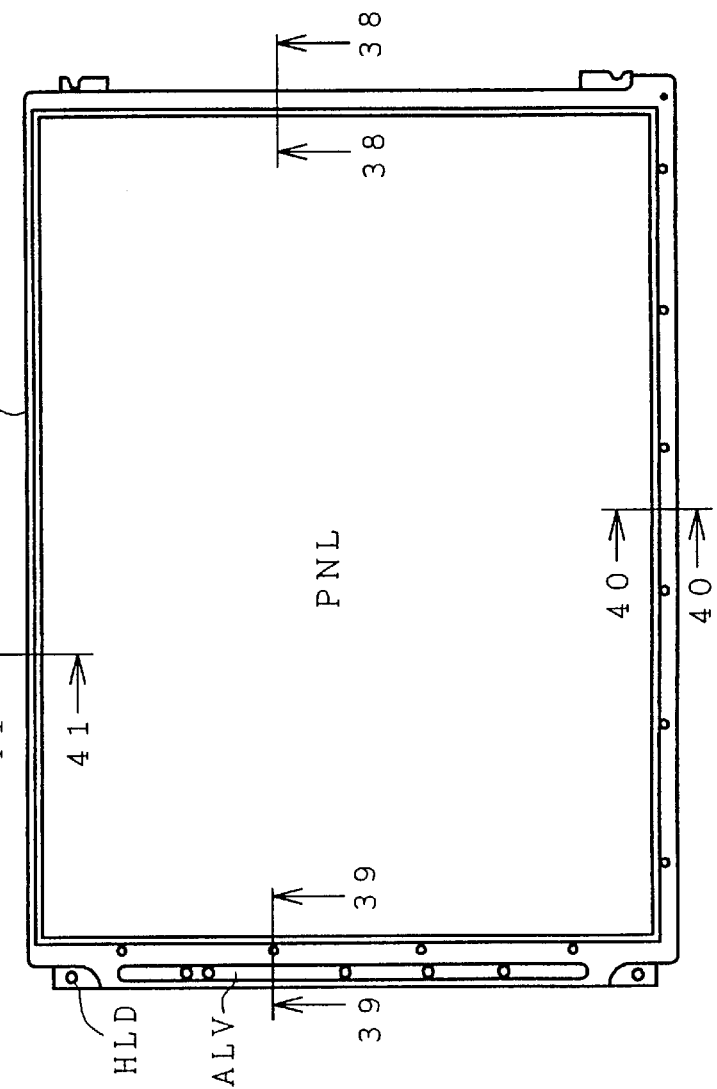

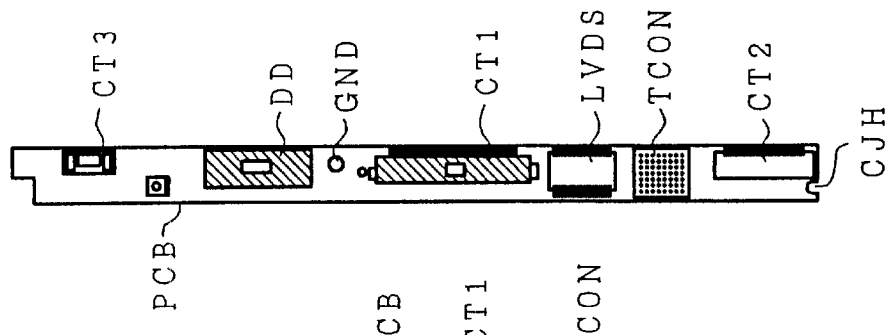
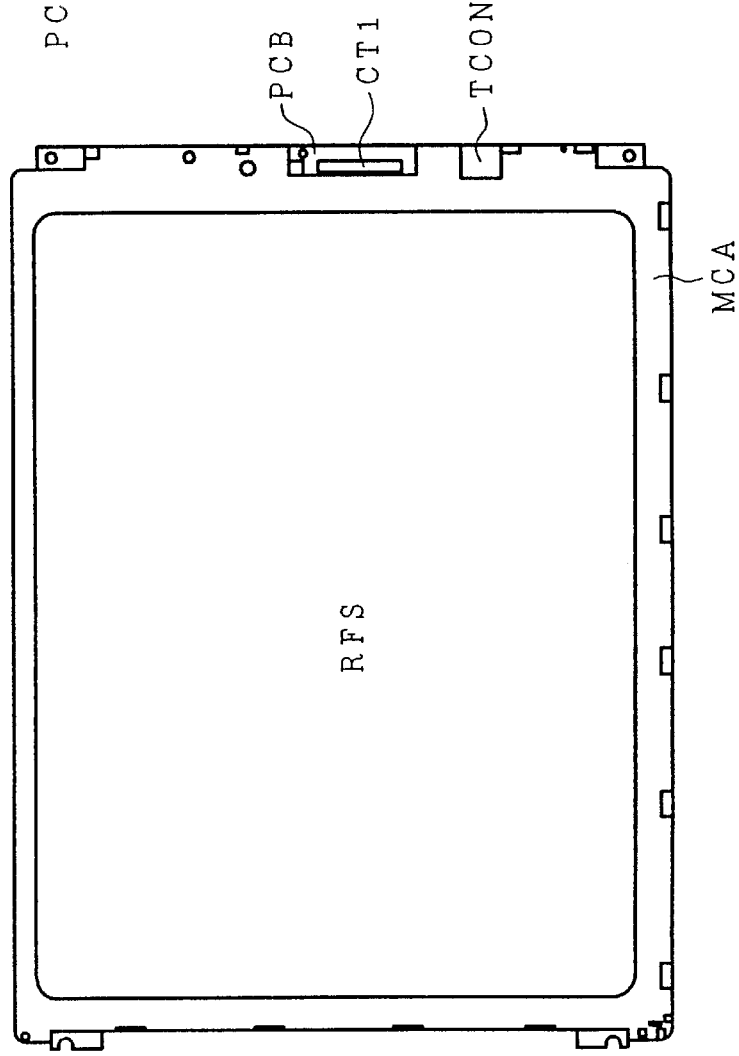

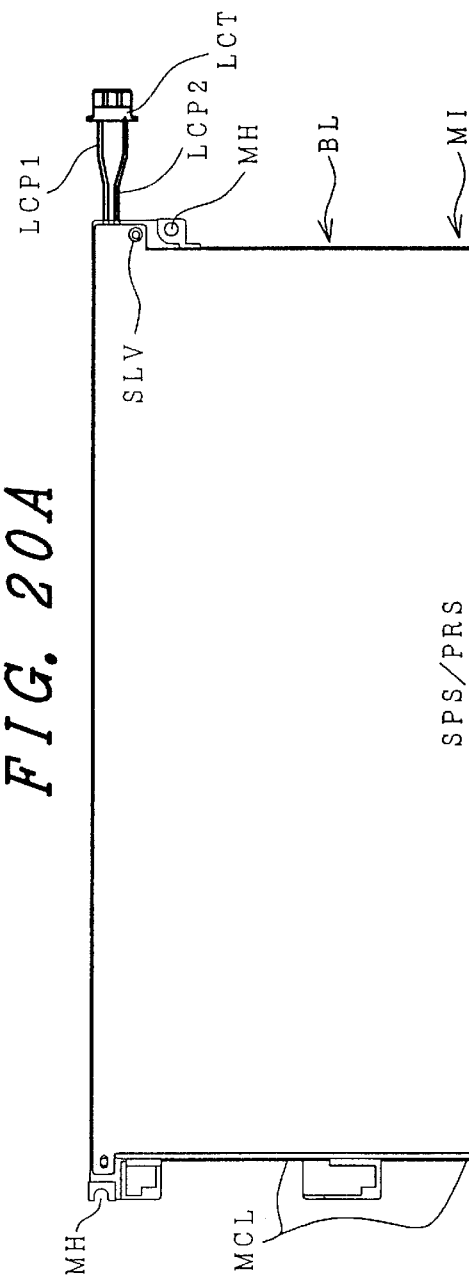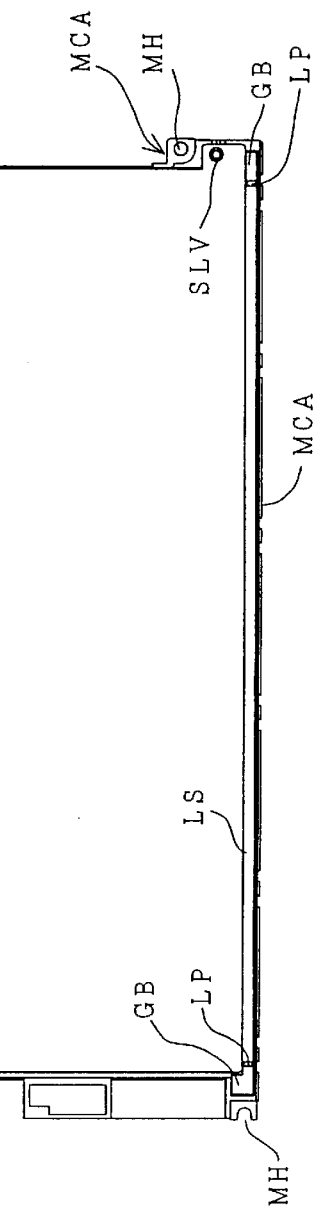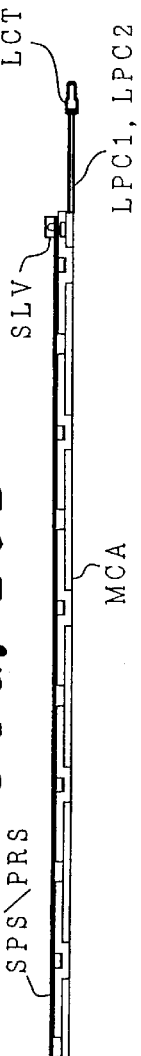
FIG. 20A
FIG. 20B

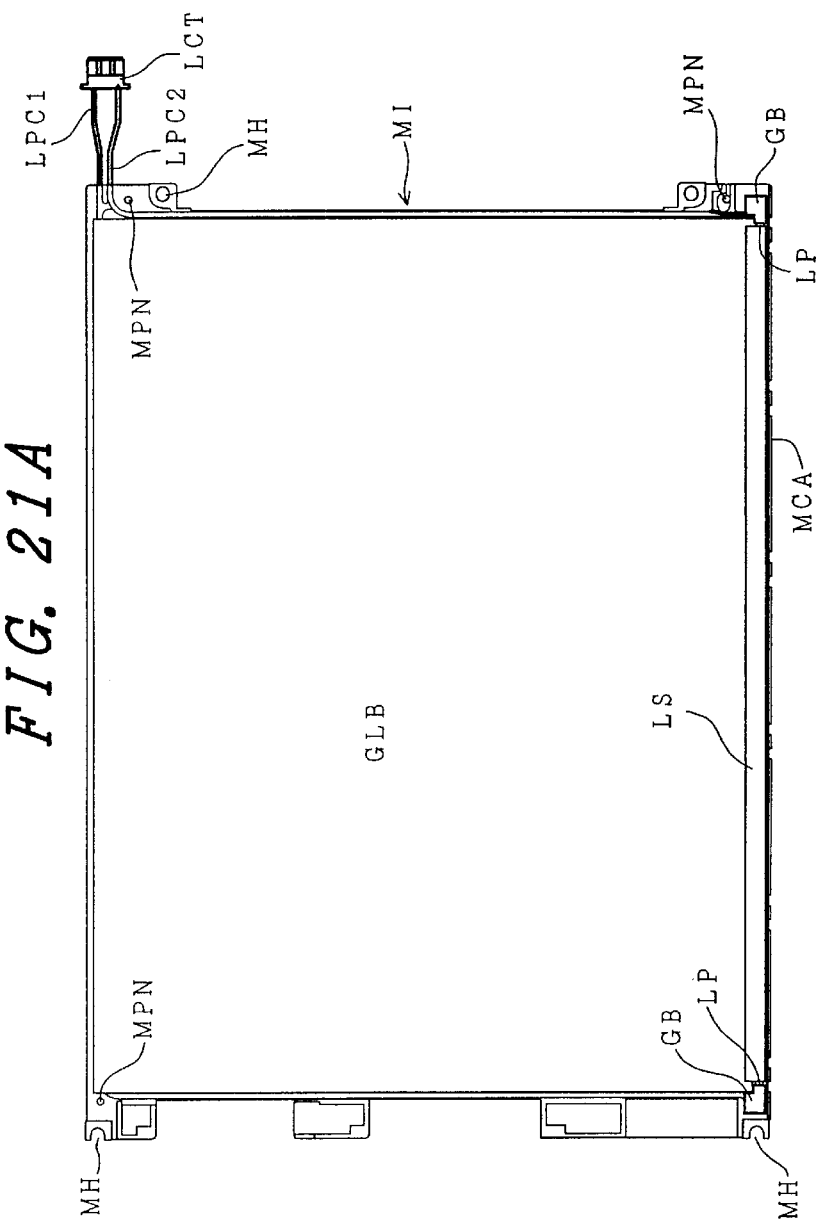
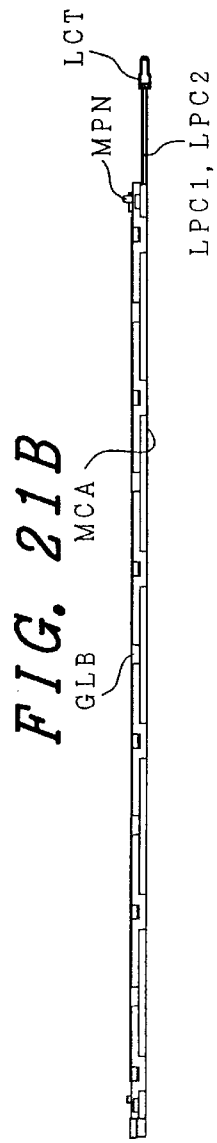
FIG. 21A
FIG. 21B

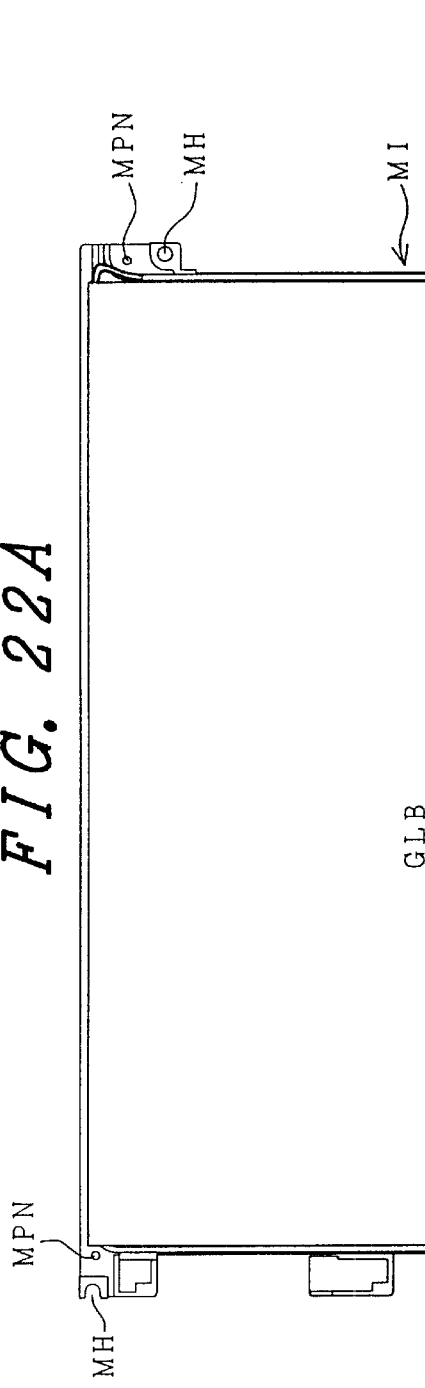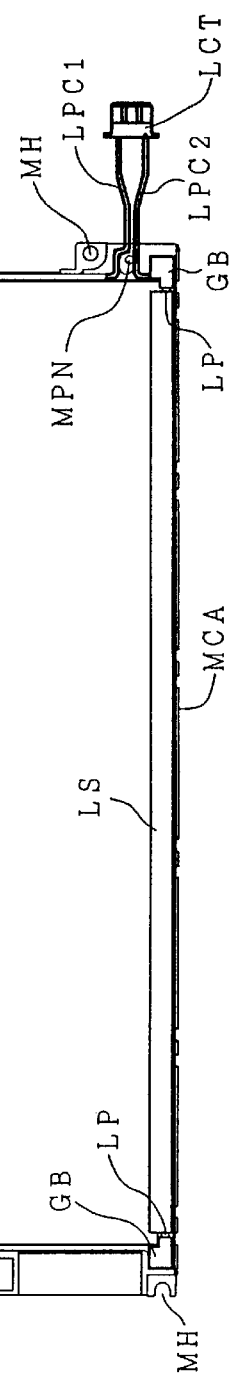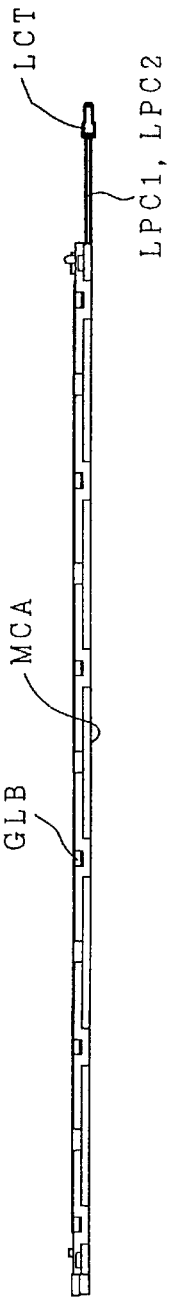

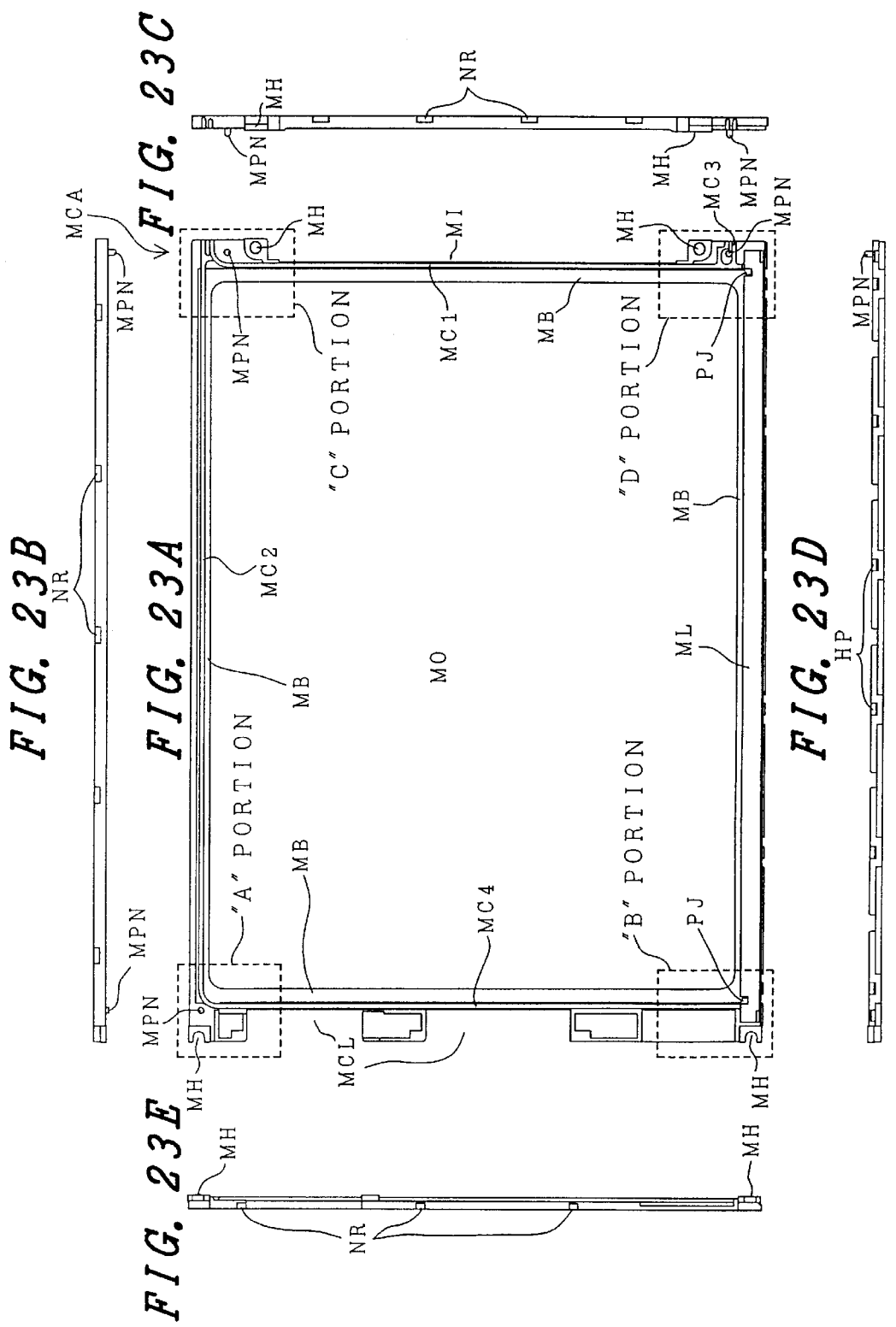

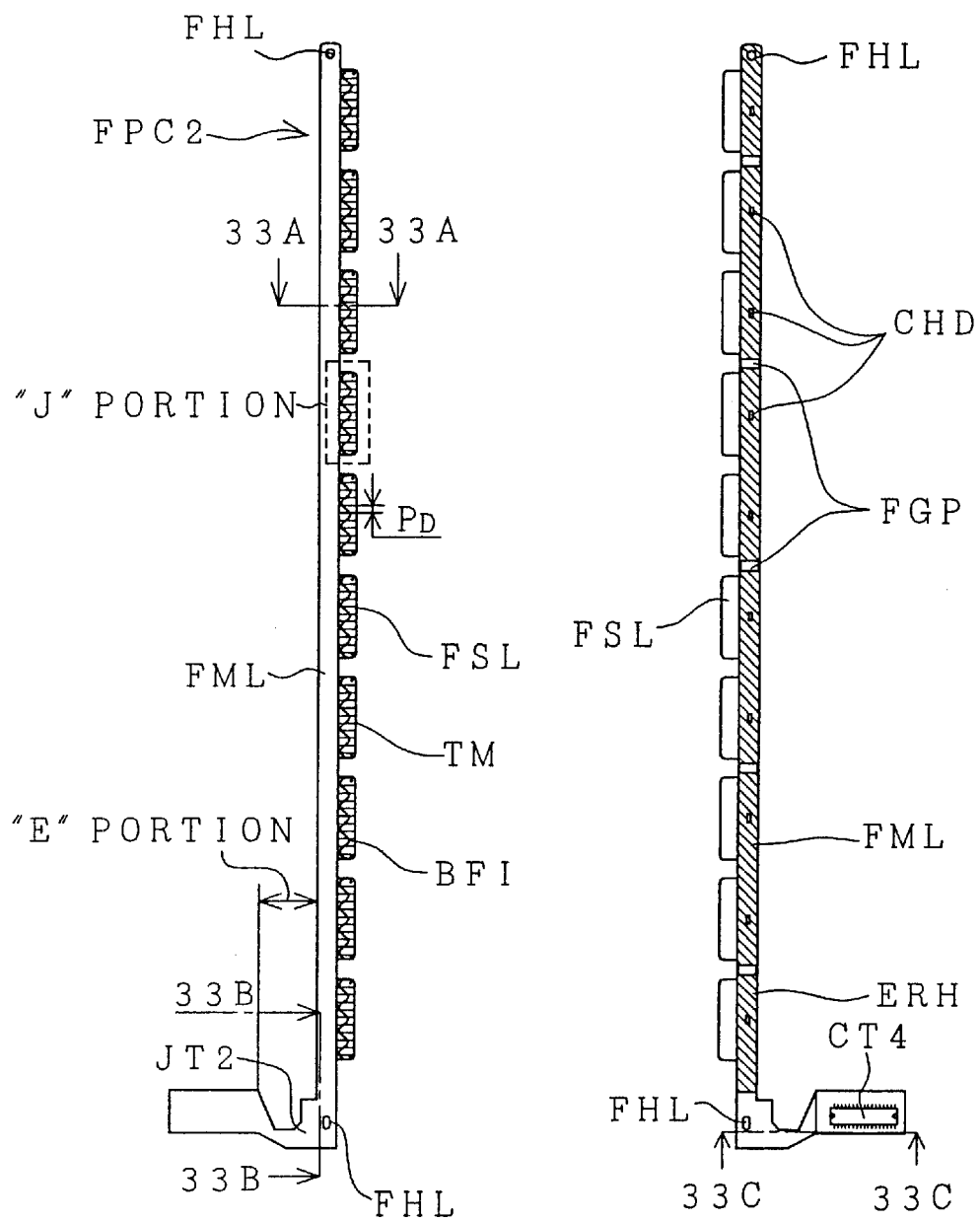

SIGNALS FROM A HOST COMPUTER

OUTPUT TO DRAIN DRIVERS

SIGNAL FROM A HOST COMPUTER

OUTPUT TO GATE DRIVERS

LIQUID CRYSTAL DISPLAY DEVICE WITH ITS UPPER AND LOWER CASES CLAMPED BY CRIMPING PORTIONS THEREOF

BACKGROUND OF THE INVENTION

The present invention relates to a liquid crystal display device (hereinafter, referred to as "LCD"), and particularly to an LCD with its upper and lower cases clamped together by crimping portions of one of the upper and lower cases at the other.

LCDs have been widely adopted as display devices capable of displaying a high-definition color image used for notebook computers and display monitors.

LCDs are of the following two types. One is a simple matrix type LCD which uses a liquid crystal panel having a liquid crystal layer sandwiched between a pair of substrates each having a plurality of electrodes parallel with each other on its inner surface with the electrodes on one of the pair of the substrates intersecting the electrodes on the other of the pair. The other is an active matrix type LCD which uses a liquid crystal panel having a switching element for selecting each of a plurality of picture elements on one of a pair of substrates sandwiching a liquid crystal layer therebetween.

The active matrix type LCD is further classified into two types: one is a so-called vertical electric field type LCD (commonly called a TN active matrix type LCD) using a liquid crystal panel in which electrodes for selecting picture elements are formed on each of a pair of upper and lower substrates; and the other is a so-called horizontal electric field type LCD (commonly called an in-plane switching (IPS) type LCD) using a liquid crystal panel in which electrodes for selecting picture elements are formed on only one of a pair of upper and lower substrates.

The liquid crystal panel of the former TN active matrix type LCD is configured such that liquid crystal molecules are aligned to twist by 90° between a pair of substrates and a pair of polarizers are attached on the outer surfaces of the upper and lower substrates of the liquid crystal panel such that their absorption axes are in a cross-Nicol arrangement and the absorption axis of the entrance-side polarizer is parallel or perpendicular to a direction of rubbing a liquid crystal molecule alignment film adjacent to the entrance-side polarizer.

In such a TN active matrix type LCD, when no voltage is applied to the liquid crystal layer, incident light is linearly polarized through the entrance-side polarizer. The linearly polarized light propagates along the twisted liquid crystal molecules of the liquid crystal layer, and if the transmission axis of the exit-side polarizer conforms to the azimuthal angle of the linearly polarized light, the linearly polarized light entirely goes out of the exit-side polarizer to form a white image (so-called normally open mode).

When a voltage is applied to the liquid crystal layer, directors of unit vectors each indicating the mean alignment direction of the molecular axis of each of liquid crystal molecules of the liquid crystal layer are made perpendicular to the substrate plane, and they conform to the absorption axis of the exit-side polarizer because the azimuthal angle of the entrance-side linearly polarized light is not changed, thereby leading to a black image (see "Basis and Application of Liquid Crystal" published by Kougyo Chousa Kai in 1991).

On the other hand, for the IPS type LCD in which electrodes for selecting picture elements and electrode lines are formed on only one of a pair of substrates and the liquid crystal layer is switched in a plane parallel to the substrate by applying a voltage between two adjacent electrodes (a picture element electrode and a counter electrode) on the substrate, the polarizers are disposed so that a black image is formed when no voltage is applied to the liquid crystal layer (so-called normally close mode).

In the IPS type LCD, molecules of the liquid crystal layer are parallel to the substrate and in a homogeneous alignment. In the case where no voltage is applied to the liquid crystal layer, directors of the liquid crystal layer in a plane parallel to the substrate are parallel to the arrangement direction of the electrodes or inclined therefrom at a small angle. On the other hand, in the case where a voltage is applied to the liquid crystal layer, the direction of the directors of the liquid crystal layer is shifted in the direction perpendicular to the arrangement direction of the electrodes along with the applied voltage to the liquid crystal layer, and when the direction of the directors of the liquid crystal layer is inclined by 45° toward the electrode lines with respect to the direction of the directors of the liquid crystal molecules in the case where no voltage is applied to the liquid crystal layer, the liquid crystal layer turns the azimuthal angle of the plane of vibration of the polarized light by 90° like a half-wave plate. At this time, since the transmission axis of the exit-side polarizer conforms to the azimuthal angle of the plane of vibration of the polarized light, the polarized light going out of the exit-side polarizer forms a white image.

The IPS type LCD is advantageous in that the hue and contrast are less changed even if the viewing angle is changed, to increase an acceptable range of viewing angles (see Japanese Patent Laid-open No. Hei 5-505247).

A color-filter method is mainly used to manufacture the above-described LCDs of a full color type. In this method, a picture element equivalent to one dot of color display is divided into three parts, and three color filters equivalent to three primary colors, that is, red (R), green (G) and blue (B) are assigned to the above three divided parts of the picture element.

The present invention can be applied to the above-described various kinds of LCDs, and hereinafter, the present invention will be briefly described by example of the TN active matrix type LCD.

As described above, in a liquid crystal display element (also called liquid crystal panel) constituting part of the TN active matrix type LCD (hereinafter, referred to simply as "active matrix LCD"), a plurality of gate lines extending in an X direction and arranged in a y direction, and drain lines insulated from the gate lines, extending in the y direction and arranged in the x direction are formed on the surface, on the liquid crystal layer side, of one of two transparent insulating substrates (made from glass or the like) oppositely disposed with a liquid crystal layer put therebetween.

Each of areas enclosed by these gate lines and drain lines constitutes a picture element area in which a thin film transistor (TFT) as a switching element and a transparent picture element electrode are formed.

When a scanning signal is supplied to the gate line, the thin film transistor is turned on, and in such a state, a video signal is supplied to the picture element electrode from the drain line via the thin film transistor thus turned on.

Not only the drain lines but also the gate lines extend to the periphery of the substrate to form external terminals, and a video driver circuit and a gate scanning driver circuit, that is, a plurality of driver ICs (semiconductor integrated circuits) constituting the video driver circuit and gate scanning driver circuit are mounted at the periphery of the substrate in such a manner as to be connected to the associated external terminals. That is to say, a plurality of tape carrier packages on each of which the driver ICs are mounted are mounted at the periphery of the substrate.

In such a substrate, however, since the TCPs on each of which the driver ICs are mounted are mounted at the periphery of the substrate, the area of a region (usually called a frame border) between the display area composed of intersections between the gate lines and drain lines of the substrate and the outer edges of the substrate becomes large, so that it becomes difficult to satisfy a requirement to reduce the outer size of the liquid crystal display module in which the liquid crystal display element is integrated with an illuminating light source (backlight) and other optical components.

To solve such a problem, that is, to satisfy the requirement against high density mounting of a liquid crystal display element and miniaturization of the outer shape of a liquid crystal display module, there has been proposed a so-called flip-chip method or chip-on-glass (COG) method in which video driver ICs and scanning driver ICs are directly mounted on a substrate without the use of the TCP parts.

A liquid crystal display device manufactured using the flip-chip method has been disclosed by the present applicant in Japanese Patent Laid-open No. Hei 6-256426.

The liquid crystal display device disclosed in the above document comprises: a liquid crystal display element (also called a liquid crystal display panel or a liquid crystal panel) comprising a pair of substrates made of glass or the like fixed to one another with a desired spacing therebetween by a sealing material disposed in a form of a frame in the vicinity of the edges of the substrates, transparent electrodes for displaying and liquid crystal molecule alignment films coated on the opposing inner surfaces of the substrates, liquid crystal material injected into a space enclosed by the substrates and the sealing material via an opening provided in the sealing material, and a pair of polarizers attached on the outer surfaces of the substrates; a backlight, disposed on the rear surface of the liquid crystal display element, for supplying light to the liquid crystal display element; a liquid crystal driver circuit board disposed around the outer edges of the liquid crystal display element; a molded lower case for housing and holding the backlight; and a metal shield case (also called an upper case or upper frame), having a display window, for housing the above components.

The backlight comprises an approximately rectangular light guide, formed of a synthetic resin plate, for example, a transparent acrylic resin plate, for directing the light from the light source away from the light source and uniformly illuminating the entire liquid crystal display element from the rear surface thereof with the light; a line light source (a fluorescent lamp such as a cold cathode fluorescent lamp) disposed in the vicinity of at least one end surface (one side surface) of the light guide in such a manner as to extend in parallel to the end surface of the light guide; a light reflector, formed into an approximately U-shape in cross-section and having an inner surface taken as a reflection surface, for covering the fluorescent lamp substantially over the overall length thereof; a light-diffusing sheet disposed on the light guide, having an upper surface taken as a prismatic surface formed by a large number of long prisms having a triangular cross section and arranged parallel with each other and having a lower surface taken as a smoothing surface, for controlling the angles at which the light from the backlight and which are otherwise varied in a wide range, within a specified range and diffusing the light emerged from the light guide; a prismatic sheet for improving the luminance of the backlight; and a reflecting sheet, disposed under the light guide, for reflecting the light emerged from the light guide toward the liquid crystal display element.

In the prior art LCD, a flexible circuit board provided at a peripheral portion on the rear surface of the liquid crystal display element is electrically connected to an upper case as a metal frame by soldering, with a spring metal piece interposed between the inner surface of the upper case and the circuit board.

However, with the advance of the reduction of the frame border area, there occurs a problem that it is difficult to carry out the soldering using such a metal piece, particularly, for the flexible circuit board for drain drive.

According to the prior art LCD, to suppress the positional offset between the liquid crystal display element and light guide and ensure the resistance to shock, the light guide is elastically fixed to the liquid crystal display element with a rubber cushion interposed therebetween. With this configuration, however, there occur problems that foreign matters may permeate between the liquid crystal display element and light guide (display area), and that since the width of the rubber cushion becomes narrower with the advance of the reduction of the frame boarder area, it is difficult to assemble the light guide with the liquid crystal display element.

The upper case and the lower case are clamped by crimping a plurality of crimping nails formed at the bottom edges of the sidewalls of the upper case, at the rear surface of the lower case.

These crimping nails are formed by making long narrow cuts in parallel with the underside of the lower case, in the bottom portions of the side walls of the upper case, and the upper and lower cases are clamped by crimping the nails at the underside of the lower case.

There has been a problem with this structure in that reliability of clamping of the upper and lower cases is degraded because of insufficient friction between the crimping nails and the underside of the lower case due to a small contact area of the crimping nails with the underside of the lower case.

SUMMARY OF THE INVENTION

An object of the present invention is to solve the above-described problems of the prior art and to provide a liquid crystal display device capable of easily realizing the reduction of the frame border area.

For achieving the aforesaid object, a liquid crystal display device according to an embodiment of the present invention includes a liquid crystal display element having a liquid crystal layer sandwiched between a pair of upper and lower substrates, a flexible circuit board disposed around a periphery of the liquid crystal display element, an illuminating light source including a line light source, a light guide and a reflector and disposed behind the liquid crystal display element, an upper case made of metal, having a sidewall bent back from a periphery of a front portion thereof and a window corresponding to a useful display area of the liquid crystal display element, a lower case made of resin for housing the illuminating light source, the upper case and the lower case being clamped by crimping a plurality of nails formed in the sidewall of the upper case at an outer surface of the lower case after stacking the liquid crystal display element, the flexible circuit board and the illuminating light source between the upper case and the lower case, wherein an electrical connection between the upper case and a grounding pattern formed on the flexible circuit board is made by at least one component in chip form having a conductive region and being attached to a portion of the grounding pattern bent over the lower substrate, and a metal tape having one end thereof being interposed between opposing portions of the upper and lower cases which are pressed against each other and the other end thereof being positioned to be pressed against the conductive region of the at least one component in chip form.

With this configuration, it is possible to reduce the cost by use of an easy-to-get small-sized chip component, and it is easy to electrically connect the grounding pattern of a flexible circuit board to the upper frame even if the width of the flexible circuit board becomes narrower along with the reduction of the frame border area.

For achieving the aforesaid object, a liquid crystal display device according to another embodiment of the present invention includes a liquid crystal display element having a liquid crystal layer sandwiched between a pair of upper and lower substrates, a flexible circuit board disposed around a periphery of the liquid crystal display element, an illuminating light source including a line light source, a light guide and a reflector and disposed behind the liquid crystal display element, an upper case made of metal, having a sidewall bent back from a periphery of a front portion thereof and a window corresponding to a useful display area of the liquid crystal display element, a lower case made of resin for housing the illuminating light source, the upper case and said lower case being clamped by crimping a plurality of nails formed in the sidewall of the upper case at an outer surface of the lower case after stacking the liquid crystal display element, the flexible circuit board and the illuminating light source between the upper case and the lower case, wherein the light guide and the liquid crystal display element are pressed against each other, and a rubber cushion is disposed between the light guide and peripheral portions of the lower case at least in the vicinity of portions where the upper case and the lower case are clamped by crimping the plurality of nails.

With this configuration, it is possible to prevent permeation of foreign matters between the liquid crystal display element and light guide, and to improve the resistance to shock of the liquid crystal display device.

For achieving the aforesaid object, a liquid crystal display device according to another embodiment of the present invention includes a liquid crystal display element having a liquid crystal layer sandwiched between a pair of upper and lower substrates, a flexible circuit board disposed around a periphery of the liquid crystal display element, an illuminating light source including a line light source, a light guide and a reflector and disposed behind the liquid crystal display element, an upper case made of metal, having a sidewall bent back from a periphery of a front portion thereof and a window corresponding to a useful display area of the liquid crystal display element, a lower case made of resin for housing the illuminating light source, the upper case and the lower case being clamped by crimping a plurality of nails formed in the sidewall of the upper case at an outer surface of the lower case after stacking the liquid crystal display element, the flexible circuit board and the illuminating light source between the upper case and the lower case, wherein the plurality of nails are formed such that the plurality of nails are crimped in a plane parallel with an underside of the lower case and have at least one bend before crimping in cross section parallel to the plane.

With this configuration, it is possible to enlarge the contact area between the crimping nails and the lower case, and hence to improve the reliability of crimp-clamping. In addition, the nail may be bent into various shapes such as a single-stepped shape, multi-stepped shape or a curved shape.

BRIEF DESCRIPTION OF THE DRAWINGS

In the accompanying drawings, in which like reference numerals designate similar components throughout the figures, and in which:

FIGS. 5A and 5B are schematic views illustrating a further embodiment of the structure for housing the light guide of the backlight in the lower case in the LCD of the present invention, wherein FIG. 5A is an enlarged view of a crimp-clamping structure between the upper case and lower case; and FIG. 5B is a sectional view taken on VB—VB of FIG. 5A;

FIGS. 6A and 6B are views of an essential portion for illustrating an embodiment of the crimp-clamping structure of the present invention in a state before crimping, wherein FIG. 6A is a plan view seen from the rear surface of the lower case, and FIG. 6B is a side view of FIG. 6A;

FIGS. 7A and 7B are views of an essential portion for illustrating another embodiment of the crimp-clamping structure of the present invention in a state after crimping, wherein FIG. 7A is a plan view seen from the rear surface of the lower case, and FIG. 7B is a side view of FIG. 7A;

FIGS. 8A and 8B are views of an essential portion for illustrating a further embodiment of the crimp-clamping structure of the present invention, wherein FIG. 8A shows the state before clamping by crimping nails, and FIG. 8B shows the state after clamping by the crimping nails;

FIG. 10 is an exploded perspective view showing a state after an illuminating light source (backlight) and various optical-films to be stacked under the upper case and liquid crystal display element shown in FIGS. 9A and 9B are housed in the lower case and before the lower case is clamped to the-upper case;

FIGS. 11A to 11E are views of the assembled LCD, wherein FIG. 11A is a front view of the liquid crystal display element; and FIGS. 11B to 11E are a rear side view, a right side view, a front side view and a left side view, respectively;

FIGS. 12A and 12B are views illustrating an interface circuit board mounted on the rear surface and side surface of the liquid crystal display module shown in FIGS. 11A to 11E, respectively;

FIGS. 15A to 15D are views of the assembled liquid crystal display module, wherein FIGS. 15A to 15D are a front view, a right side view, a front side view, and a left side view of the module, respectively.

FIG. 20A is a rear view showing a state in which the liquid crystal display element is housed in the shield case, and FIG. 20B is a side view of FIG. 20A;

FIGS. 21A and 21B are a front view and a front side view of the backlight shown in FIGS. 20A and 20B from which a prismatic sheet and a light-diffusing sheet are removed, respectively;

FIGS. 22A and 22B are a front view and a front side view, similar to FIGS. 21A and 23B, showing another configuration example of the backlight, respectively;

FIGS. 23A to 23E are a front view, a rear side view, a right side view, a front side view and a left side view of the lower case, respectively;

FIGS. 25A to 25C are views illustrating a housing portion for housing the light-guide in the mold case, wherein FIG. 25A is a plan view of an essential portion;

FIG. 25B shows the conventional structure for each corner shown in FIG. 25A; and FIG. 25C shows the inventive structure for each corner;

FIGS. 27A and 27B are views illustrating a multilayer flexible circuit board for drain drive, wherein FIG. 27A is a rear view (bottom view) and FIG. 27B is a front view (top view);

FIGS. 28A and 28B are views illustrating an essential portion of a multilayer flexible circuit board FPC2, wherein FIG. 28A is an enlarged view of a J portion shown in FIG. 27A, and FIG. 28B is a side view showing the mounting of the multilayer flexible circuit board and the folded state thereof;

FIGS. 29A and 29B are views illustrating the multilayer flexible circuit board for gate drive, wherein FIG. 29A is a rear view (bottom view) and FIG. 29B is a front view (top view):

FIGS. 33A to 33C are views of the multilayer flexible circuit board, wherein FIGS. 33A and 33B are sectional views taken on lines 33A—33A and 33B—33B of FIG. 27A, respectively, and FIG. 33C is a sectional view taken on line 33C—33C of FIG. 27B;

FIGS. 35A and 35B are views illustrating a conductive pattern of a multilayer wiring portion, wherein FIG. 35A is a plan view showing the configuration of the surface conductive layer pattern of the multilayer wiring segment FML portion which is partially shown in FIG. 27B, and FIG. 35B is a partial enlarged view of the interface circuit substrate PCB shown in FIG. 27D;

FIGS. 37A to 37D are views illustrating the interface circuit board having a controller section and a power source, wherein FIG. 37A is a rear view (bottom view); FIG. 37B and 37C are a partial front side view and a partial lateral side view of a hybrid integrated circuit HI mounted thereon, respectively; and FIG. 37D is a front view (top view).

DETAILED DESCRIPTION OF THE PREFERRED EMBODIMENTS

Hereinafter, embodiments of the present invention will be described with reference to the drawings.

Figure 1:
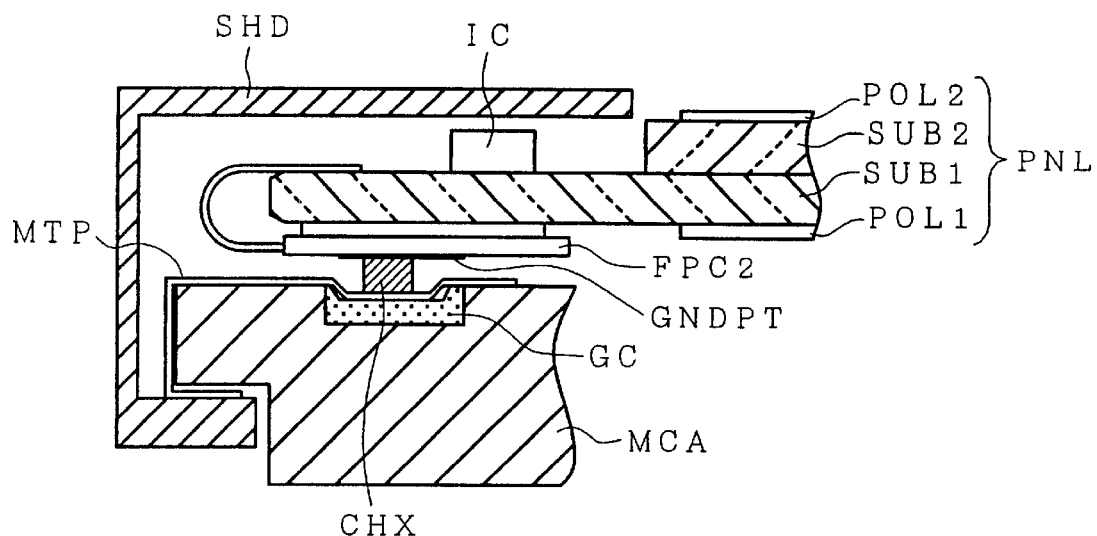
FIG. 1 is a sectional view of an essential portion for illustrating an embodiment of an electrical connection between a flexible circuit board and an upper case in a LCD of the present invention.
Figure 2:
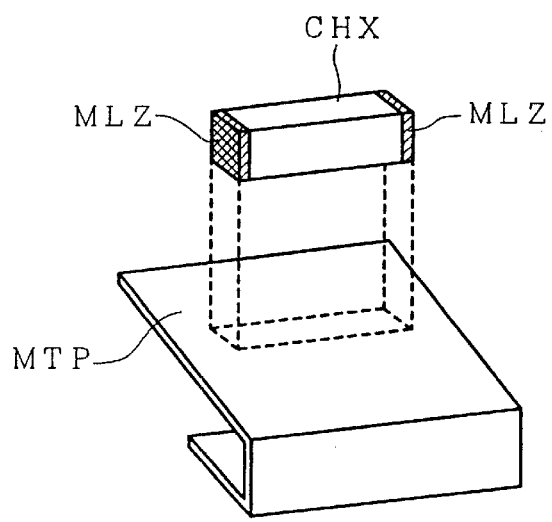
FIG. 2 is a view illustrating a relative positional relationship between a ship component and a metal tape shown in FIG. 1.

FIG. 1 is a sectional view of an essential portion of a LCD of the present invention, illustrating an embodiment of an electrical connection between a flexible circuit board and an upper case of the LCD, and FIG. 2 is a view illustrating a relative positional relationship between a chip component and a metal tape in FIG. 1. In FIG. 1, reference character MCA designates a lower case (resin mold or mold case) for housing an illuminating light source (a backlight) comprising a line light source or a combination of a line light source and a light guide; SHD is an upper case (shield case) made of metal; SUB1 is a lower substrate; SUB2 is an upper substrate; POL1 is a lower polarizer; POL2 is an upper polarizer; and PNL is a liquid crystal display element.

Reference character IC designates a driver IC directly mounted on the peripheral portion of the lower substrate SUB1; FPC2 is a flexible circuit board for drain drive; GNDPT is a grounding pattern of the flexible circuit board; CHX is a chip component; GC is a rubber cushion material; and MTP is a metal tape (copper foil).

In this embodiment, the chip component CHX is configured as a chip capacitor. The chip component CHX has at its both ends metallized conductive portions MLZ, and is mounted on the underside of the flexible circuit board FPC2 provided on the rear surface of the peripheral portion of the lower substrate SUB1 by soldering or the like. As shown in FIG. 1, the underside of the chip component CHX is made in contact with one end of the metal tape MTP placed on the mold case MCA, and the other end of the metal tape MTP is bent around the edge of the mold case MCA onto the underside of the mold case MCA and is sandwiched between the upper frame SHD and the mold case MCA after they are clamped together by crimping portions of the upper case SHD at the underside of the mold case MCA.

Clamping two parts together by crimping projections (nails, ears or tongues, for example) formed in one of the two parts at the surface of the other may be hereinafter referred to as crimp-clamping.

With this embodiment, it is not required to take into account the width of the flexible circuit board FPC2 for electric connection between the flexible circuit board FPC2 and upper frame SHD. Further, a connection between the chip component CHX and metal tape MTP can be elastically clamped by forming a recess in the mold case MCA and disposing the rubber cushion GC in the recess, thereby improving the reliability in connection.

Figure 3:
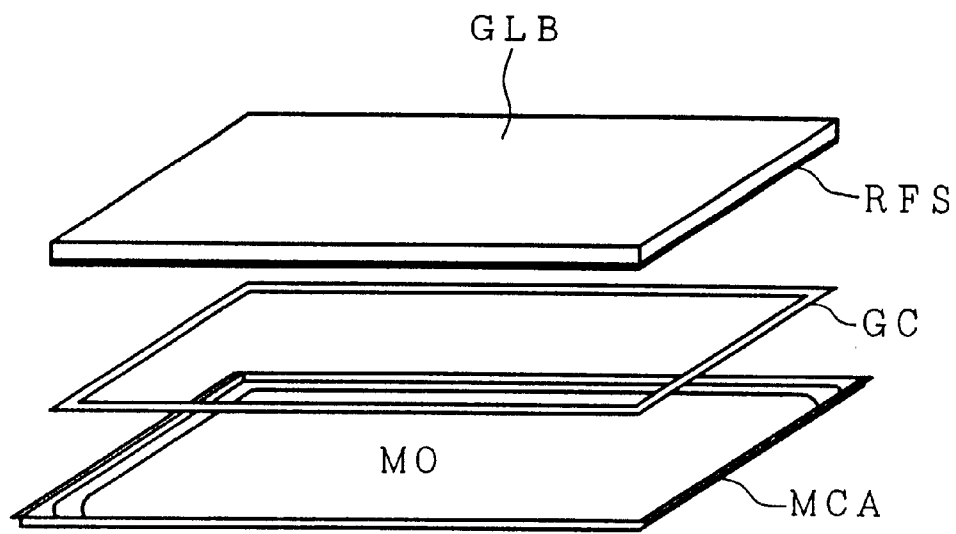
FIG. 3 is a schematic view illustrating an embodiment of a structure for housing a light guide of a backlight in a lower case in the LCD of the present invention.

FIG. 3 is a schematic exploded perspective view illustrating an embodiment of a structure, of the LCD of the present invention, for housing the light guide constituting part of the backlight in the lower case. The lower case (or mold case) MCA is substantially a frame body having a window MO for housing a light guide GLB while supporting the peripheral edge of the light guide GLB. To be more specific, the frame-like rubber cushion GC is disposed along the frame-like inner periphery of the mold case MCA and the light guide GLB is mounted on the rubber cushion GC. While not shown, a liquid crystal display element is made in intimate contact with the upper surface of the light guide with optical sheets such as a light-diffusing sheet and a prismatic sheet interposed therebetween. In such a state, as shown in FIGS. 6A and 6B, FIG. 10, FIGS. 11A to 11E, and FIGS. 38 and 41, the upper case SHD is placed on the liquid crystal display element, and the liquid crystal display element and upper case SHD are clamped together by crimping nails formed from the sidewalls of the upper case SHD at the rear surface of the mold case MCA.

With this configuration, there can be realized a LCD capable of preventing permeation of foreign particles between the liquid crystal display element and light guide GLB, and ensuring an installation space of the rubber cushion so as to enhance the resistance to shock even in the case of reduction of the frame boarder area and/or thinning of the LCD.

Figure 4:
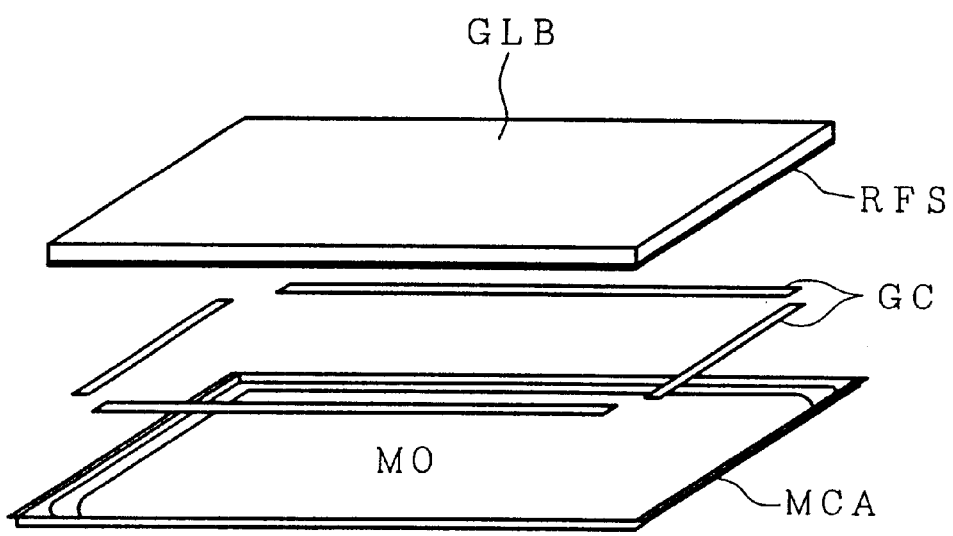
FIG. 4 is a schematic view illustrating another embodiment of the structure for housing the light guide of the backlight in the lower case in the LCD of the present invention.

FIG. 4 is a schematic exploded perspective view illustrating another embodiment of the structure, of the LCD of the present invention, for housing the liquid guide constituting part of the backlight in the lower case. In this embodiment, the rubber cushion shown in FIG. 3 is divided into four parts corresponding to four sides of the mold case MCA. The effect of this embodiment is the same as that in the embodiment shown in FIG. 3. Incidentally, rubber cushions GC may be interposed between the upper case SHD and the mold case MCA only in portions where they are crimp-clamped.

Figure 5A:
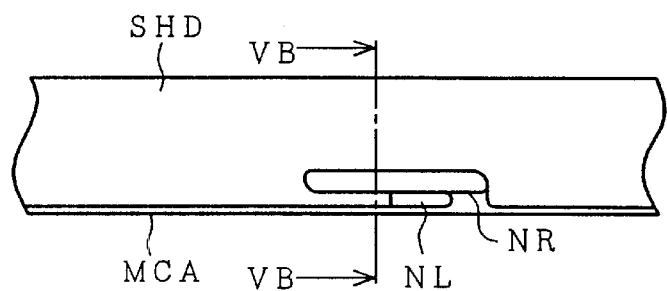
Figure 5B:
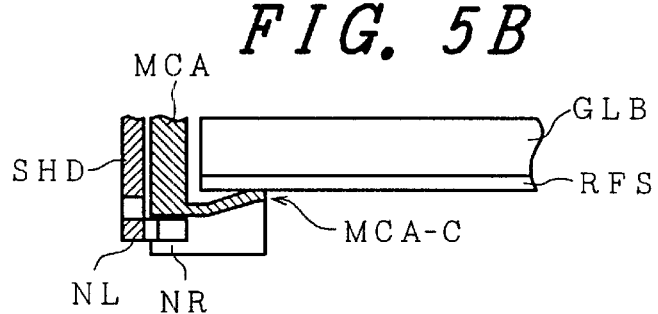

FIGS. 5A and 5B are schematic views illustrating a further embodiment of the structure, of the LCD of the present invention, for housing the liquid guide constituting part of the backlight in the lower case, wherein FIG. 5A is an enlarged view of crimp-clamped portions between the upper case SHD and the mold case MCA as the lower case, and FIG. 5B is a sectional view taken on line VB—VB of FIG. 5A. In this embodiment, in place of the configuration using the rubber cushion GC shown in FIGS. 3 and 4, there is adopted a configuration that the thickness of a bottom side inner peripheral portion MCA-C, for receiving the light guide GLB, of the mold case MCA is thinned to enhance the elasticity thereof against the light guide GLB. In addition, the thinned wall portion MCA-C may be formed at only the crimp-clamped portions of the mold case MCA with the upper case SHD.

Figures 6A, 6B:
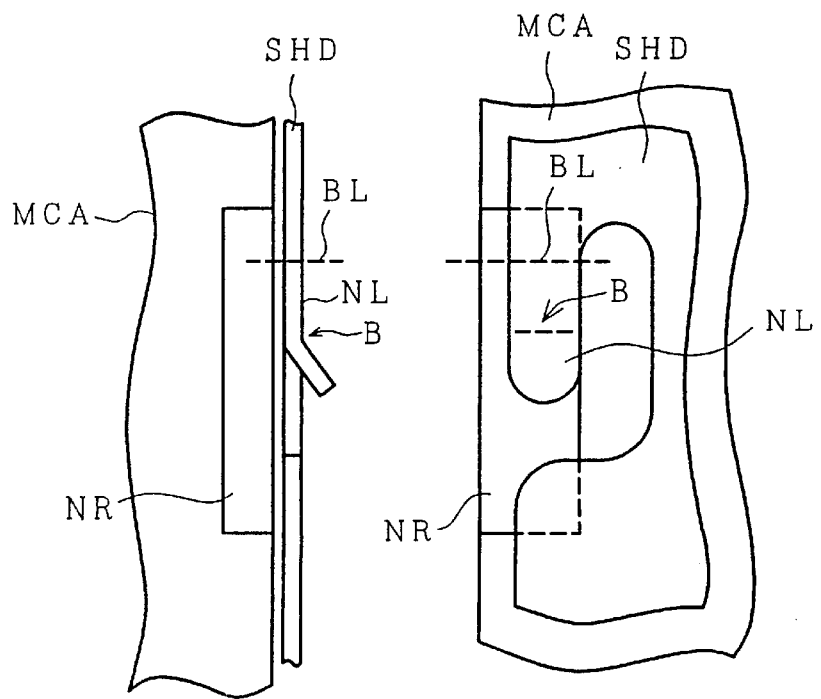
Figure 7A:
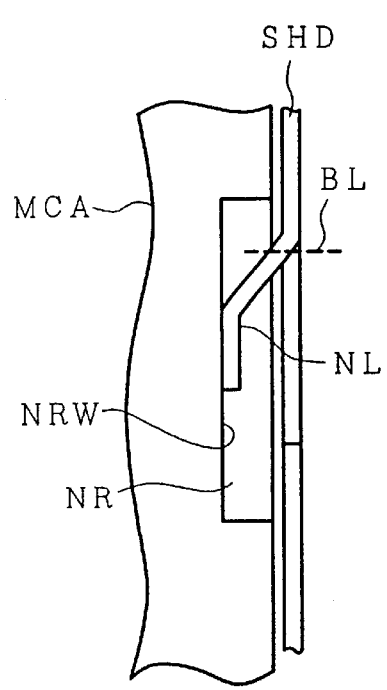
Figure 7B:
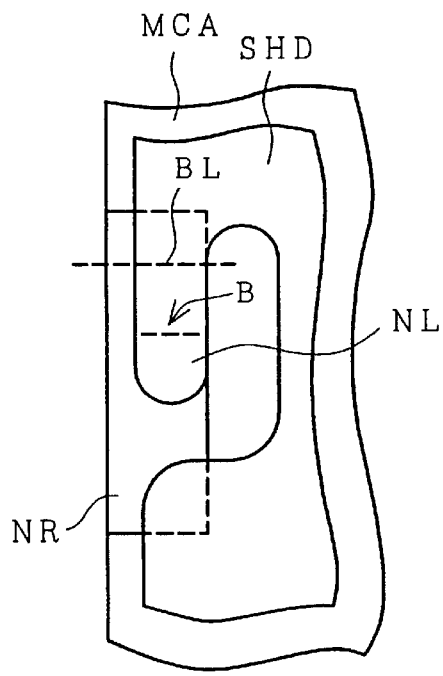

FIGS. 6A and 6B and FIGS. 7A and 7B are views of an essential portion for illustrating an embodiment of a crimp-clamping structure according to the present invention, wherein FIGS. 6A and 7A are plan views seen from the rear surface of the lower case, and FIGS. 6B and 7B are side views of FIGS. 6A and 7A.

The crimp-clamping between the upper case SHD and lower case MCA is performed such that as shown in FIGS. 6A and 6B, each nail NL formed on the side surface of the upper case SHD is previously outwardly bent (shown by an arrow B), and as shown in FIGS. 7A and 7B, such a nail NL is forcibly bent along a bending line BL to be fixed in a fixing recess NR of the lower case MCA. It may be desirable that the tip area of the nail NR be previously bent at such an angle as to be in contact with an inner wall NRW of the fixing recess NR in parallel upon crimp-clamping.

With this configuration, the contact area of the nails NL and each of the bottom surface and inner wall of the fixing recess NR becomes larger, to sufficiently firm crimp-clamping even in the case of the reduction of the frame border area.

Figure 8A:
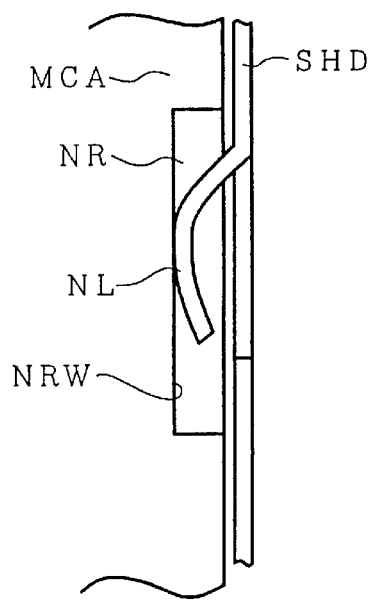
Figure 8B:
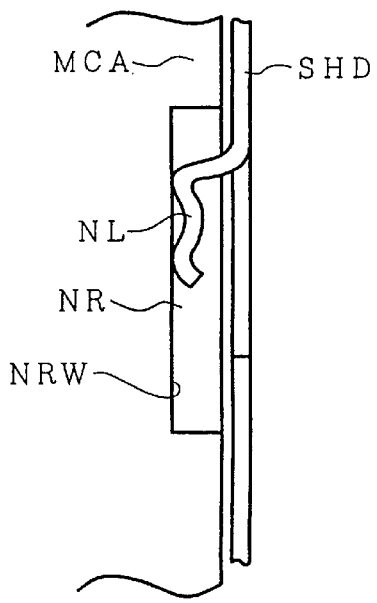

FIGS. 8A and 8B are views of an essential portion for illustrating another embodiment of the crimp-clamping structure according to the present invention. The nail NL may be previously curved as shown in FIG. 8A or may be formed into a wavy shape. In other words, the nail NL may be formed into any shape insofar as the contact area between the nails NL and each of the bottom surface and inner wall of the fixing recess NR becomes large upon crimp-clamping as shown in FIG. 8A.

In the above embodiments, the chip capacitor is used as the chip component CHX; however, the present invention is not limited thereto. For example, a chip resistor, a metallized layer provided on a ceramic substrate or a metal sheet may be used. Each of the width, length, and thickness of the chip component is preferably in a range of 2 mm or less.

Next, examples of LCDs to which the above-described embodiments are applied will be described in detail. In the following figures, parts having the same function are designated by the same reference characters and the repeated explanation thereof is omitted.

Figure 9A:
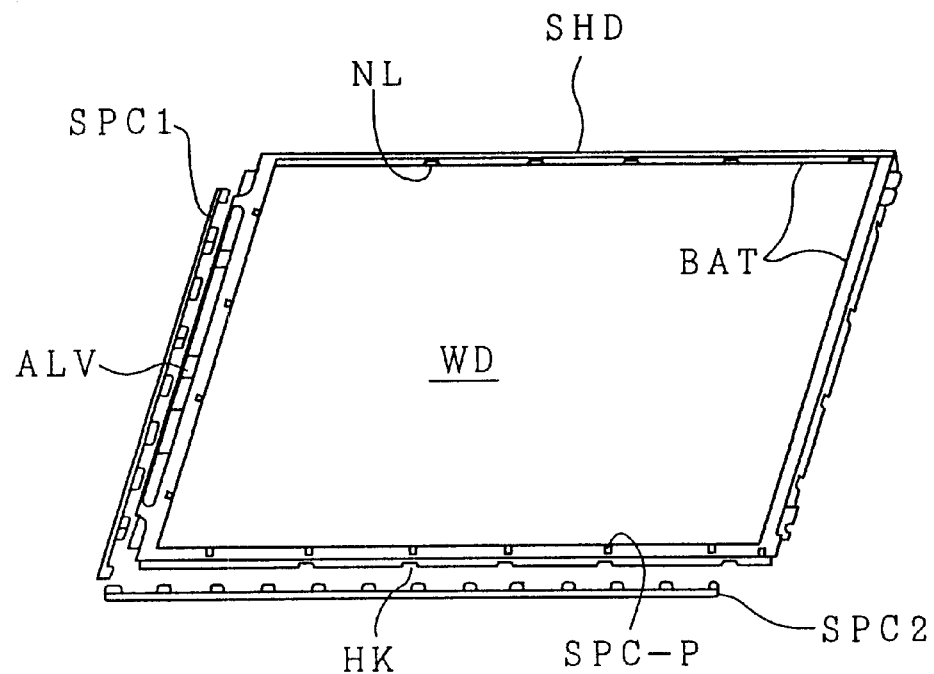
FIGS. 9A and 9B are exploded perspective views of one configuration example of the LCD of the present invention, showing a liquid crystal display element in a state before it is covered with the upper case and lower case.
Figure 9B:
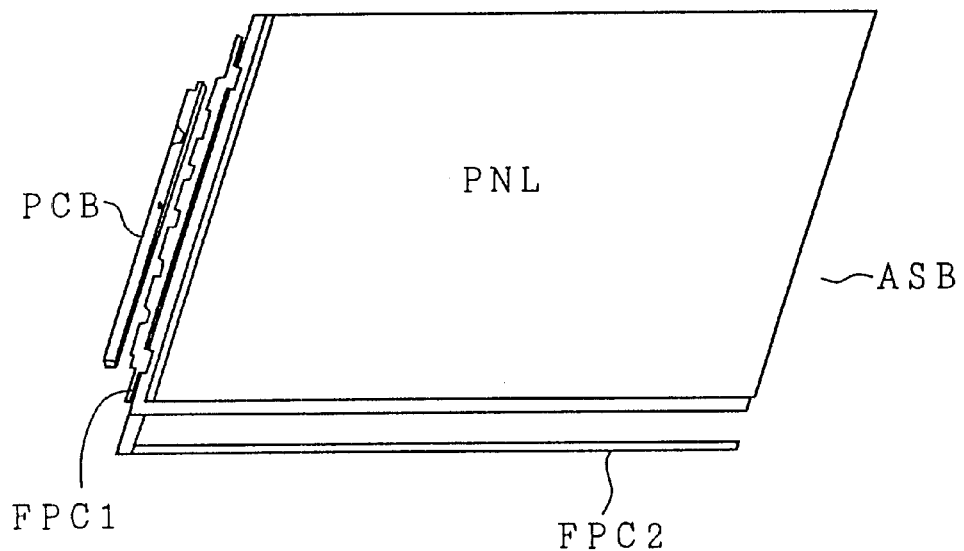

FIGS. 9A and 9B and FIG. 10 are exploded perspective views illustrating the whole of one configuration example of a LCD of the present invention, wherein FIGS. 9A and 9B are exploded perspective views showing a state before a liquid crystal display element is covered with an upper case constituting a housing of the LCD; and FIG. 10 is an exploded perspective view showing a state after an illuminating light source (backlight) and various optical films to be stacked under the upper case and liquid crystal display element shown in FIGS. 9A and 9B are housed in a lower case and before the lower case is fixed with the upper case shown in FIG. 9A.

In FIGS. 9A and 9B and FIG. 10, reference character SHD designates an upper case (shield case); PNL is a liquid crystal element; SPC (SPC1, SPC2) is an insulating spacer; SCP-P is projections of the spacer SPC (to be fitted in holes opened in the upper case SHD); BAT is an adhesive double coated tape; FPC1 and FPC2 are multilayer flexible circuit boards (FPCL is the circuit board for gate drive and FPC2 is the circuit board for drain drive); PCB is an interface circuit board; SPS is a light-diffusing sheet; PRS is a prismatic sheet; GLB is a light guide; RFS is a reflecting sheet; GC is a rubber cushion; MCA is a lower case (mold frame); LP is a cold cathode fluorescent lamp (CFL); LS is a light source reflector; and LPCH is a cable holder for the cold cathode fluorescent lamp.

The shield case SHD shown in FIG. 9A is made by press-forming and bending one metal sheet. In FIG. 9A, reference character WD designates an opening from which the liquid crystal display element PNL is exposed. The liquid crystal display element PNL is configured such that a liquid crystal layer is held between two substrates, and a plurality of gate lines and a plurality of drain lines intersecting the gate lines are arranged on the lower substrate, wherein thin film transistors are arranged at intersections between the gate lines and drain lines and one picture element electrode driven by one thin film transistor constitutes one picture element.

The gate driver ICs are mounted on a first side of the lower substrate adjacent to the interface circuit board PCB of the liquid crystal display element PNL, and drive signals are supplied to the gate driver ICs from the flexible circuit board FCP1. The drain driver ICs are mounted on a second side of the lower substrate intersecting the first side of the lower substrate, and driver signals are supplied to the drain driver ICs from the flexible circuit board FCP2.

The liquid crystal display element on which the above-described driver ICs, flexible circuit boards FCPL and FCP2, and interface circuit board PCB are mounted is hereinafter referred to as "liquid crystal display element with the peripheral circuits, ASB".

Referring to FIG. 10, the light guide GLB is attached inside the lower case MCA via the rubber cushion GC. The reflecting sheet RFS is stacked on the rear surface of the light guide GLB. Two pieces of the prismatic sheets PRS (PRS1 and PRS2) and the light-diffusing sheet SPS are stacked on the upper surface of the light guide GLB, and the liquid crystal display element ASB with the peripheral circuits shown in FIGS. 9A and 9B is mounted thereon and is covered with the upper case SHD. Then, fixing nails NL formed along the peripheral edge of the upper case SHD are fitted in fixing recessed formed in the lower case MCA, to clamp the upper case SHD and lower case MCA to each other, thereby assembling a LCD (also called liquid crystal display module).

Next, the configuration examples of the LCD according to the present invention will be described in more detail with reference to FIGS. 11A and the later figures.

While there are slight differences between configurations shown in the accompanying drawings of this specification, it should be understood that such differences mean that the present invention can be applied to a plurality of types of LCDs.

FIGS. 11A to 11E are views of the LCD (liquid crystal display module) showing a state after completion of assembling the liquid crystal display module, wherein FIG. 11A is a front view of the liquid crystal display module seen from the front side of the liquid crystal display element PNL, that is, from the liquid crystal display element PNL side; and FIGS. 11B to 11E are side views of the liquid crystal display module. FIG. 12A is a view illustrating the rear surface of the liquid crystal display module shown in FIGS. 11A to 11E and the interface circuit board mounted on the side surface thereof.

The liquid crystal display module MDL has two kinds of housing/holding members, that is, the lower case (mold frame) MCA and the upper case (shield frame SHD). In FIG. 11A, reference character HLD designates four pieces of mounting holes provided for mounting the module MDL, as a display unit, on an information processing apparatus such as a personal computer or word processor. The mounting holes HLD are formed in the shield frame SHD at positions corresponding to those of mounting holes MH formed in the mold case MCA (enlargedly shown in FIG. 24). The module MDL is fixedly mounted on an information processing apparatus by making screws or the like pass through both the mounting holes. In this module MDL, an inverter power source for the backlight is disposed at an MI section (see FIG. 20A), and a power is supplied to the backlight BL therefrom via a connector LCT and a lamp cable LPC.

Signals from a host computer and a necessary power are supplied to a controller section and a power source of the liquid crystal display module MDL via an interface connector CT1 of the interface circuit board positioned on the rear surface of the module, respectively.

FIG. 12B is a view illustrating the configuration example of the interface circuit board PCB. On the interface circuit board PCB are mounted the connector CT1 for receiving signals from the host computer and a necessary power; a low-voltage difference signal receiving circuit chip LVDS for converting serial low-voltage difference signals having been received from the host computer into original parallel signals; a control circuit chip TCON; a digital/digital converter circuit chip DD for creating various DC voltages; and connectors CT3 and CT2 for connecting the flexible circuit board FPC1 for gate drive and the flexible circuit board FPC2 for drain drive to each other (which will be described later).

Figure 13:
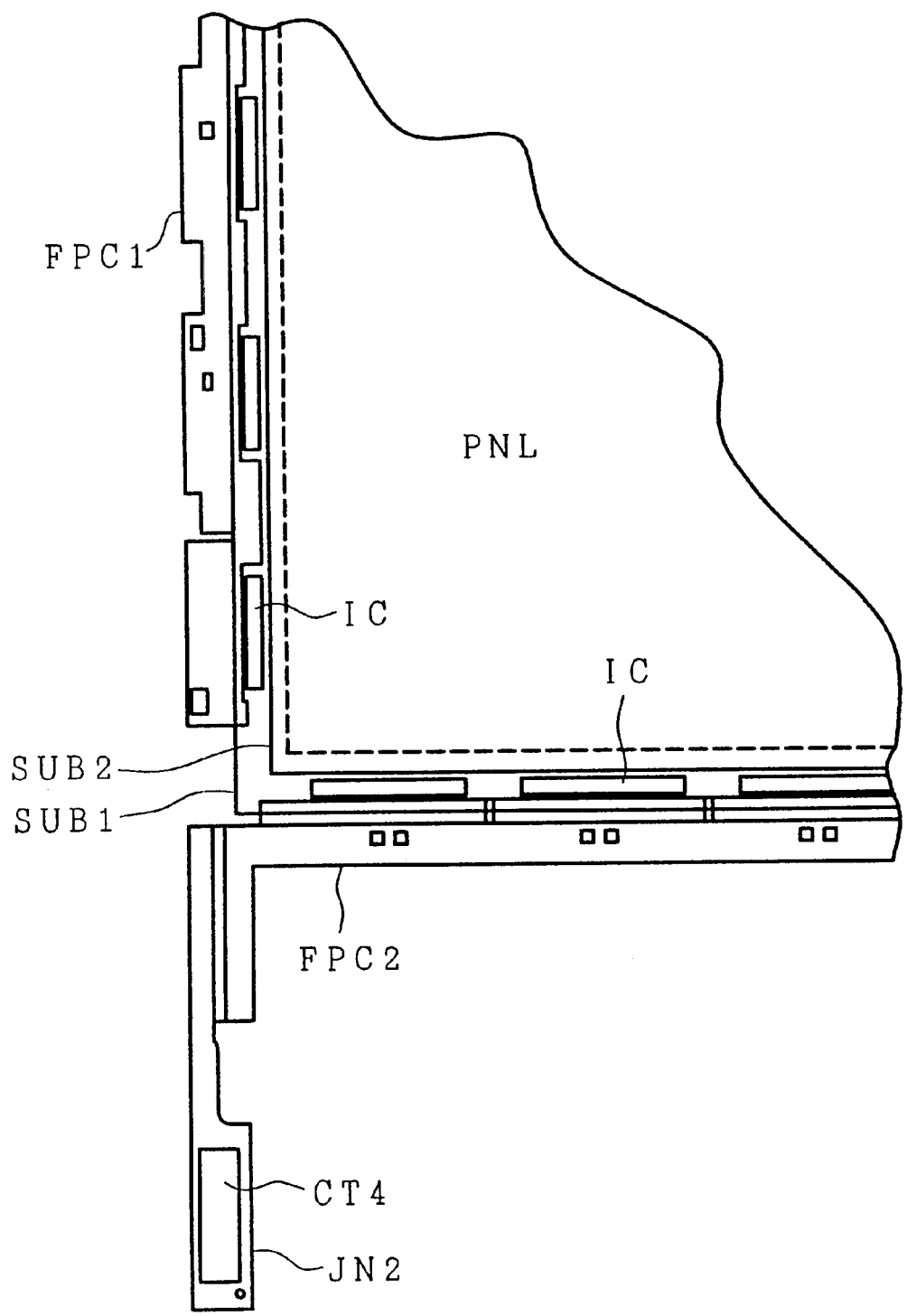
FIG. 13 is a plan view of an essential portion for illustrating an arrangement between a flexible circuit board for gate drive and a flexible circuit board for drain drive.

FIG. 13 is a detailed plan view illustrating an arrangement between the flexible circuit board FPC1 for gate drive and the flexible circuit board FPC2 for drain drive. The gate driver ICs are mounted on the upper surface of the liquid crystal element PNL on the interface circuit board side, and the flexible circuit board FPC1 for gate drive, which is connected to the gate driver ICs, is disposed. The drain driver ICs are mounted on the bottom side of the liquid crystal display element PNL, and the flexible circuit board FPC2 for drain drive, which is connected to the drain driver ICs, is disposed.

A projection JN4 is formed at an end portion, on the side of the flexible circuit board FPC1 for gate drive, of the flexible circuit board FPC2, and a connect or (flat connector) CT4 to be connected to a connector CT2 of the interface circuit board PCB is provided at the leading end of the projection JN4. The flexible circuit board FPC2 is folded on the rear surface of the liquid crystal element PNL and the connector CT4 is connected to the connector CT2 of the interface circuit board.

Figure 14:
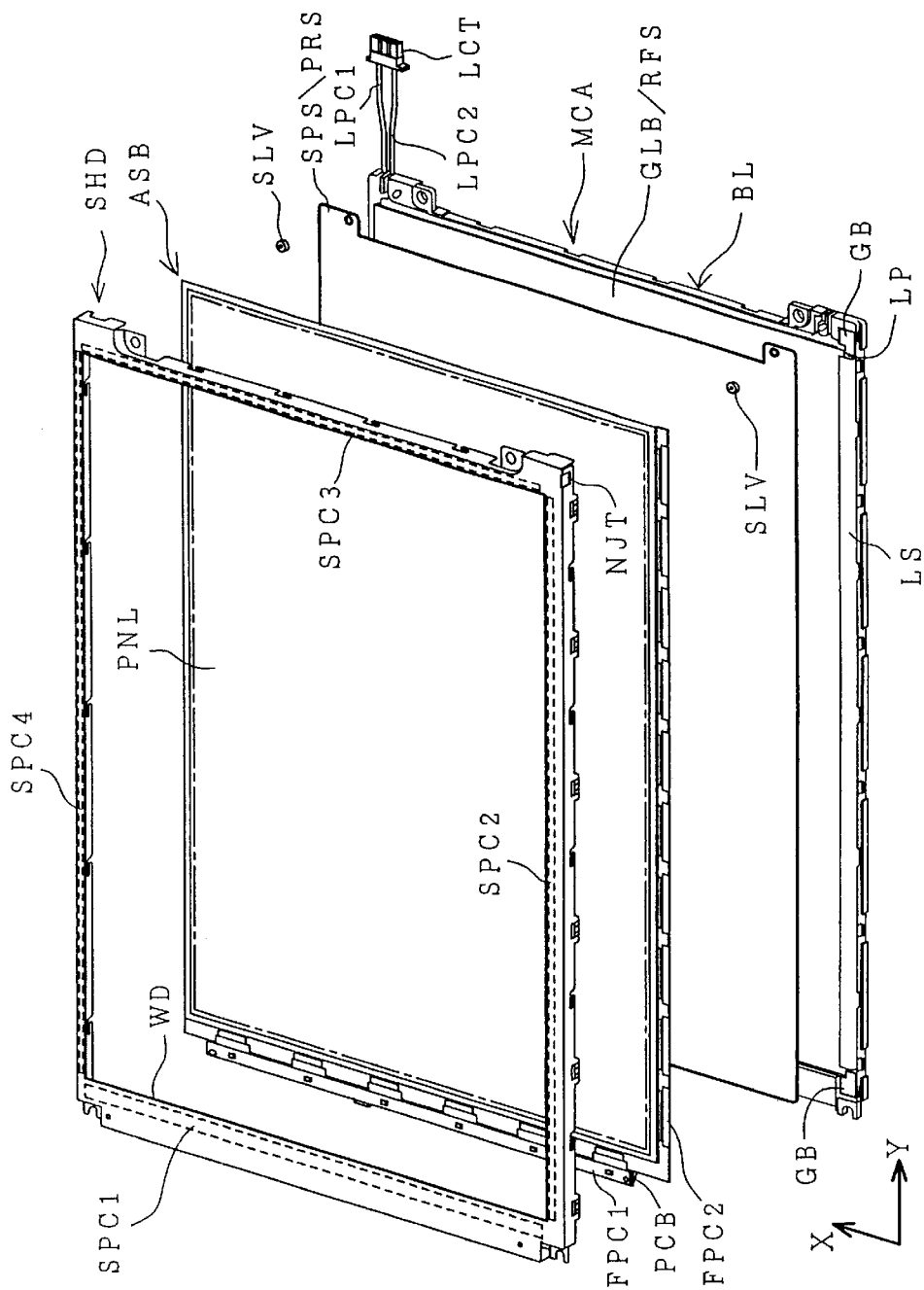
FIG. 14 is an exploded perspective view illustrating the entire configuration of another example of the LCD of the present invention.

FIG. 14 is an exploded perspective view illustrating the entire configuration of another example of the LCD according to the present invention. Reference numeral SHD designates an upper case (shield case); WD is a display window; SPC1 to SPC4 are insulating spacers; FPC1 and FPC2 are folded multilayer flexible circuit boards (FPC1 is the circuit board for gate drive and FPC 2 is the circuit board for drain drive); PCB is an interface circuit board; ASB is an assembled liquid crystal display element with the driver circuit boards; PNL is a liquid crystal display element having driver ICs mounted on one of a pair of transparent insulating substrates overlapped and fixed with a spacing therebetween; SPS is a light-diffusing element; GLB is a light guide; RFS is a reflecting sheet; MCA is a lower case (mold case) formed by integral molding; LP is a line light source (cold cathode fluorescent lamp); LPC1 and LPC2 are lamp cables; LCT is a connector for an inverter power source; and GB is a rubber bush for indicating the cold cathode fluorescent lamp. These components are stacked under the vertical arrangement relationship shown in FIG. 14, following by clamping the upper case SHD and lower case MCA to each other, to thereby assemble a LCD (liquid crystal display module). The details of the other configuration will be described later.

Figure 15:
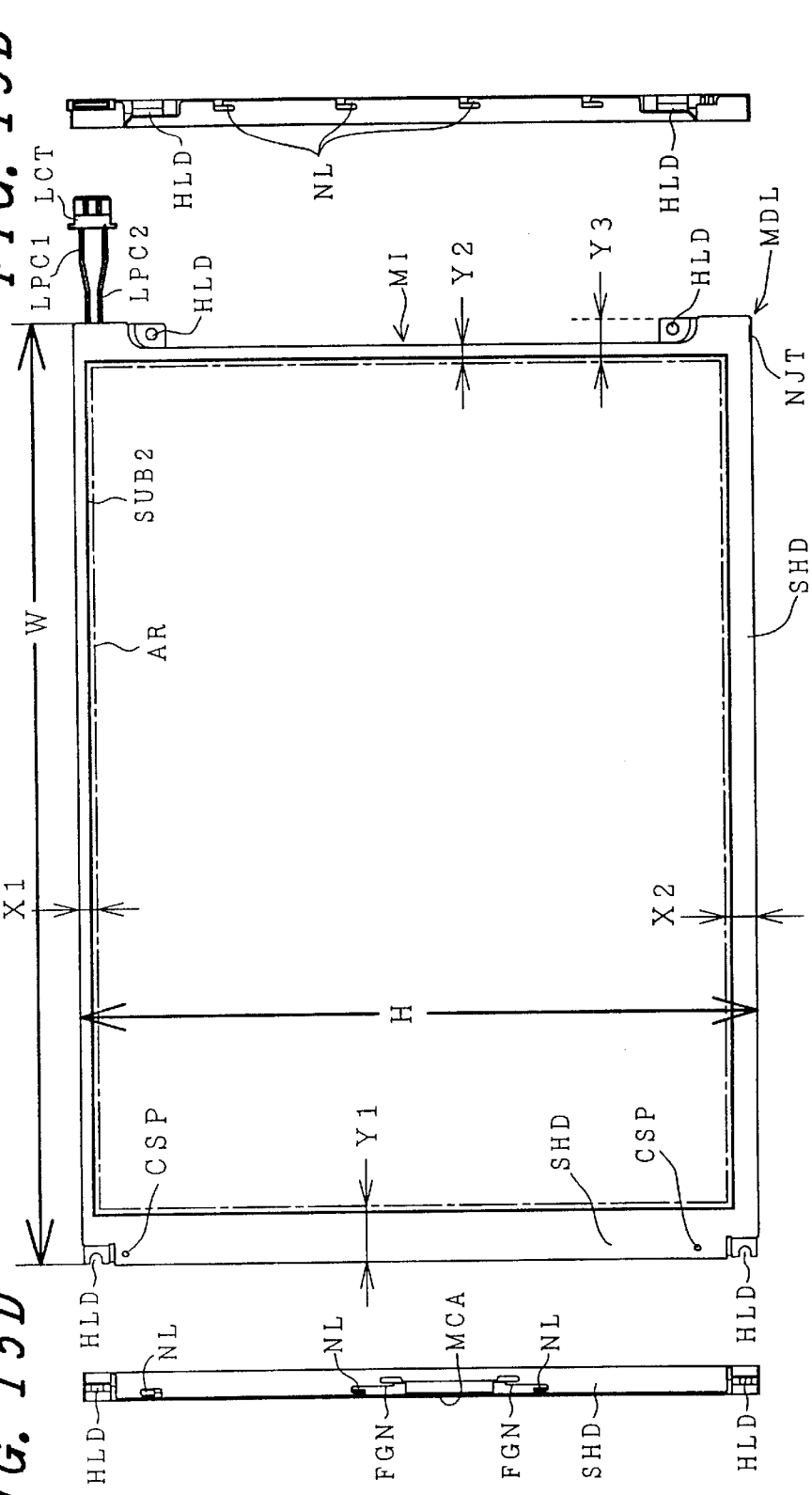

FIGS. 15A to 15D are views of the liquid crystal display module showing a state after completion of assembling the liquid crystal display module. FIG. 15A is a front view seen from the front side of the liquid crystal element PNL, that is, from the upper side (or display side) of the module, and FIGS. 15B to 15D are a right side view, front side view, and left side view of the module, respectively.

Figure 16:
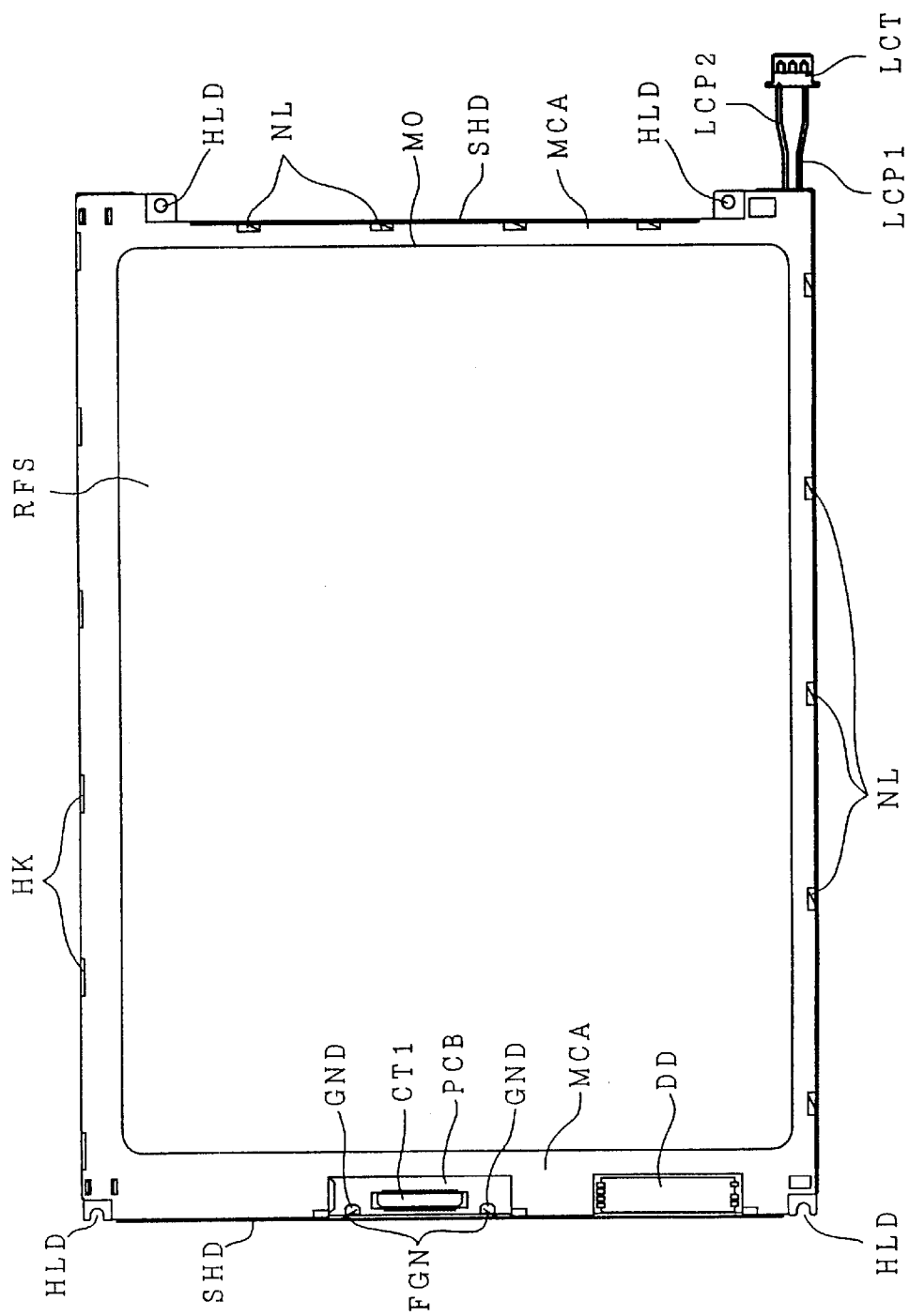
FIG. 16 is a rear view of the assembled liquid crystal display module.

FIG. 16 is a rear view of the liquid crystal display module, seen from the rear surface side (that is, lower side) of the liquid crystal display element PNL, showing a state after completion of assembling the liquid crystal display module.

Figure 19:
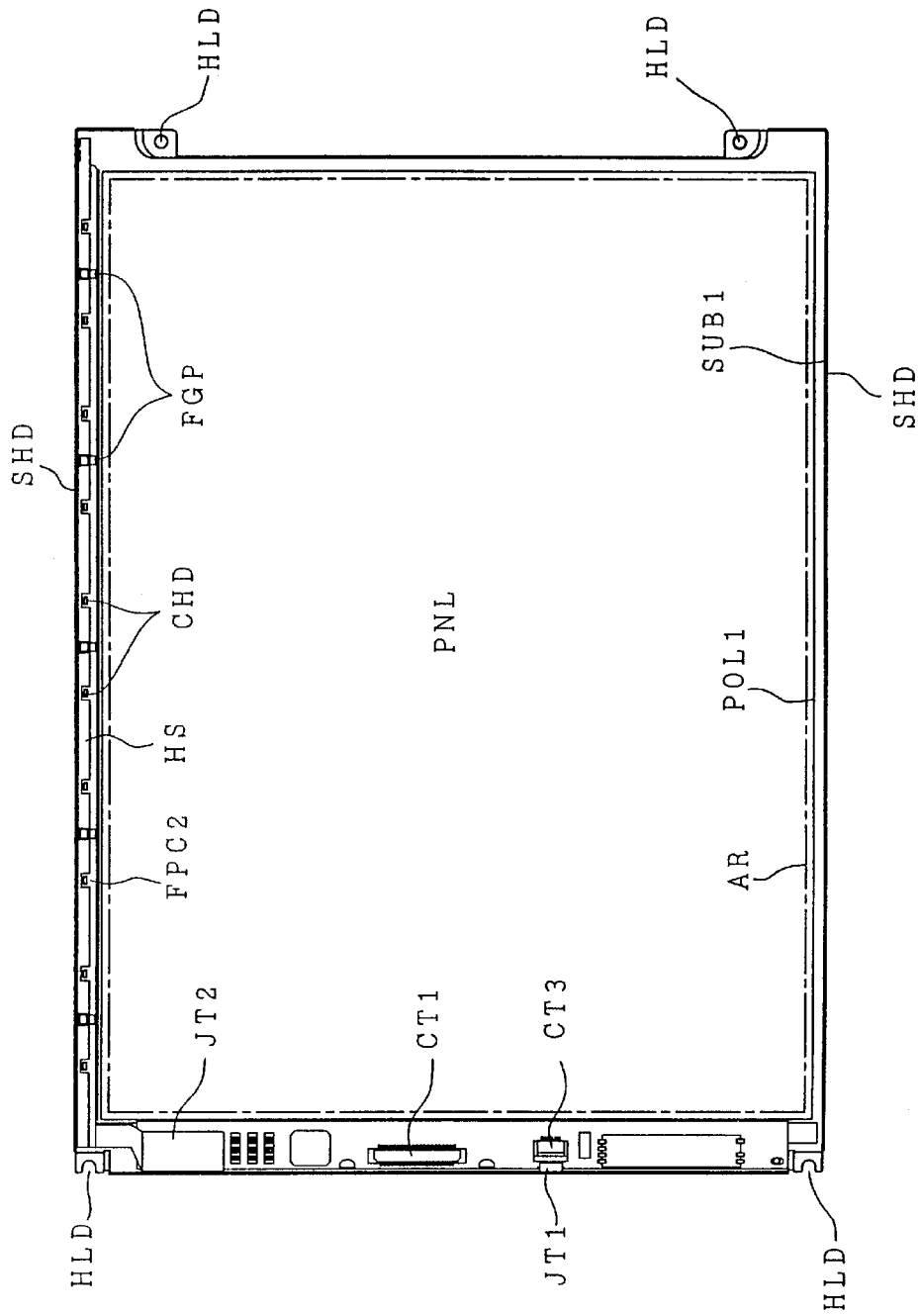
FIG. 19 is a rear view showing a state in which the liquid crystal display element is housed in the shield case.

The liquid crystal display module MDL has two kinds of housing/holding members, that is, the mold frame MCA and the shield frame SHD. Reference character HLD designates four pieces of mounting holes provided for mounting the module MDL, as a display unit, on an information processing apparatus such as a personal computer or word processor. As shown in FIG. 19, the mounting holes HLD are formed in the shield frame SHD at positions corresponding to those of mounting holes MH formed in the mold case MCA (see later figures, FIGS. 23A to 23E and FIG. 24). The module MDL is fixedly mounted on an information processing apparatus by making screws or the like pass through both the mounting holes. In this module MDL, an inverter power source for the backlight is disposed at an MI section (see FIG. 23A), and a power is supplied to the backlight BL therefrom via the connector LCT and lamp cable LPC.

Signals from a host computer and necessary power are supplied to a controller section and a power source of the liquid crystal display module MDL via the interface connector CT1 of the interface circuit board positioned on the rear surface of the module, respectively.

Figure 42:
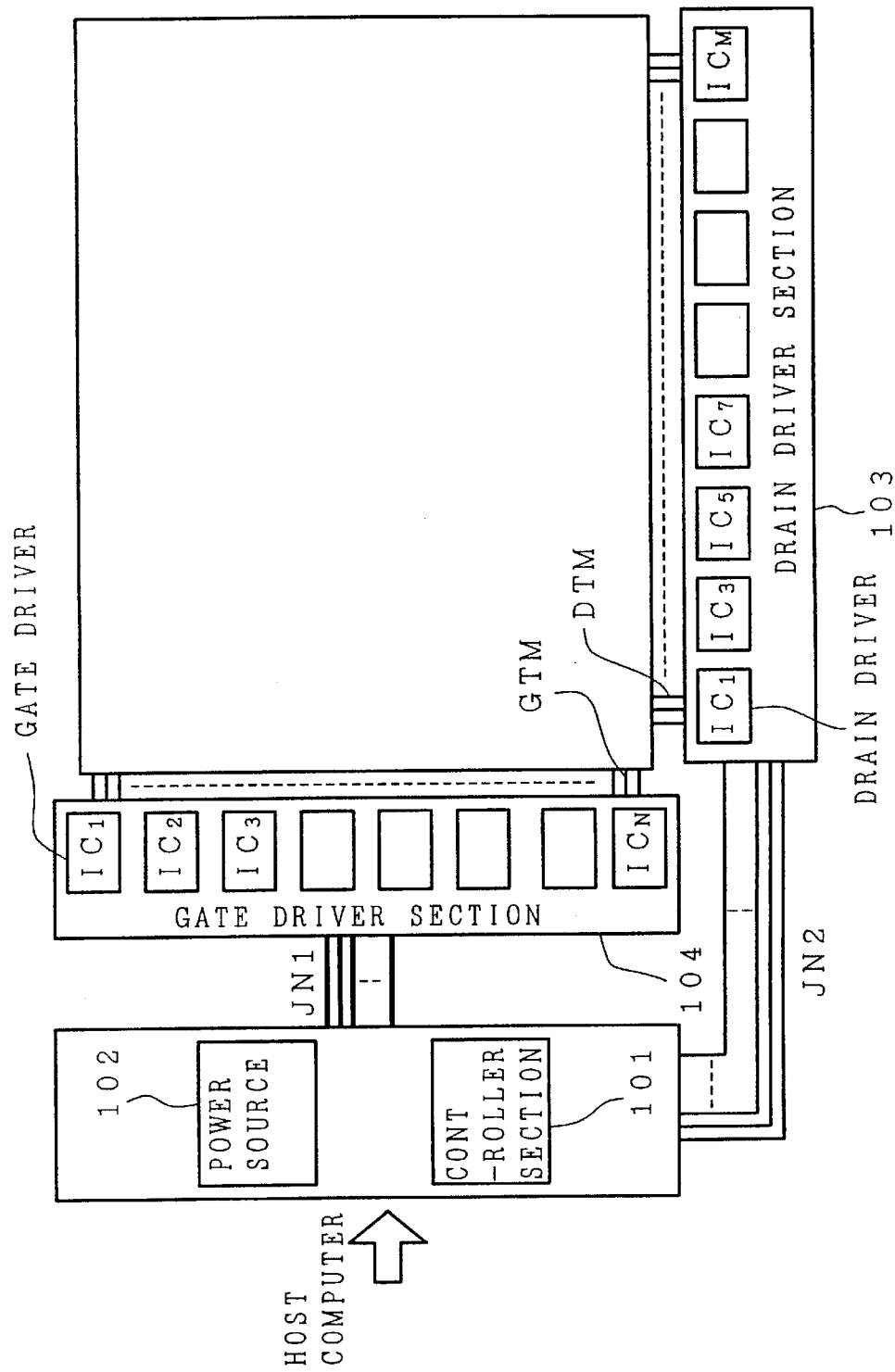
FIG. 42 is a block diagram illustrating the liquid crystal display element and the circuit configuration of driver circuits disposed at the peripheral portion of the liquid crystal display element.

FIG. 42 is a block diagram showing a TFT liquid crystal display element of the liquid crystal display module shown in FIG. 19 and circuits disposed in the peripheral portion of the TFT liquid crystal display element. In this configuration example, while not shown, the drain drivers $IC_1$ to $IC_M$ are mounted, together with extension lines DTM for drain drive and extension lines GTM for gate drive formed on one of the substrates of the liquid crystal display element, by the chip-on-glass method using an anisotropic conductive film or ultraviolet hardening resin.

In this configuration example, M-pieces of the drain drivers IC and N-pieces of the gate drivers IC are mounted by the chip-on-glass method in accordance with useful dots of 800×3×600 pieces specified under the XGA Specification. In addition, a drain driver section 103 is disposed on the bottom side of the liquid crystal display element; a gate driver section 104 is disposed on the left side portion thereof; and a controller section 101 and a power source 102 are disposed on the same left side portion thereof. The controller section 101 and power source 102 are connected to the gate driver section 104 via an electrically connecting means JN1 and connected to the drain driver section 103 via an electrically connecting means JN2. The controller section 101 and power source 102 are disposed on the rear surface of the gate driver section 104.

Next, the configuration of each component will be described in detail.

Shield Case Made of Metal

FIGS. 15A to 15D are a top view, a right side view, a front side view, and a left side view of a shield case SHD, respectively. A perspective view, seen from the upper right side, of the shield case SHD is shown in FIG. 14.

The shield case (metal frame) SHD is manufactured by press-forming and bending one metal sheet. Reference character WD designates an opening from which the liquid crystal display element PNL is exposed, which opening is hereinafter referred to as "display window".

Reference character NL designates nails for fixing the shield case SHD and mold case MCA to each other. For example, 12 pieces of the nails NL are integrally provided on the shield case SHD. Reference character HK designates hooks for fixing the shield case SHD and mold case MCA to each other. For example, 6 pieces of the hooks HK are integrally provided on the shield case SHD. As described with reference to FIGS. 6A and 6B and FIGS. 7A and 7B, the liquid crystal display element ABS with the driver circuits is housed in the shield case SHD, which is in the state before the fixing nails NL are folded, with the spaces SPC put therebetween, and then the nails NL are inwardly folded to be inserted in square-shaped fixing recesses NR provided in the mold case MCA (see FIGS. 6A and 6B). The folded states of the nails NL are shown in FIGS. 7A and 7B.

The fixing hooks HK are fitted with fixing projections HP provided on the mold case MCA (see the side view of FIG. 12B), respectively. In this way, the shield case SHD which holds and houses the liquid crystal display element ABS with the driver circuits is rigidly fixed to the mold case MCA which holds and houses the light guide GLB, cold cathode fluorescent lamp LP and the like.

A thin rubber cushion elongated into the rectangular shape is provided on the four side edges of the bottom surface (rear surface of the reflecting sheet) of the light guide GLB (see FIGS. 38 to 41).

The LCD can be simply disassembled and repaired only by extending the folded nails NL and removing the hooks HK, and accordingly, for example, the cold cathode fluorescent lamp of the backlight BL can be easily replaced. Also in this configuration example, since one side of the LCD is mainly fixed with the hooks HK and the opposed side of the LCD is fixed with the nails NL, the LCD can be disassembled not by removing all of the nails but by removing part of the nails. This makes it easy to repair the LCP and replace the backlight.

In FIG. 15A, reference character CSP designates through-holes. The shield case SHD is mounted with fixed pins, which are prepared upon manufacture, inserted in the through-holes CSP, to accurately set the relative position between the shield case SHD and another part. Insulating spacers SPC1 to SPC4 are composed of insulators, both surfaces of which are coated with adhesive. The insulating spacers SPC1 to SPC4 are used for fixing the shield case SHD and the liquid crystal display element ABS with the driver circuits to each other with gaps equivalent to the thickness of the insulating spacers certainly kept therebetween.

When the module MDL is mounted on an application product such as a personal computer, the through-holes CSP can be taken as a reference for positioning of the module MDL.

Insulating Spacer

As shown in FIGS. 9A and 9B and FIGS. 39 and 40, the insulating spacers SPC (SPC1 to SPC4) are used not only for ensuring insulating between the shield case SHD and the liquid crystal display element ABS with the driver circuits but also for ensuring the positional accuracy of the liquid crystal display element ABS with the shield case SHD and fixing the liquid crystal display element ABS and the shield case SHD to each other with the adhesive double coated tape BAT.

Multilayer Flexible Circuit Board FPC1, FPC2

Figure 17:
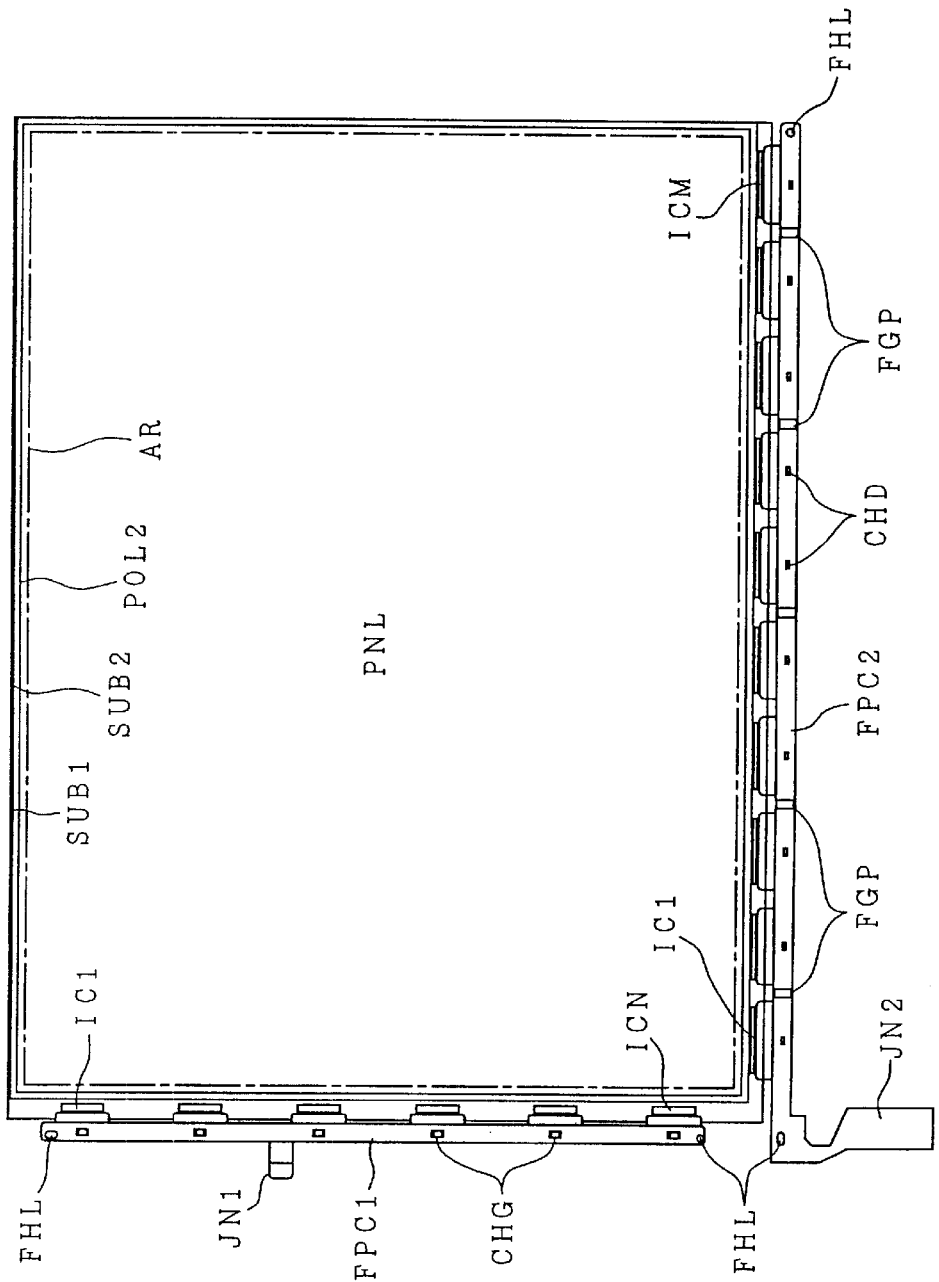
FIG. 17 is a front view of a liquid crystal display element with driver circuit boards, in which the flexible circuit board for gate drive and the flexible circuit board for drain drive in the state before being folded are mounted at the outer peripheral portion of the liquid crystal display element.
Figure 18:
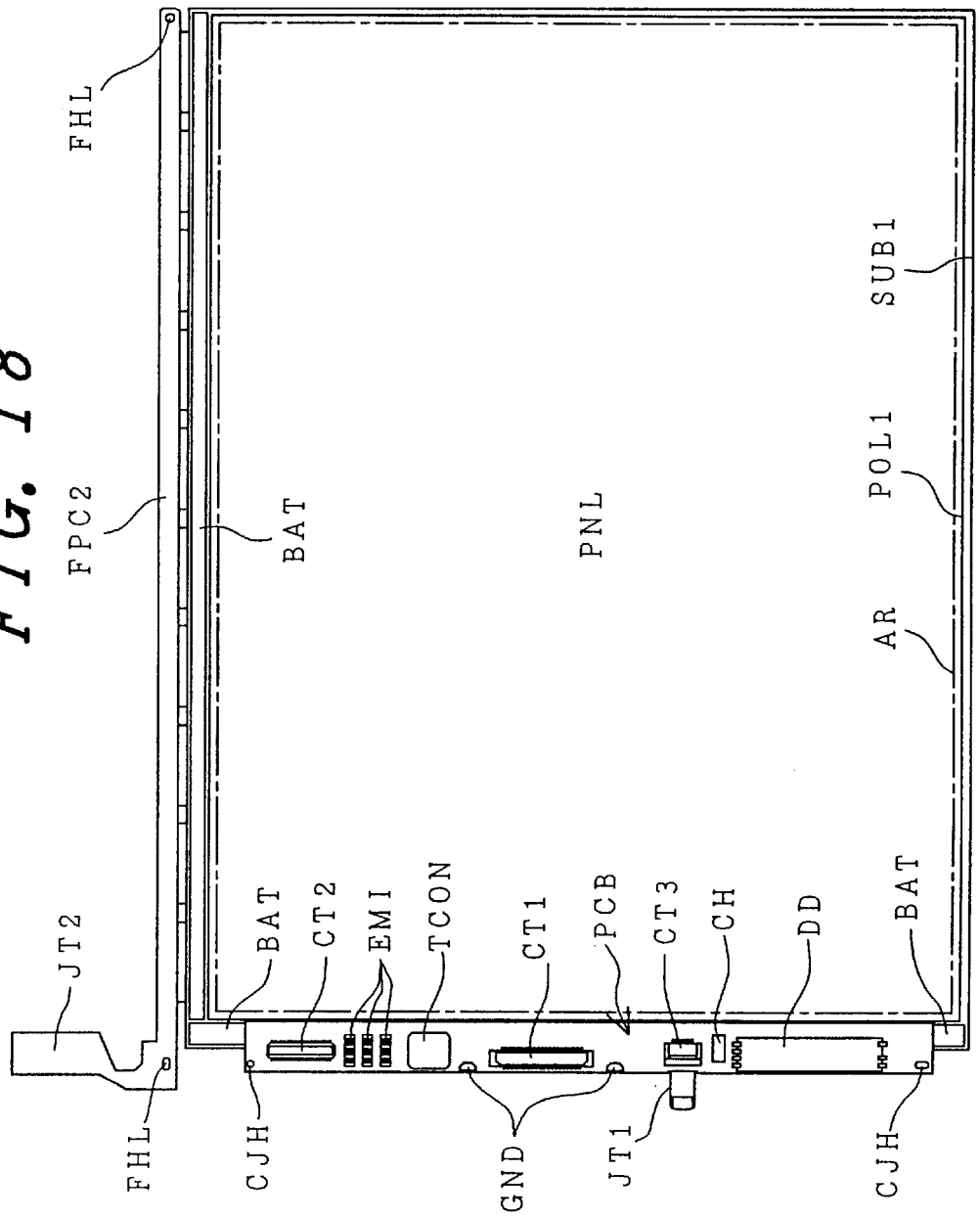
FIG. 18 is a rear view of the liquid crystal display element with driver circuit boards shown in FIG. 17 on which the interface circuit board is mounted.

FIG. 17 is a front view of a liquid crystal display element with driver circuit boards, in which the flexible circuit board FPC1 for gate drive and the flexible circuit board FPC2 for drain drive in the state before being folded are mounted on the outer peripheral portion of the liquid crystal display element PNL.

FIG. 16 is a rear view of the liquid crystal display element with the driver circuit boards shown in FIG. 17, on which the interface circuit board PCB is mounted.

FIGS. 20A and 20B are a rear view and a side view, respectively, showing a state in which the flexible circuit boards FPC1 and FPC2 and the interface circuit board PCB are mounted in the shield case SHD reversely located, and the flexible circuit board FPC2 is folded and the liquid crystal display element PNL is housed in the shield case SHD.

Figure 36:
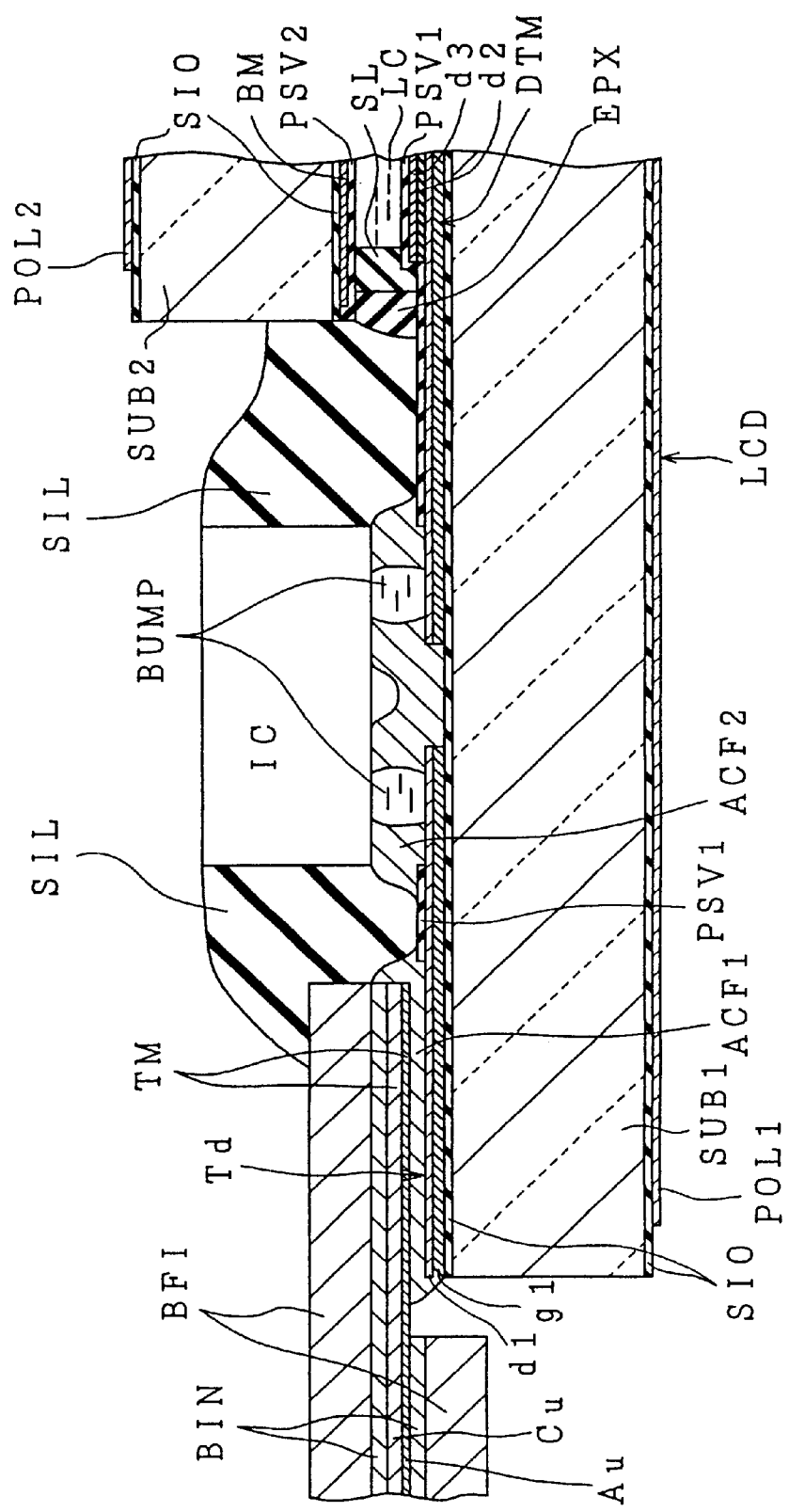
FIG. 36 is a sectional view taken on line 36—36 of the liquid crystal display element shown in FIG. 31.

In FIG. 17, IC chips on the left side are driver IC chips on the vertical scanning circuit side, and IC chips on the bottom side are driver IC chips on the video signal driver circuit side, which are mounted on the substrate by the chip-on-glass method using an anisotropic conductive film (see ACF2 in FIG. 36), ultraviolet hardening agent or the like.

Conventionally, there has been adopted a technique of connecting a tape carrier package (TCP), on which driver ICs have been mounted by the tape-automated-bonding method (TAB), to the liquid crystal display element PNL using an anisotropic conductive film. On the contrary, according to the chip-on-glass method, since driver ICs are directly mounted, it is possible to eliminate the above TAB step and hence to shorten the number of the manufacturing steps, and since the necessity of the tape carrier is eliminated, it is possible to reduce the cost. Further, the chip-on-glass method is suitable for mounting a high-definition/high density liquid crystal element.

Here, the drain driver ICs are arranged in a row along one long side of the liquid crystal display element PNL, and the drain lines are extracted to the one long side. The gate lines are also extracted to one short side; however, for a higher-definition LCD, the gate lines can be extracted to opposed two short-sides.

In the method in which the drain lines DTM or gate lines GTM are alternately extracted, it becomes easy to connect the drain lines DTM or gate lines GTM to output side bumps BUMP of the driver ICs; however, it is required to dispose peripheral circuit boards at outer peripheral portions along opposed two long sides of the liquid crystal display element PNL. This causes a problem that the outer size of the LCD becomes larger than that of the LCP in which the drain lines or gate lines are extracted only to one side. In particular, for an information processing apparatus required to display color images, as the number of colors to be displayed is increased, the number of data lines for display data is increased and thereby the outermost size of the information processing apparatus becomes larger. In this regard, according to this configuration example of the LCD, the drain lines are extracted only to one side using a multilayer flexible circuit board.

Figure 29A:
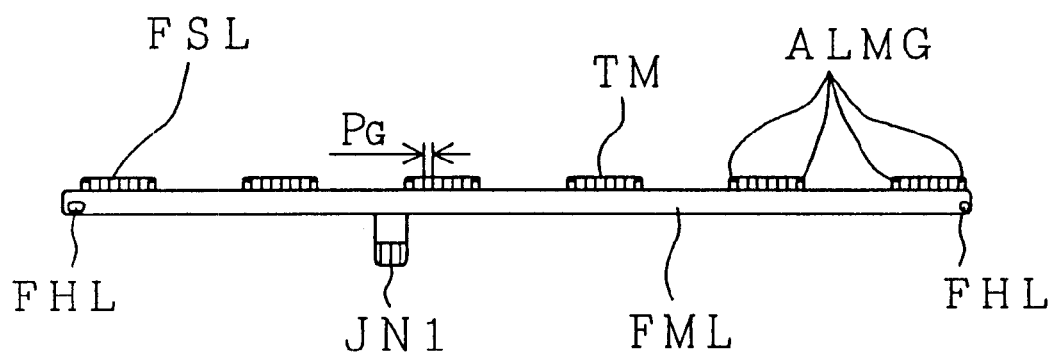
Figure 29B:
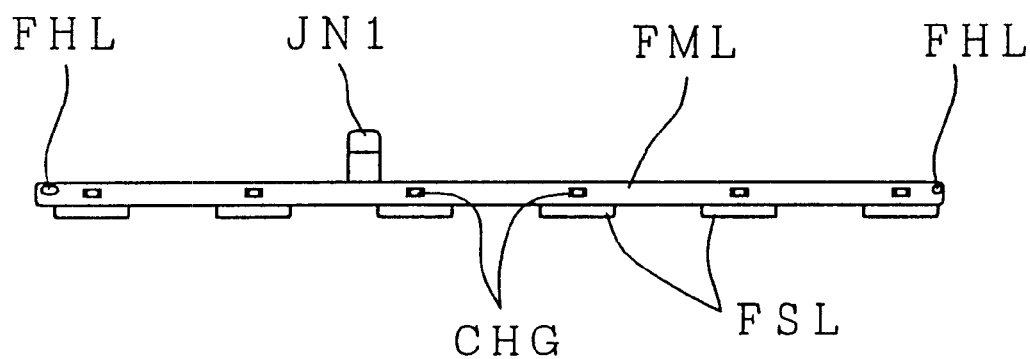

FIGS. 27A and 27B are views illustrating the multilayer flexible circuit board FPC 2 for drain drive, wherein FIG. 27A is a rear view (bottom view), and FIG. 27B is a front view (top view). FIGS. 29A and 29B are views illustrating the multilayer flexible circuit board FPC1 for gate drive, wherein FIG. 29A is a rear view (bottom view), and FIG. 29B is a front view (top view).

Figure 33:
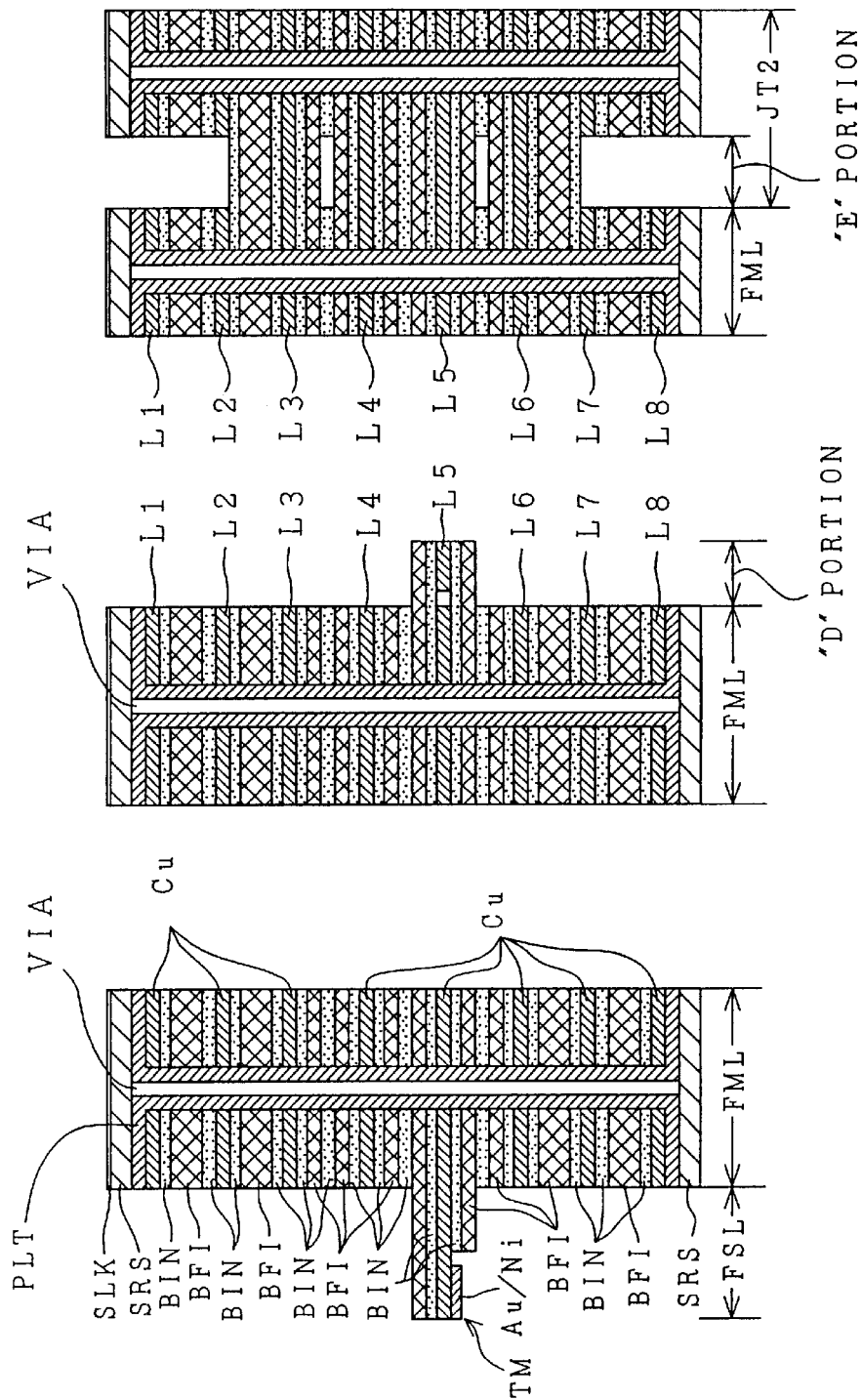

FIGS. 33A to 33C are views illustrating the structure of the multilayer flexible circuit board FPC2 shown in FIGS. 27A and 27B, wherein FIG. 33A is a sectional view taken on line 33A—33A of FIG. 27A; FIG. 33B is a sectional view taken on line 33B—33B of FIG. 27A; and FIG. 33C is a sectional view taken on line 33C—33C of FIG. 27A. It should be noted that the ratio between the scales in the thickness direction and the planar direction is different from the actual one in FIGS. 33A to 33C, that is, the cross-sections of the multilayer flexible circuit board FPC2 are exaggeratedly shown in FIGS. 33A to 33C for an easy understanding.

Figure 30:
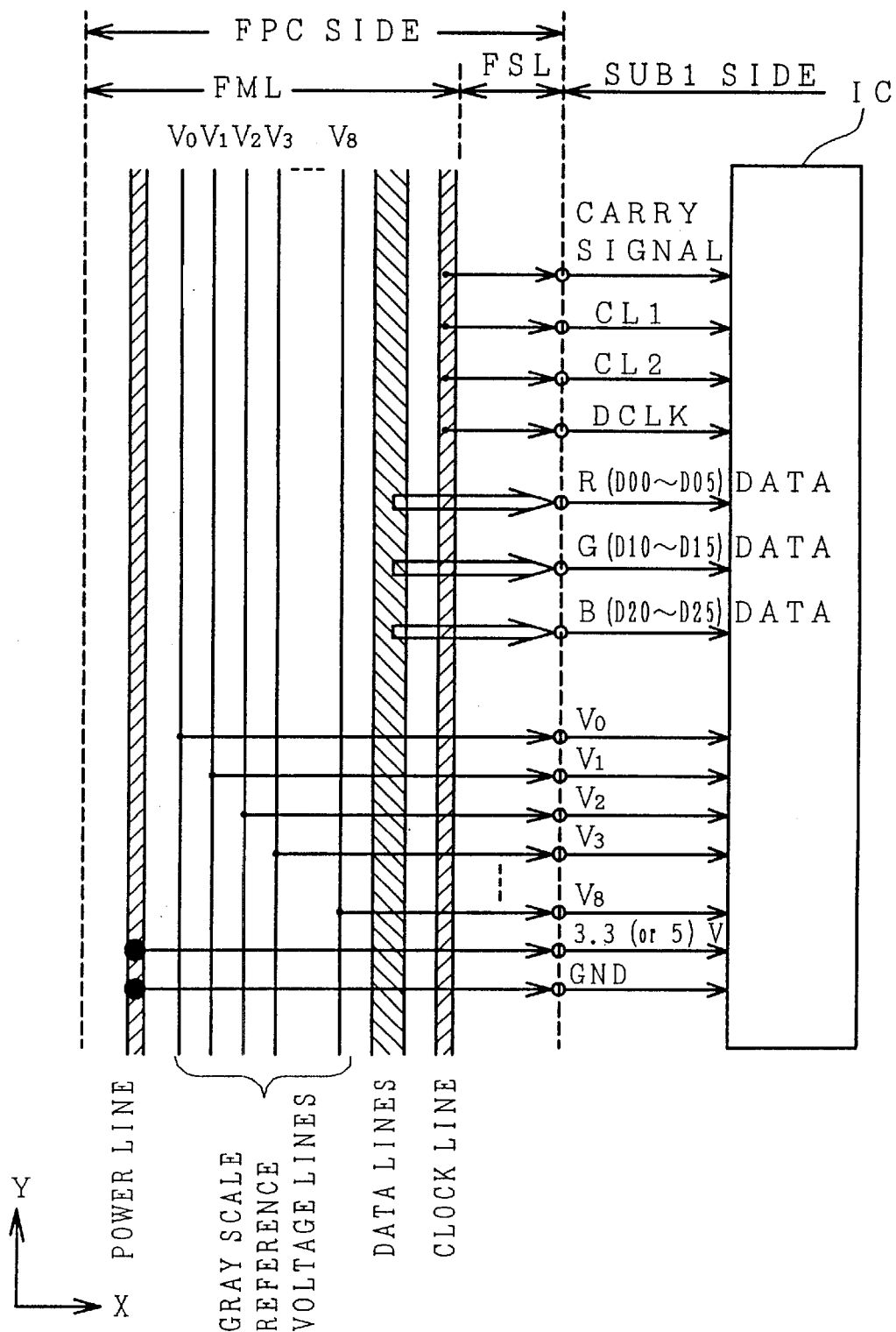
FIG. 30 is a wiring diagram showing a connection relationship between signal lines in the multilayer flexible circuit board and input signals into the driver ICs on the lower substrate.

FIG. 30 is a schematic wiring diagram showing a connection relationship between signal lines in the multilayer flexible circuit board FPC and input signals into the driver ICs on the substrate SUB1. The signal lines in the multilayer flexible circuit board FPC include a first group of the lines parallel to one side of the substrate SUB1 and a second group of the lines perpendicular thereto. The first group of the lines are adapted to supply signals common to the driver ICs, and the second group of the lines are adapted to individually supply signals necessary for the driver ICs. Accordingly, a projecting portion FSL is composed of at least one conductive layer, and a segment FML is composed of at least two conductive layers in which the first group of the lines are electrically connected to the second group of the lines via through-holes. In this configuration example, it is required to shorten the short-side length of the segment FML in order to prevent the segment FML from being brought into contact with the lower polarizer when the segment FML is folded.

To be more specific, as shown in FIGS. 33A to 33C, the segment FML having three or more of conductive layers, for example, eight layers L1 to L8 in this configuration is provided in parallel to one side of the liquid crystal display element PNL and peripheral circuit lines and electronic parts are mounted on the segment FML. The use of such a segment FML makes it possible to keep up with the increased number of data lines by increasing the number of the layers of the segment FML while leaving the outer size of the circuit board as it is.

The conductive layer L1 is for part pads and grounding; L2 is for a gray-scale reference voltage $V_{ref}$ and a 5 V (or 3.3 V) power source; L3 is for grounding; L4 is for data signals and clock signals CL2, CL1; L5 is for extraction wires as the second group of the lines; L6 is for the gray-scale reference voltage $V_{ref}$; L7 is for data signals; and L8 is for the 5 (or 3.3 V) power source.

Figure 35A:
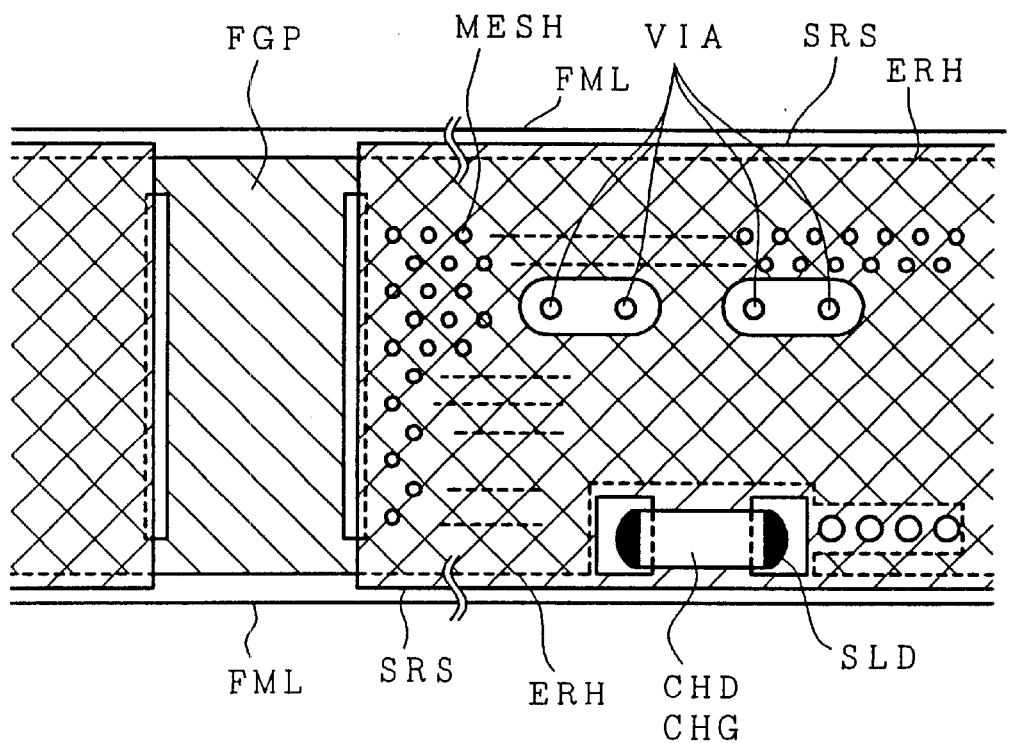

The conductive layers are electrically connected to each other via through-holes VIA (see FIG. 35A). Each of the conductive layers L1 to L8 are formed of a copper (Cu) film for wiring, and the portion of the conductive layer L5 to be connected to input terminal lines Td (see FIGS. 31 and 32) into the driver ICs of the liquid crystal display element PNL is made from a Cu film on which nickel (Ni) and gold (Au) are sequentially plated. Accordingly, the connection resistance between the output terminal TM and input terminal line Td can be reduced.

An intermediate layer formed of a polyimide film BFI is interposed between two adjacent ones of the conductive layers L1 to L8 and is bonded thereto via adhesive layers BIN. The conductive layer is covered with the insulating layer except for the output terminals TM, and particularly, at the multilayer wiring segment FML, each of the uppermost and lowermost layers is coated with a solder resist SRS for ensuring insulation. Further, an insulating silk material SLK is stuck on the uppermost surface.

The multilayer flexible circuit board is advantageous in that the conductive layer L5 connected to the connection terminal portions TM necessary for COG mounting can be provided integrally with the other conductive layers, to thereby reduce the number of parts.

The segment FML, which is composed of three or more of the conductive layers, becomes a hard portion less in deformation, and therefore, positioning holes FHL can be provided in the segment FML. Accordingly, the multilayer flexible circuit board can be folded at a high accuracy and a high reliability without occurrence of deformation at the segment FML. While will be described in detail later, a solid conductive pattern ERH or a mesh conductive pattern ERH provided with a number of fine holes SH each having a diameter of, for example, about 200 $\mu$m (see FIG. 35A) can be disposed on the surface layer L1, and conductive patterns for mounting parts and peripheral lines are wired using the remaining two or more of the conductive layers.

In addition, the projecting portion FSL is not necessarily composed of a single conductive layer but may be composed of two conductive layers. This configuration is useful in the following case. If the pitch of the input terminal lines Td into the driver ICs becomes narrower, the pattern of each of the terminal lines Td and connection terminal portions TM is divided into patterns of a plurality of staggered rows of lines, followed by electrical connection of the lines with an anisotropic conductive film or the like, and when the connection terminal portions TM in the first conductive layer are extracted, the lines in another row are connected to the second conductive layer via the through-holes VIA. Also, the configuration of the two conductive layers of the projecting portion FSL is useful in the case where part of the peripheral lines are disposed in the second conductive layer in the projecting portion FSL.

The configuration of two or less of the conductive layers of the projecting portion FSL improves thermal conductivity upon heat-press at the heat seal. This makes it possible to uniformly apply the pressure upon heat-press, and hence to improve the reliability of electrical connection between the connection terminal portions TM and terminal lines Td. Also, the multilayer flexible circuit board can be accurately folded without giving any bending stress to the connection terminal portions TM. Further, since the projecting portion FSL is semi-transparent, the pattern of the conductive layers can be observed from the upper surface side of the multilayer flexible circuit board, leading to an advantage that the pattern inspection for connection state or the like can be performed from the upper surface side of the circuit board. In FIGS. 27A and 27B, reference character JT2 designates a recess for electrical connection between the flexible circuit board FPC2 for drain drive and the interface circuit board PCB; and CT4 is a flat type connector, provided at the leading end of a projection JT, for electrical connection between the flexible circuit board FPC2 and interface circuit board PCB.

Figure 28A:
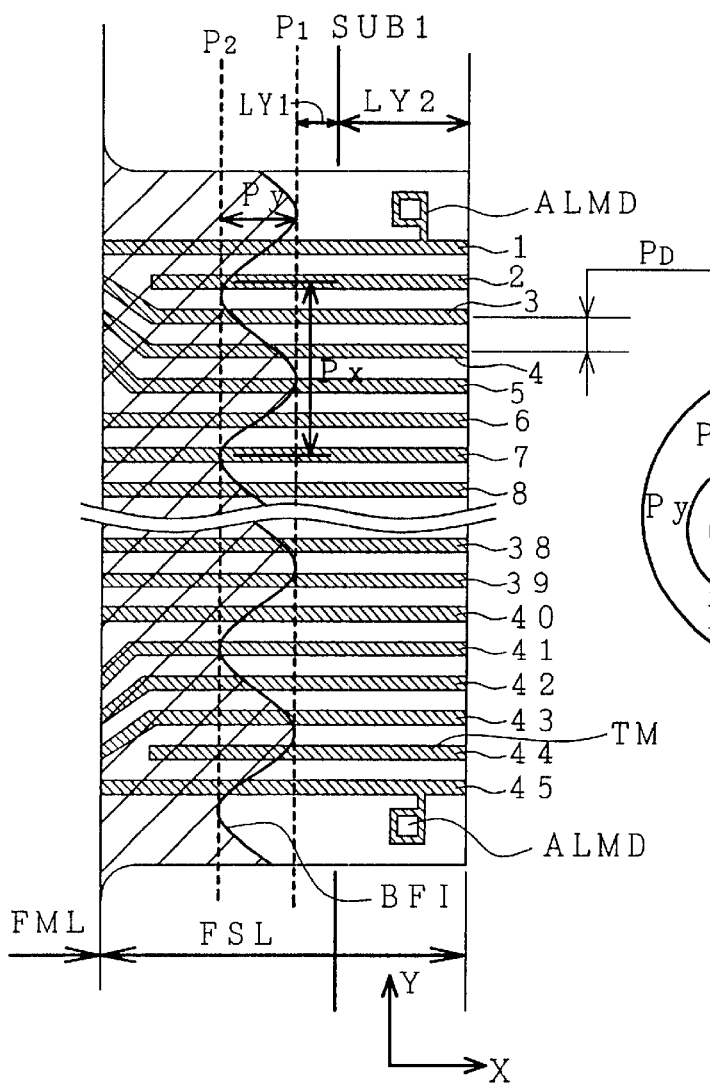
Figure 28B:
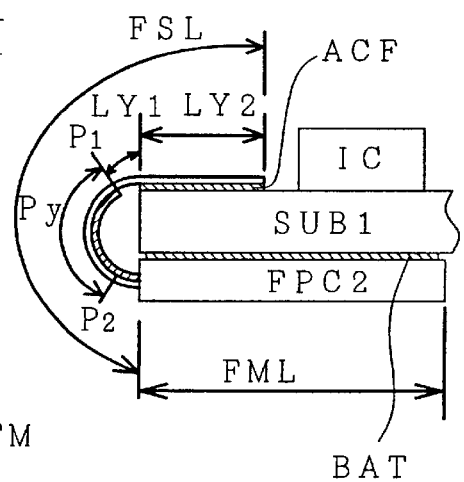

FIGS. 28A and 28B are views illustrating an essential portion of the multilayer flexible circuit board FPC2, wherein FIG. 28A is an enlarged view of a J portion shown in FIG. 27A, and FIG. 28B is a side view showing the mounting of the multilayer flexible circuit board FPC2 and the folded state thereof.

Referring to FIG. 28A, reference character $P_x$ designates a wavelength of the wave at a wavy end of the polyimide film BFI as the cover layer; $P_y$ is a wave height of the wave (amplitude of wave×2); $P_1$ is a straight line connecting the crests of the waves to each other (called crest line of waves); $P_2$ is a straight line connecting troughs of the waves to each other (called trough line of waves); LY2 is a length of the connection between the multilayer flexible circuit board FPC2 and substrate SUB1 (called connection length); and LY1 is a length between the connection, with the substrate SUB1, of the multilayer flexible circuit board FPC2 and the crest line P1 of the waves.

As shown in FIG. 28B, one end of the flexible circuit board FPC2 for drain drive is connected to the terminals for drain lines (Td in FIGS. 31 and 32) at the end portion of the substrate SUB1 of the liquid crystal display element PNL via the anisotropic conductive film ACF; the intermediate portion (wave height: PY) of the circuit board FPC2 is folded downwardly at the outer edge of the associated side of the liquid crystal display element PNL; and the other end (multilayer wiring portion FML) of the circuit board FPC2 is located on the underside of the substrate 1 and is stuck thereon with the adhesive double coated tape BAT. It should be noted that the numbers 1 to 45 assigned to the output terminals TM in FIG. 28A correspond to the numbers 1 to 45 assigned to the terminals Tg shown in FIGS. 31 and 32, and the output terminals TM 1 to 45 are electrically connected to the terminals Tg 1 to 45 via the anisotropic conductive film ACF1, respectively.

As described above, according to this configuration example, in the flexible circuit board FPC2 for inputting signals in which one end is connected to the end portion of the substrate SUB1 of the liquid crystal display element and the other end is folded on the underside (or upper surface) of the SUB1, the end portion of the polyimide film BFI of the projecting portion FSL is formed into a wavy form (or the shape having the crests and troughs, for example, a saw-tooth shape) along the folded line, so that it is possible to disperse the stress concentration at the end portion of the polyimide film BFI as the folded portion, and hence to form a desirable curve at the folded portion. This makes it possible to suppress occurrence of disconnection at the fold portion, and hence to improve the reliability.

In this configuration example, the multilayer flexible circuit board FPC1 for gate drive has three conductive layers L1, L2 and L3. The first layer L1 is for $V_{dq}$ (10 V), $V_{sg}$ (5 V), and $V_{ss}$ (grounding); the second layer L2 is for extraction wiring, a clock signal CL3, FLM, and $V_{dg}$ (10 V); and the third layer L3 is for $V_{EG}$ (−10 to −7 V), $V_{EE}$ (−14 V), $V_{SG}$ (5 V), and common-electrode voltage $V_{com}$.

Next, alignment marks ALMG (see FIG. 29A) and ALMD (see FIG. 28A) on the multilayer flexible circuit board will be described.

In each of the multilayer flexible circuit boards FPC1 and FPC2 shown in FIGS. 27A and 27B to FIGS. 29A and 29B, the length of each output terminal TM is usually set at about 2 mm for ensuring the reliability of connection. However, since the long side of each of the flexible circuit boards FPC1 and FPC2 is longer, there occurs a positional offset between the input terminal line Td and output terminal TM due to a slight offset in rotational position of the major axis, tending to cause a connection failure. The alignment between the liquid crystal display element PNL and each of the flexible circuit boards FPC1 and FPC2 is performed by inserting fixing pins in holes FHL opened at both ends of the circuit board, and aligning several pieces of the input terminal lines Td with the associated output terminals TM.

According to this configuration example, to further improve the alignment accuracy, two pieces of the alignment marks ALMG (ALMD) are provided at each projecting portion FSL of the flexible circuit board FPC1 (FPC2).

In this configuration example, to improve the reliability of connection, dummy lines NC are provided at positions adjacent to a specific number of the input terminals TM and the frame-like alignment marks ALMG are connected to the dummy lines by patterning, wherein the alignment is performed by fitting square solid patterns (on the drain side, see ALC in FIGS. 31 and 32) formed on the opposed substrate SUB1 in the frame-like alignment marks ALMG.

A common-electrode voltage is supplied from conductive beads or paste to a transparent common picture element electrode COM on the substrate SUB2 side through the pattern of the lines Td on the substrate SUB1.

Figure 32:
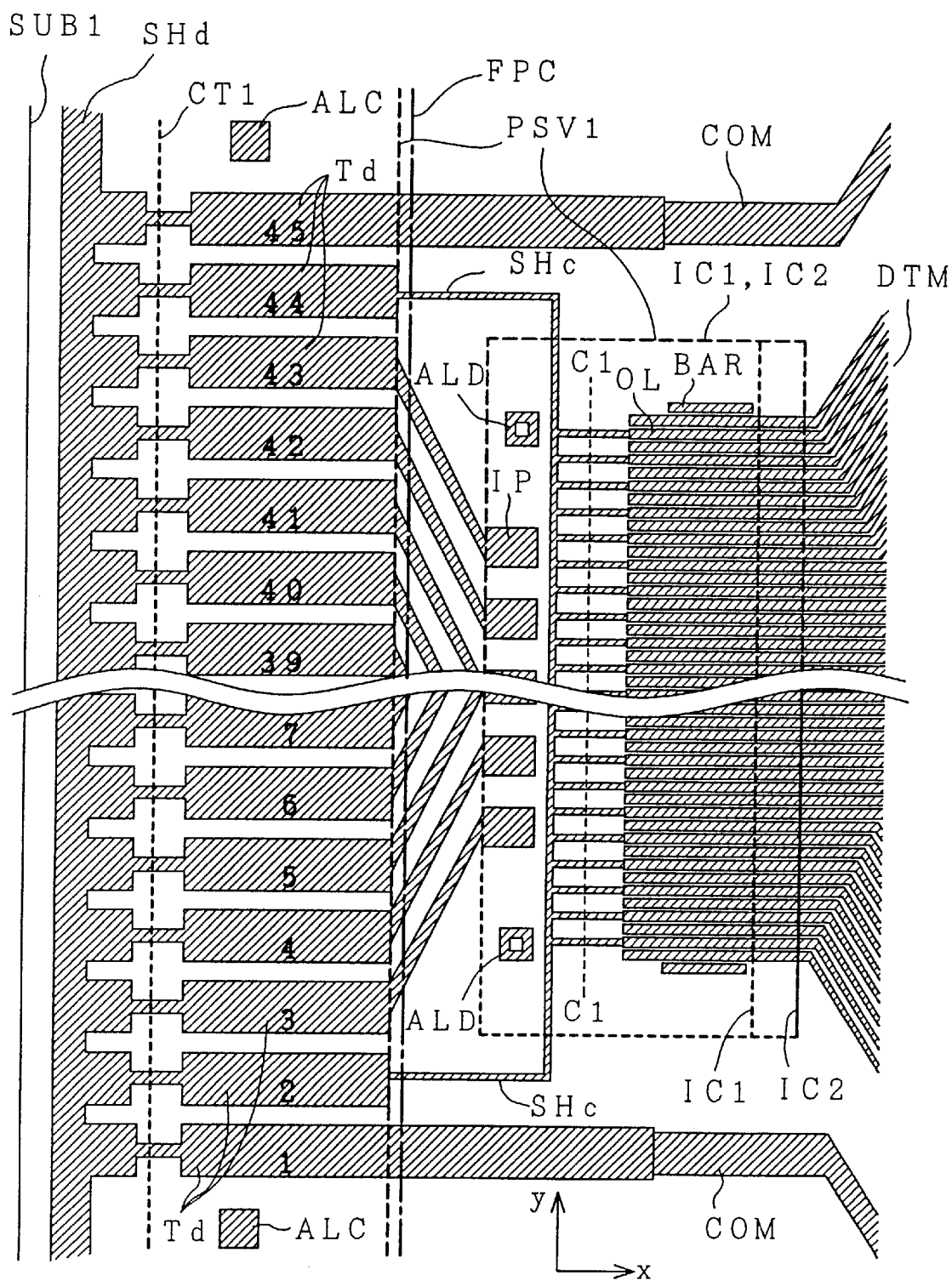
FIG. 32 is a plan view of the peripheral of a portion, on which the drain driver ICs are mounted, of the lower substrate of the liquid crystal display element and the vicinity of the cutting line of the substrate.

The alignment mark ALMG is provided in such a manner as to be connected by patterning to the terminal electrically connected to the transparent common picture electrode COM and is aligned with the square solid pattern ALD formed on the substrate SUB1 (see FIG. 32). Further, in this configuration example, a joint pattern (not shown) is provided for connection of the lower end of the flexible circuit board FPC2 for drain drive with the flexible circuit board FPC1 for gate drive.

Next, the shape of the segment FSL having two or less of the conductive layers will be described.

The projecting portion FSL composed of a single conductive layer or two conductive layers is formed into projecting shapes separated from each other for each drive IC. As a result, it is possible to prevent occurrence of a phenomenon in which the multilayer flexible circuit board is thermally expanded in the major axis direction upon heat-press using a heat tool, to change the pitch $P_G$ ($P_D$) of the terminals TM, thereby causing the peeling and connection failure between the terminals TM and the connection terminals Td. To be more specific, by forming the projecting portion FCL into projecting shapes separated from each other for each drive IC, the deviation in the pitch $P_G$ ($P_D$) of the terminals TM can be set at a value equal to or less the thermal expansion amount of the flexible circuit board corresponding to the length of the arrangement period of the driver ICs. In this configuration example, the shape of the projecting portion FSL is divided into ten pieces along the major axis of the multilayer circuit board, to reduce the thermal expansion amount of the circuit board into one-tenth and also relax the stress applied to the terminals TM, thereby improving the thermal reliability of the liquid crystal display module MDL.

As described above, since the alignment marks ALMG (ALMD) and the projecting portion FSL is formed into projecting shapes separated from each other for each driver IC, even if the number of connection lines and the number of display data are increased, it is possible to reduce the size of the peripheral driver circuit while ensuring the reliability of connection.

Next, the segment FML having three or more of the conductive layers will be described.

Chip capacitors CHG and CHD are mounted on the segments FML of the circuit boards FPC1 and FPC2, respectively. To be more specific, in the multilayer flexible circuit board FPC1 for gate drive, the chip capacitor CHG is soldered between a ground potential $V_{ss}$ (0 V) and a power source $V_{dg}$ (10 V) or between a power source $V_{sg}$ (5 V) and the power source $V_{dg}$. On the other hand, in the flexible circuit board FPC2 for drain drive, the chip capacitor CHD is soldered between the ground potential $V_{ss}$ and a power source $V_{dd}$ (5 V or 3.3 V) or between the ground potential $V_{ss}$ and the power source $V_{dd}$. These capacitors CHG and CHD are mounted for reducing noise superimposed on the power source line.

In this configuration example, the mounting of the chip capacitor CHD is designed such that the chip capacitor CHD is soldered only on the surface conductive layer L1 on one side in order that the capacitor is positioned on the underside of the substrate SUB1 after folding of the flexible circuit board.

Accordingly, it becomes possible to mount the capacitors for smoothing the power source noise on the flexible circuit boards FPC1 and FPC2 respectively while keeping constant the thickness of the liquid crystal display module MDL.

A method of reducing high frequency noise caused by an information processing apparatus on which the LCD is mounted will be described below. Since the shield case SHD side is equivalent to the surface side of the liquid crystal display module MDL and to the front surface side of the information processing apparatus, occurrence of EMI (electromagnetic interference) noise from the surface exerts adverse effect on the service environment of external equipment. To cope with such an inconvenience, according to this configuration example, the surface layer L1 of the conductive segment FML is covered with the solid or mesh pattern ERH for a DC power source as needed.

Figure 35B:
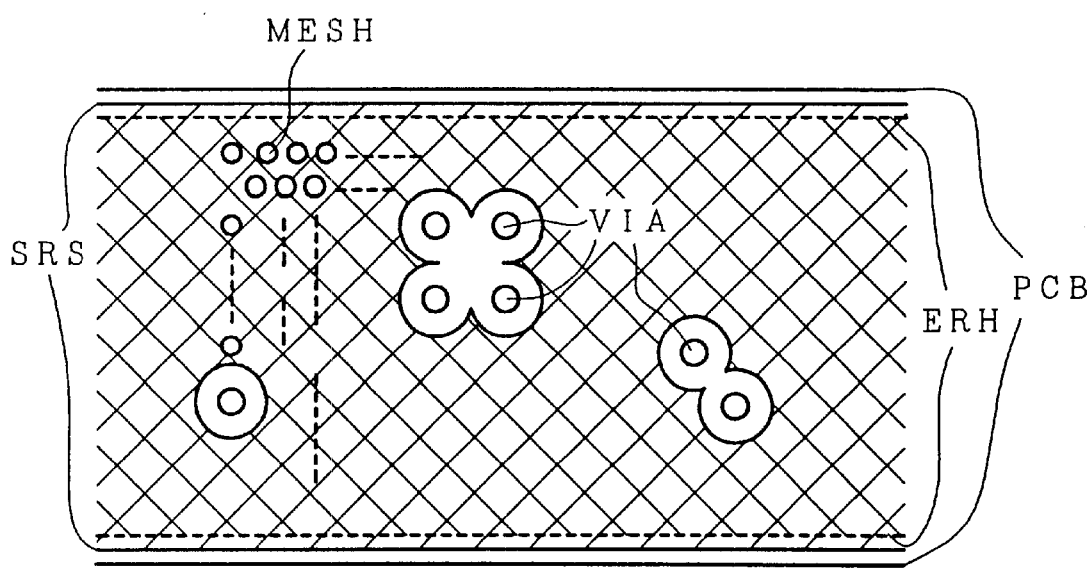
Figure 37A:
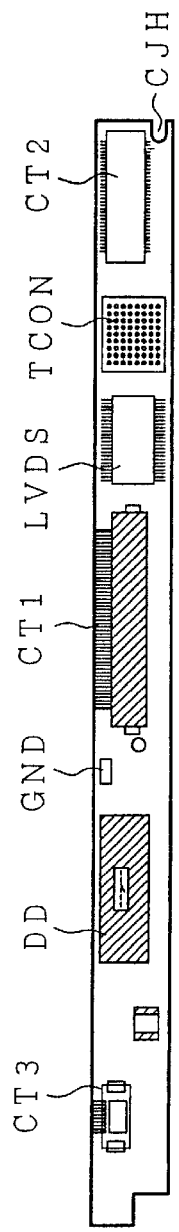
Figure 37B:
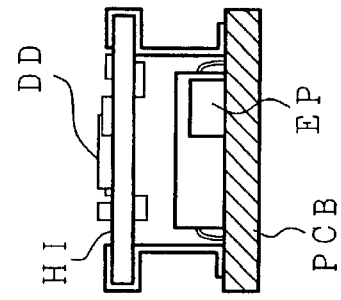
Figure 37C:
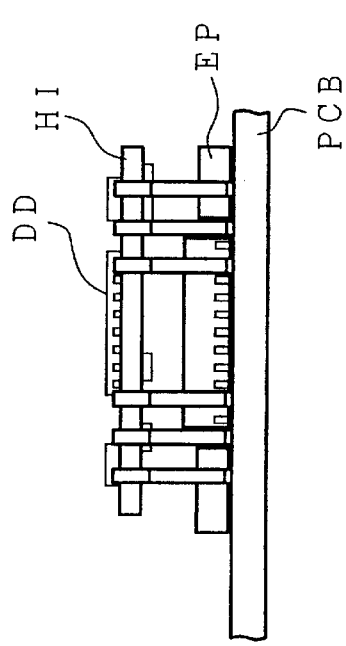
Figure 37D:
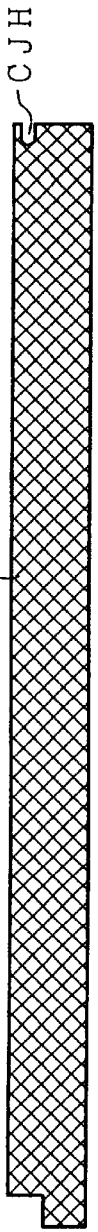

FIGS. 35A and 35B are views illustrating the conductive pattern of a multilayer wiring portion, wherein FIG. 35A is a plan view showing the configuration of the surface conductive layer pattern of the multilayer wiring segment FML portion which is partially shown in FIG. 27B, and FIG. 35B is a partial enlarged view of the interface circuit substrate PCB of FIG. 37D.

The mesh MESH is composed of a number of holes each having a diameter of about 300 μm opened in the surface conductive layer L1. The mesh pattern ERH covers the surface conductive layer L1 substantially over the entire surface except for the through-holes VIA and capacitor CHD portion.

In particular, for the active matrix type liquid crystal display module using thin film transistors, it is difficult to take a measure against the EMI because the module uses high speed clock. To prevent the EMI, at one or more portions near the flexible circuit board FPC2 for drain drive, a grounding wiring (AC establishing potential) is connected to a common frame being sufficiently low in impedance (that is, shield case SHD).

By adopting the structure described with reference to FIG. 1 for such connection, the grounding wiring at a high frequency region is reinforced, and accordingly, the radiation electric field strength can be significantly reduced by connecting the grounding wiring at about five portions for all.

Interface Circuit Board PCB

FIGS. 37A to 37D are views illustrating the interface circuit board having a controller section and a power source, wherein FIG. 37A is a rear view (bottom view); FIG. 37B and 37C are a partial front side view and a partial lateral side view of a hybrid integrated circuit HI mounted thereon; and FIG. 37D is a front view (top view).

In this configuration example, the interface circuit board PCB (hereinafter, also referred to simply as "circuit board PCB") is configured as a multilayer printed circuit board made from glass-reinforced epoxy resin. The circuit board PCB can be configured as a multilayer flexible circuit board; however, since such a circuit board PCB does not adopt the folding structure, it is configured as a relatively inexpensive multilayer printed circuit board.

Electronic parts are all mounted on the bottom surface side of the circuit board PCB, that is, on the rear surface side as seen from the information processing apparatus side. One integrated circuit device TCON as the display control device is disposed on the circuit board PCB, which device is not housed in a package but is directly mounted on the circuit board PCB by a ball-grid-array method.

An interface connector CT1 is mounted on the circuit board PCB at an approximately central portion thereof, and further a plurality of resistors and capacitors, the above-described circuit part EMI for removing high frequency noise, and the like are mounted on the circuit board PCB.

The hybrid integrated circuit HI is configured such that part of the circuits are made in hybrid form and a plurality of integrated circuits and electronic parts mainly for forming supply power sources are mounted on upper and lower surfaces of a small circuit board. One piece of such a hybrid integrated circuit HI is mounted on the interface circuit board PCB.

In this configuration, the electrical connection between the flexible circuit board FPC1 for gate drive and the interface circuit board PCB via the electrically connecting means JN1 is performed using the connector CT3.

Figure 38:
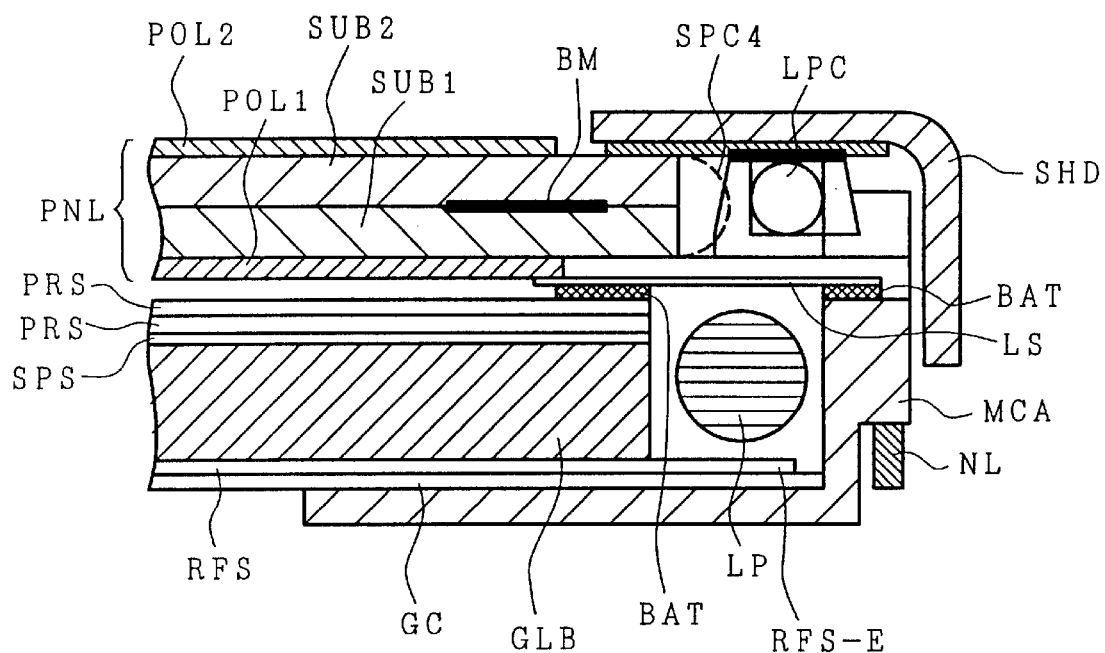
FIG. 38 is a sectional view taken on line 38—38 of the LCD shown in FIG. 11A.
Figure 39:
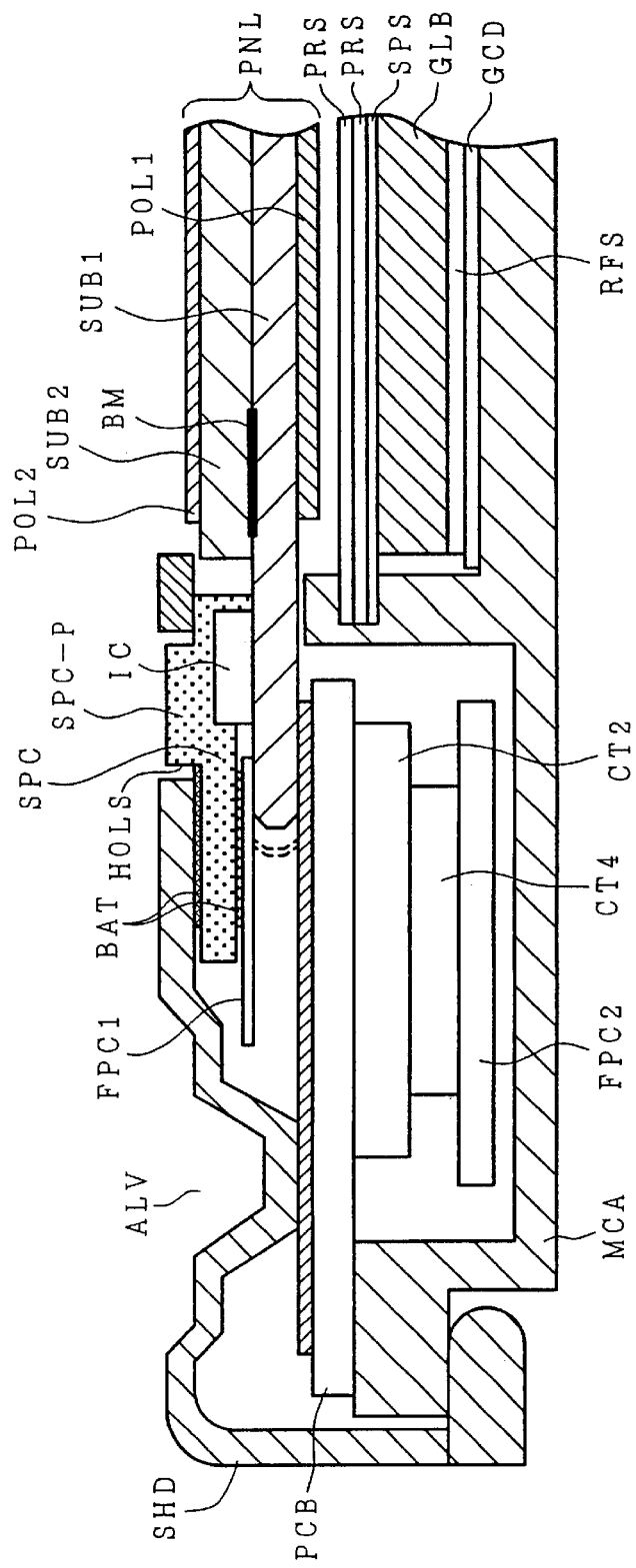
FIG. 39 is a sectional view taken on line 39—39 of the LCD shown in FIG. 11A.
Figure 40:
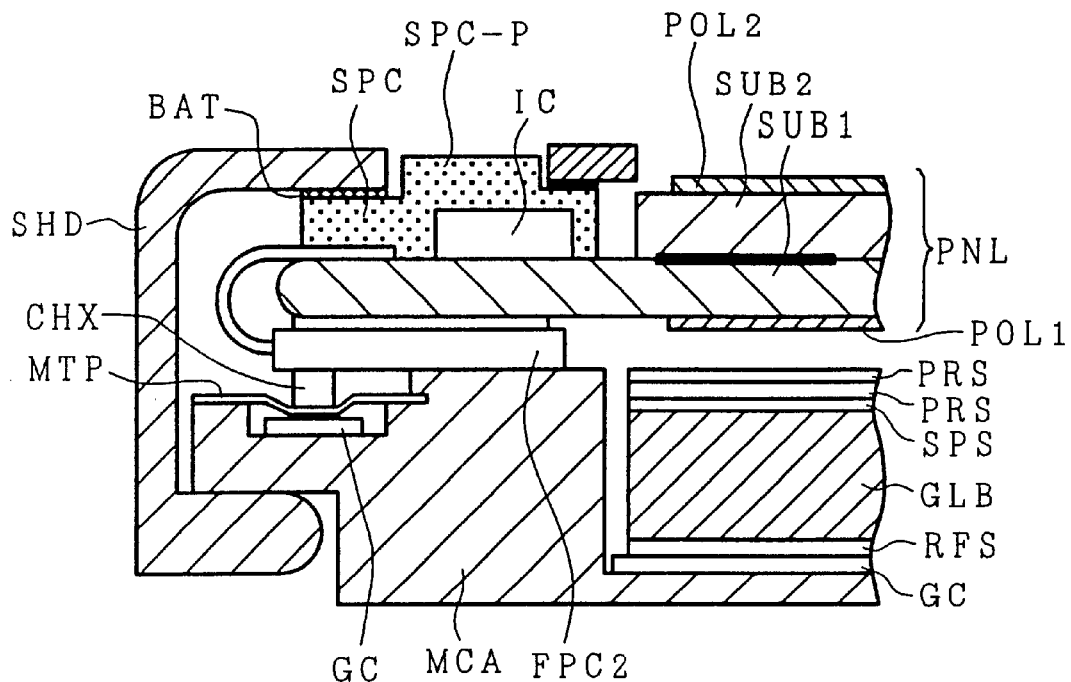
FIG. 40 is a sectional view taken on line 40—40 of the LCD shown in FIG. 11A.
Figure 41:
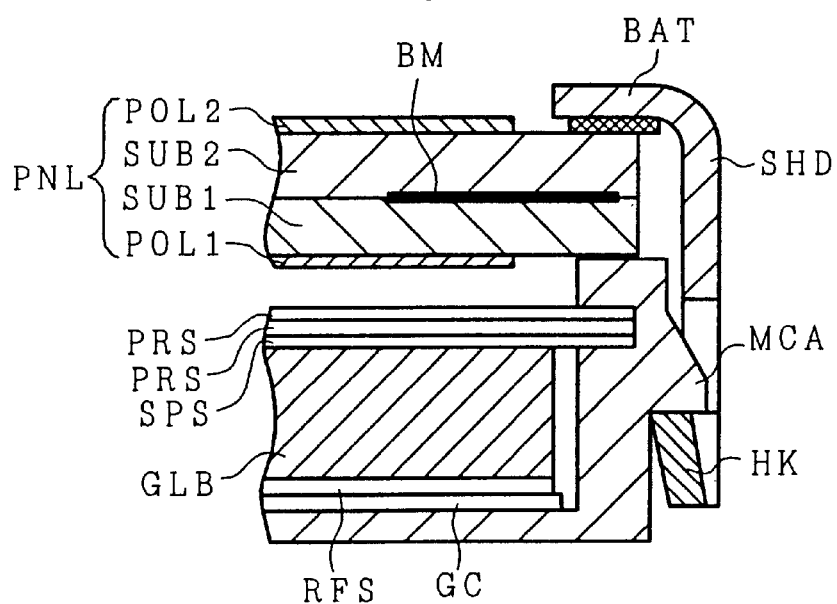
FIG. 41 is a sectional view taken on line 41—41 of the LCD shown in FIG. 11A.

FIG. 38 is a sectional view taken on line 38—38 of FIG. 11A; FIG. 39 is a sectional view taken on line 39—39 of FIG. 11A; FIG. 40 is a sectional view taken on line 40—40 of FIG. 11A; and FIG. 41 is a sectional view taken on line 41—41 of FIG. 11A.

Referring to FIG. 39, when viewed in the direction perpendicular to the substrates SUB1 and SUB2 constituting part of the liquid crystal display element PNL, the interface circuit board PCB is partially overlapped to the liquid crystal display element PNL and is disposed on the underside of the bottom surface of the substrate SUB1. One end of the flexible circuit board FPC1 for gate drive is directly electrically, mechanically connected to the substrate SUB1 of the liquid crystal display element PNL, and the circuit board FPC1 is not folded unlike the circuit board FPC2 for drain drive and is overlapped on the interface circuit board PCB substantially throughout the width of the circuit board FPC1.

By partially overlapping the interface circuit board PCB to the substrate SUB1 of the liquid crystal display element PNL and further overlapping the circuit board FPC1 for gate drive on the interface circuit board PCB as described above, it is possible to reduce the width and area of the frame border portion, and hence to reduce the outer size of the liquid crystal display element and an information processing apparatus such as a personal computer or word processor in which the liquid crystal display element is incorporated as a display section.

The liquid crystal display element PNL is fixed to the shield case SHD by providing the spacer SPC made from resin or the like between the lower substrate SUB1 of the liquid crystal display element PNL and the shield case SHD and interposing the adhesive double coated tapes BAT between the upper surface of the spacer SPC and the shield case SHD and between the lower surface of the spacer SPC and the substrate SUB1.

The shield case SHD has a plurality of holes HOLS opened along the long sides, into which projections SPC2-P formed on the spacer SPC are fitted to prevent the offset of the spacer SPC.

Liquid Crystal Display Element ABS With Drive Circuit Board

Referring to FIG. 39, the flexible circuit board FPC2 for drain drive is folded and bonded on the surface, opposite to the pattern formation surface, of the substrate SUB1. The polarizers POL1 and POL2 extend inwardly up to a position separated from the useful display area AR by only a slight distance (about 1 mm), and the end portion of the circuit board FPC2 is located at a position separated from the above position of the polarizers by a distance of about 1 to 2 mm.

The distance from the end of the substrate SUB1 to the projecting end of the folded portion of the circuit board FPC2 is as very small as about 1 mm, which allows the compact mounting. Accordingly, in this configuration example, the distance from the useful display area AR to the projecting end of the folded portion of the circuit board FPC2 becomes about 7.5 mm.

Figure 34:
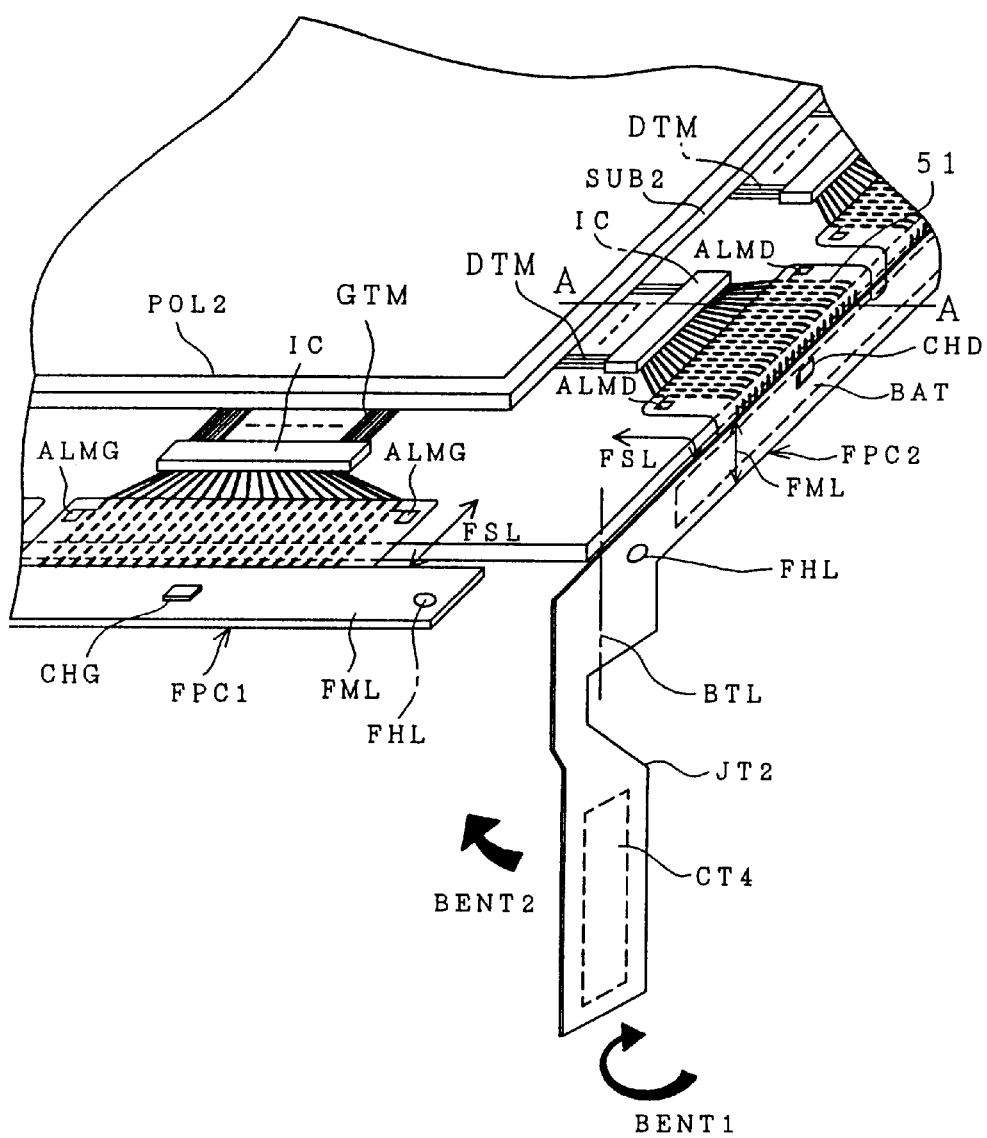
FIG. 34 is a perspective view illustrating the method of mounting the multilayer flexible circuit board FPC2 by folding and a connection between the multilayer flexible circuit boards FPCL and FPC2.

FIG. 34 is a perspective view illustrating the method of mounting the multilayer flexible circuit board by folding.

The flexible circuit board FPC2 for drain drive is connected to the flexible circuit board FPC1 for gate drive using as a joiner the flat connector CT4 provided at the leading end of the projection JT2 which is composed of a flexible circuit board integrated with the circuit board FPC2.

The flat connector CT4 is provided on the surface side of the projection JT2. The projection JT2 is bent in the direction shown by reference character BENT1 around a line BTL and then bent in the direction shown by reference character BENT2, and the flat connector CT4 is connected to the connector CT2 of the interface circuit board PCB (see FIG. 39). In addition, the circuit board FPC2 is fixed on the substrate SUB1 with the adhesive double coated tape interposed between the circuit board FPC2 and the substrate SUB1.

Rubber Cushion GC

The rubber cushion GC is, as shown in FIG. 10 and FIGS. 38 to 41, is interposed between the reflecting sheet disposed on the underside of the light guide GLB and the mold case MCA for fixing the light guide GLB and liquid crystal display element PNL between the shield case SHD and mold case MCA by making use of the elasticity of the rubber cushion GC. While the rubber cushion GC is disposed along the periphery of the light guide GLB, it may be only interposed at positions between the nails NL formed on the shield case SHD and the engagement portions formed on the mold case MCA.

At least one surface of the rubber cushion GC is coated with an adhesive, or adhesive double coated tapes may be stuck on both the surfaces of the rubber cushion GC, and the rubber cushion GC which is stuck on one of the light guide GLB and mold case MCA fixes the other.

Backlight BL

As shown in FIG. 38, the backlight BL includes the light guide GLB, optical sheet members such as the light-diffusing sheet SPC and prismatic sheet PRS, the reflecting sheet RFS provided on the underside of the light guide GLB, the line light source (cold cathode fluorescent lamp) LP provided along one end surface of the light guide GLB, and the light source reflector LS. These members are housed in the recess of the mold case MCA.

The light source reflector LS is disposed over the line light source LP along the major axis of the line light source LP, and is fixed on the edges of the light guide GLB (on the prismatic sheet PRS) and on the edges of the mold case MCA with the adhesive double coated tape BAT.

In the configuration example, the reflecting sheet RFS disposed on the underside of the light guide GLB extends up to the position under the line light source LP, so that the extension portion RFS-E is taken as the lower light source reflector. The lower light source reflector, however, is not necessarily required, the inner surface of the mold case MCA may be configured to have the light reflectance (specular or white color). Since the light emitted from the line light source LP and reflected from the inner wall side opposite to the light guide GLB of the line light source LP is almost blocked by the line light source LP, the reflector is not required to be provided thereat; however, in the case where a gap between the line light source LP and the lower surface of the reflector LS or the mold case MCA becomes large, the inner wall (including the bottom surface) of the mold case MCA may be configured to have the light reflectance (specular or white color) for improving the light usability.

FIGS. 20A and 20B are a front view (on the liquid crystal display PNL side) and a side view of the backlight BL; FIGS. 21A and 21B are a front view and a side view of the backlight shown in FIGS. 15A to 15D from which the prismatic sheet PRS and light-diffusing sheet SRS are removed; and FIGS. 22A and 22B are a front view and a side view of another configuration example of the backlight.

The lamp cables LPC (LPC1, LPC2) of the cold cathode fluorescent lamp as the line light source LP are wired on the side surface of the liquid crystal display element PNL and receive a power from an inverter power source circuit board (not shown) via the lamp connector LCT. In addition, reference character GB designates a rubber bush for holding the lamp cable LPC.

Light-Diffusing Sheet SPS

The light-diffusing sheet SPS is mounted on the light guide GLB, and is adapted to diffuse light having emerged from the upper surface of the light guide GLB for uniformly illuminating the liquid crystal display element PNL.

Prismatic Sheet PRS

In this configuration example, the prismatic sheet PRS is a combination of two prismatic sheets each having a smooth bottom surface and a prismatic top surface, and is mounted on the light-diffusing sheet SPS such that the prismatic grooves of the stacked two prismatic sheets are made perpendicular to each other. The prismatic sheet PRS is adapted for collecting the light having emerged from the light-diffusing sheet SPS toward the liquid crystal display element PNL, to improve the luminance of the backlight BL, thereby reducing the power consumption of the backlight, and realizing the miniaturization and lightweightness of the liquid crystal display module.

Each of the light-diffusing sheet SPS and prismatic sheet PRS has, at the end portions of one side, two pieces of fixing small holes SLV which are to be aligned with each other when both the sheets are mounted. On the other hand, the mold case MCA has, at the corresponding end portions of one side, pin-like projections MPN which are to be inserted in the small holes SLV of both the sheets SPS and PRS via sleeves SLV for alignment of both the sheets with the mold case MCA. The sleeve SLV is made from an elastic body such as silicon rubber, and it has an inside diameter smaller than the outside diameter of the projection MPN for preventing the falling of the sleeve SLV from the projection MPN.

Figure 24:
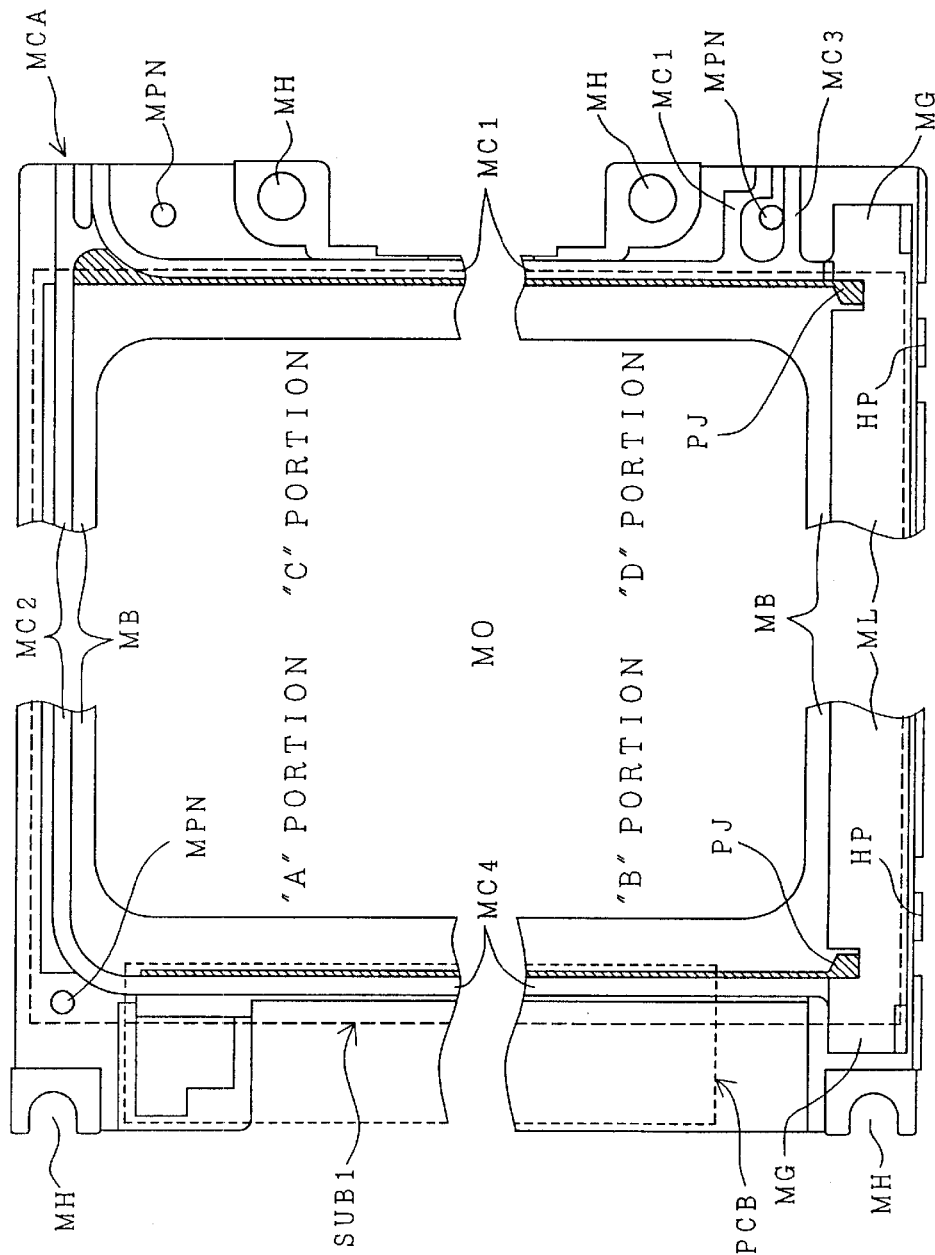
FIG. 24 is an enlarged view illustrating each corner of the mold case shown in FIG. 23A.

As shown in FIG. 24, the light-diffusing sheet SPS and prismatic sheet PRS can be more accurately aligned with the mold case MCA by inserting, on the side opposite to the line light source LP, the small holes provided in both the light-diffusing sheet SPS and prismatic sheet PRS around the pin-like projections MPN integrally provided on the end portions of the above side of the mold case MCA.

Since the projections MPN are located at positions not overlapped in a plan view to the circuit board PCB under the flexible circuit board FPC1 for gate drive, the thickness of the liquid crystal display module is not increased by provision of the projections MPN.

Mold Case MCA

FIGS. 23A to 23E are views illustrating the mold case MCA, and FIG. 24 is an enlarged view of an A portion, B portion, C portion and D portion shown in FIG. 23A. The mold case MCA is formed by integral molding from a synthetic resin using one mold, and is used as the backlight housing lower case for holding the cold cathode fluorescent lamp LP, lamp cable LPC, light guide GLB and the like.

The mold case MCA is rigidly integrated with the metal made shield case SHD by means of respective fixing members and the action of the elastic body, to improve the resistance to vibration and thermal shock of the liquid crystal display module MDL, thereby enhancing the reliability thereof.

The bottom surface of the mold case MCA has, at the central portion excluding the peripheral frame-like portion, a large opening MO having an area being as large as half or more the total area of the bottom surface. The provision of such a large opening MO prevents an inconvenience that the bottom surface of the mold case MCA may be bulged, after assembly of the mold case MCA, by a force applied to the bottom surface of the mold case MCA from top to bottom in the vertical direction due to the action of the rubber cushion GC mounted between the backlight BL and mold case MCA, thereby suppressing the increase in maximum thickness of the mold case MCA. This contributes to the thinning and lightweightness of the liquid crystal display module MDL.

In FIG. 24, reference character MCL designates cutouts (including a cutout for connection of the connector CT1) provided in the mold case MCA at positions corresponding to mounting positions of heat-generation parts (the power source circuit DC—DC converter DD shown in FIGS. 37A to 37D and the like) of the interface circuit board PCB.

The provision of the cutouts at the positions corresponding to the mounting positions of the heat-generation parts on the interface circuit board PCB without covering them with the mold case MCA is effective to enhance the heat radiation of the heat-generation parts on the interface circuit board PCB. Since the integrated circuit TCON for display control is also regarded as the heat-generation part, a cutout may be provided in the mold case MCA at the corresponding position over the integrated circuit TCON.

In FIGS. 23A to 23E and FIG. 24, reference character MH designates four pieces of mounting holes used for mounting the liquid crystal display module MDL on an application apparatus such as a personal computer. The shield case SHD has mounting holes HLD corresponding to the mounting holes MH formed in the mold case-MCA. The module MDL is fixedly mounted on an application apparatus by means of screws or the like passing through these mounting holes MH and HLD.

Figure 25A:
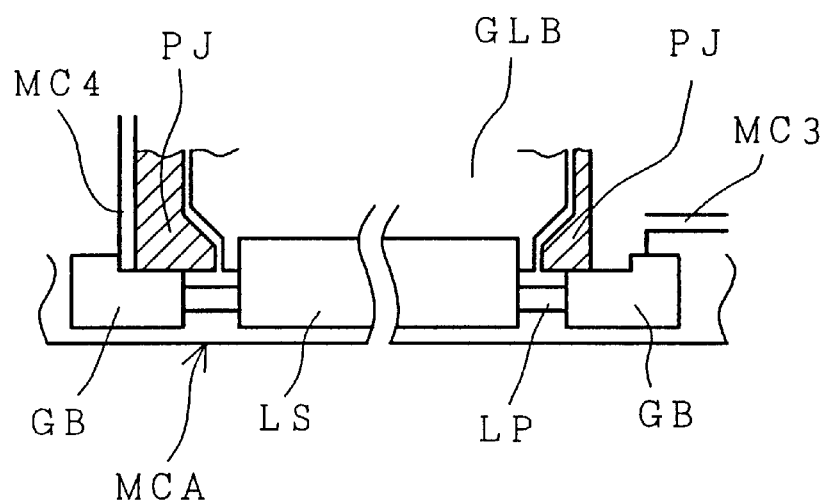
Figure 25B:
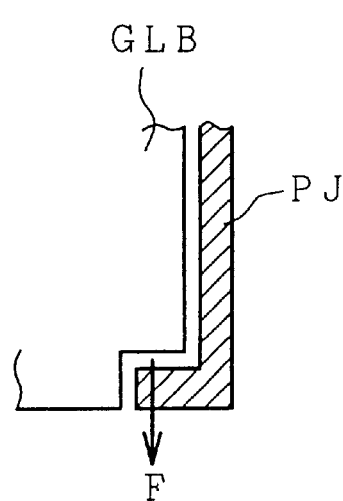
Figure 25C:
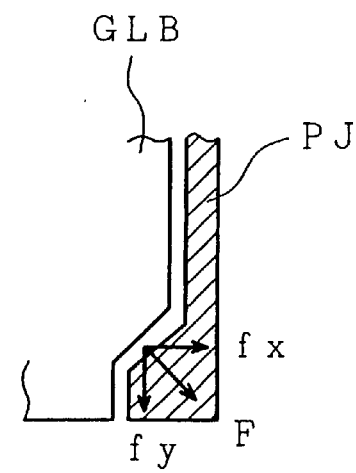
Figure 26A:
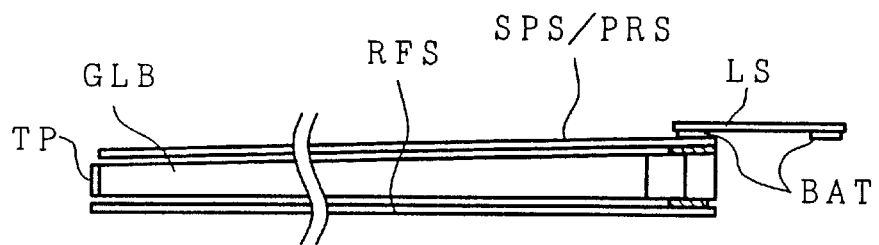
FIGS. 26A and 26B are a side view and a top view illustrating a state in which a reflector is disposed in the line light source.
Figure 26B:
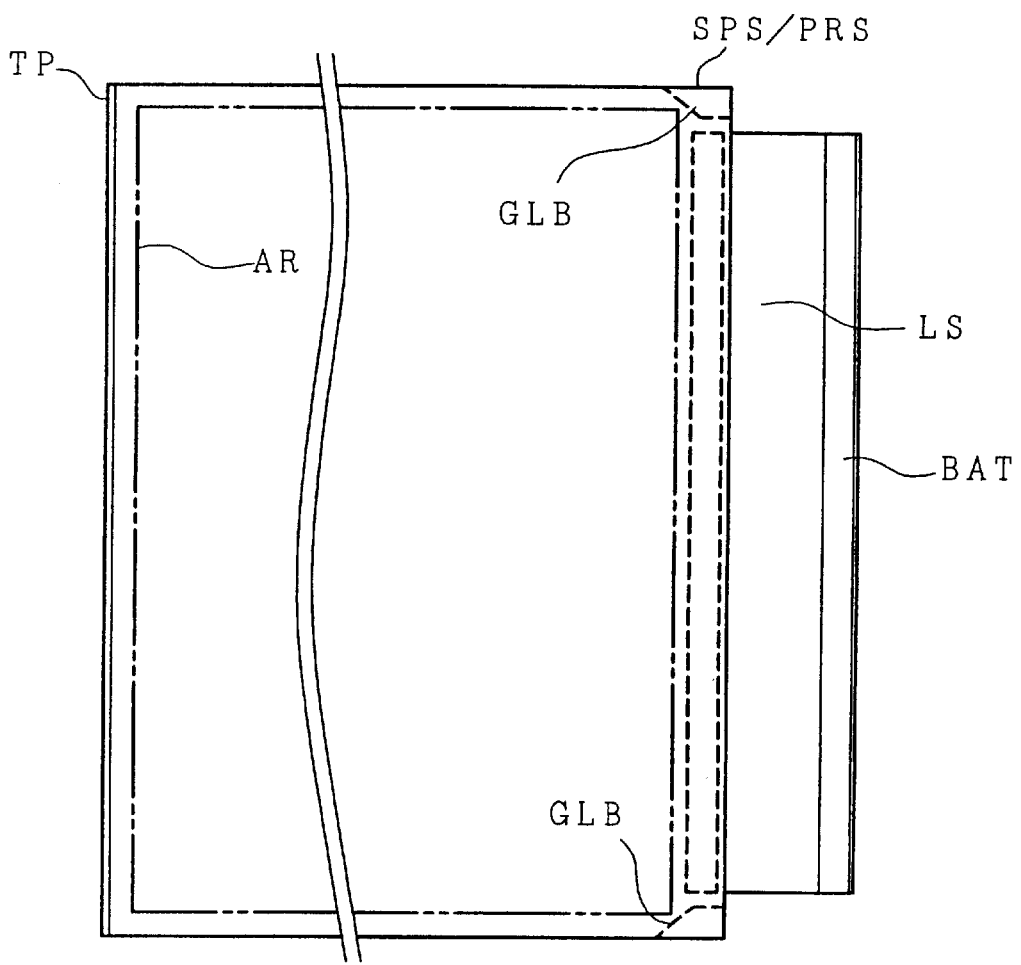

In FIGS. 23A to 23E and FIG. 24, reference character MB designates a holding portion for holding the light guide GLB; PJ is a positioning portion; and MC1 to MC4 are housing portions for housing the lamp cables LPC1 and LPC2. Housing of Light-Guide GLB in Mold Case MCA FIGS. 25A to 25C are views illustrating the housing portion for housing the light-guide GLB in the mold case MCA, wherein FIG. 25A is a plan view of an essential portion; FIG. 25B shows the conventional structure at each corner; and FIG. 25C shows the structure of each corner according to this configuration example.

As shown in FIG. 25A, four corners of the light guide GLB are beveled into straight-slop portions, and the straight-slope positioning portions PJ corresponding to the straight-slope portions of the light guide GLB are formed at the four corners of the mold case MCA. According to the conventional structure, as shown in FIG. 25B, since the positioning portion PJ at each corner has a right-angled step, it does not sufficiently exhibit the resistance against a force F applied along the side of the light-guide GLB (in the y direction), whereby the positioning portion PJ may be broken by vibration and shock applied from the heavy light guide GLB.

According to this configuration example, as shown in FIG. 25C, since each corner of the light guide GLB and the positioning portion PJ at the corresponding corner of the mold case MCA are sloped, a force applied to the positioning portion PJ is dispersed into two-directional components fx and fy, to prevent the breakage of the positioning portion PJ, thereby improving the reliability of housing.
Arrangement of Cold Cathode Fluorescent Lamp LP and Light Source Reflector LS As shown in FIG. 25A, the light source reflector LS is fixed on the upper side of the line light source (cold cathode fluorescent lamp) LP using an adhesive double coated tape in such a manner as to bridge the light guide GLB and mold case MCA together. The cross-sectional structure of such a portion is shown in FIG. 38.

To be more specific, as shown in FIG. 38, the cold cathode fluorescent lamp LP as the line light source is disposed in proximity to one end surface of the light guide GLB, and the light source reflector LS is fixed on the upper side of the line light source LP using the adhesive double coated tape BAT.

Figure 48:
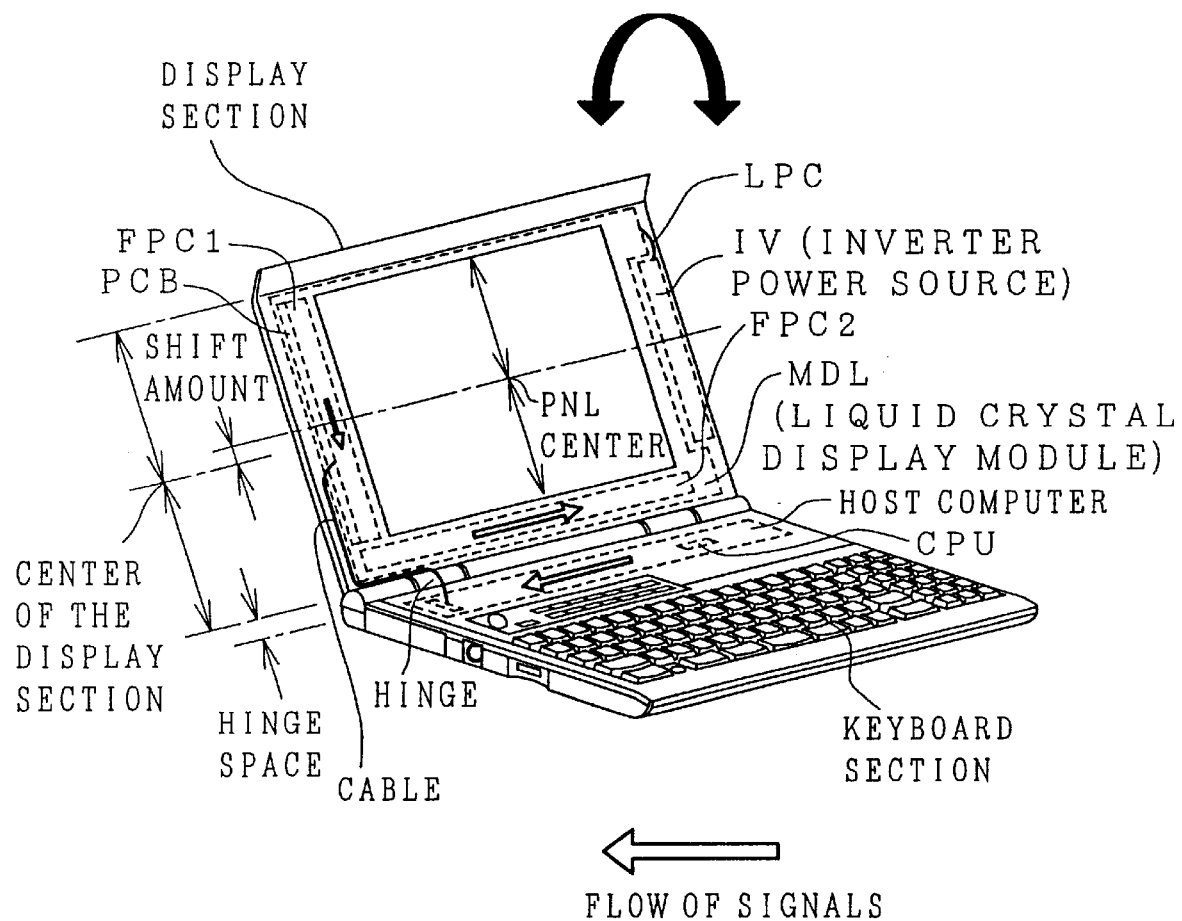
FIG. 48 is a perspective view of a notebook type personal computer or word processor on which the liquid crystal display module is mounted.
Figure 49:
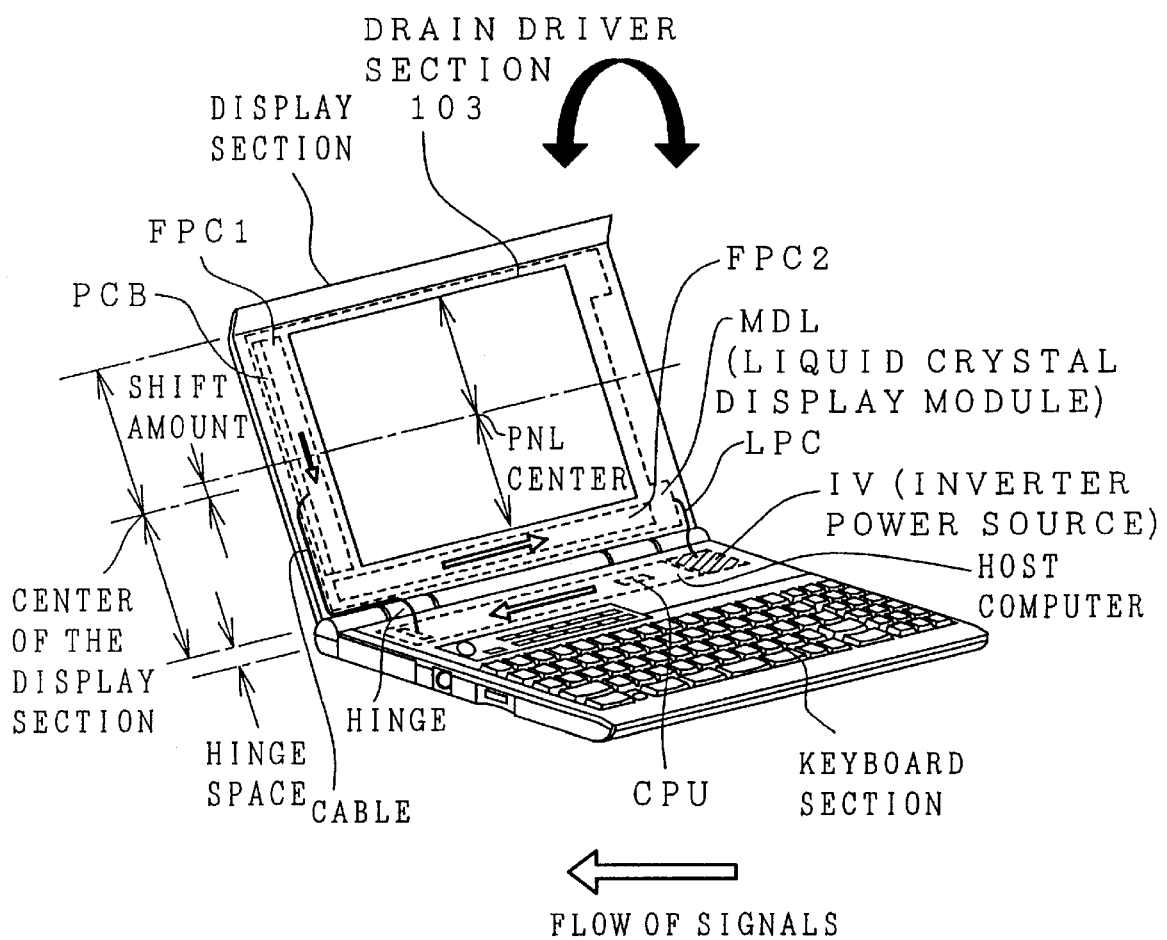
FIG. 49 is a perspective view of another notebook type personal computer or word processor on which the liquid crystal display module is mounted.

In the example shown in FIGS. 20A and 20B and FIGS. 21A and 21B, the cold cathode fluorescent lamp LP constituting part of the backlight BL is disposed along a long side of the liquid crystal display module MDL under the display region. With this arrangement, in the case where the LCD is mounted on an information processing apparatus such as a personal computer or word processor as shown in FIGS. 48 and 49, the cold cathode fluorescent lamp LP is located under the long side of the display section of the processing apparatus. In the example shown in FIGS. 15A to 15D in which the inverter power source IV is disposed at the inverter housing section MI in the display section, the lamp cable LPC1 is laid out along two sides, left and upper sides of the liquid crystal display module MDL and the lamp cable LPC2 is laid out along the right side of the module MDL.

On the other hand, in the example shown in FIGS. 22A and 22B in which the inverter power source IV is disposed in the key board, the lamp cable LPC1 is laid out along three sides, left, upper and right sides of the liquid crystal display module MDL and both the lamp cables LPC1 and LPC2 extend from the lower right portion of the module MDL.

Figure 44:
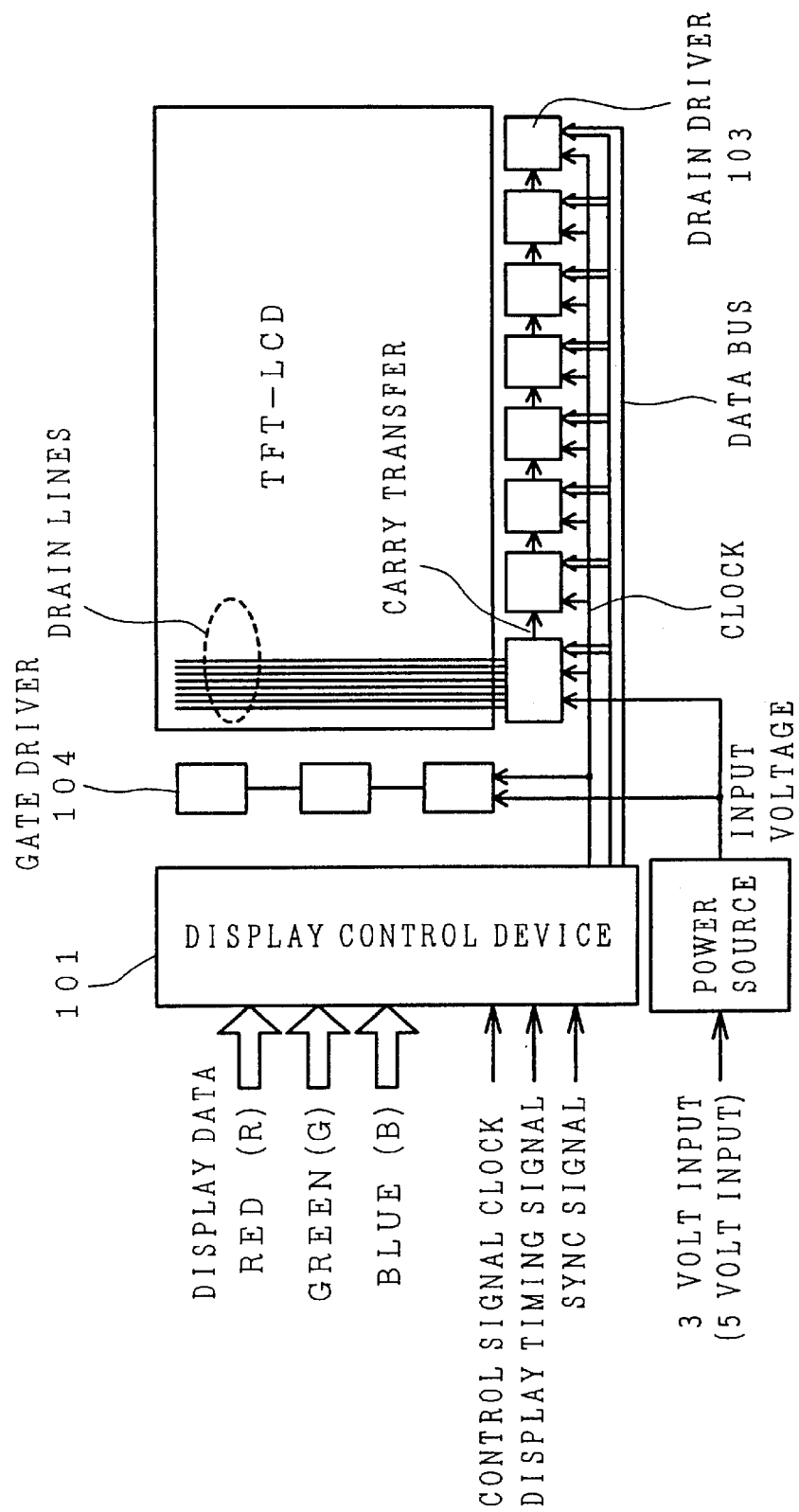
FIG. 44 is a diagram illustrating the flow of display data and clock signals to gate drivers and drain drivers.

The layout of the cold cathode fluorescent lamp LP under the display section of the liquid crystal display module MDL is advantageous in that even if the inverter power source IV is disposed in the key board section as shown in FIG. 44, the length of the high voltage side lamp cable LPC2 of the cold cathode fluorescent lamp LP can be shortened, to reduce the impedance causing noise and a change in waveform, thereby improving the startability of the cold cathode fluorescent lamp LP. In addition, by disposing the inverter power source IV on the key board side, the width of the display section can be further reduced. The layout of the cold cathode fluorescent lamp LP under the display section is also effective to relax the shock due to opening/closing of the display section, and hence to improve the reliability. Further, in such a layout, since the center of the display screen of the liquid crystal element PNL is shifted upwardly, there can be obtained an effect of preventing the viewing to the lower portion of the display screen from being obstructed by the operator's hands operating the key board.

In the above configuration, the cold cathode fluorescent lamp LP is disposed under the lower long side of the liquid crystal display element PNL; however, it may be of course disposed over the upper long side or outside each short side of the element PNL.

Figure 43:
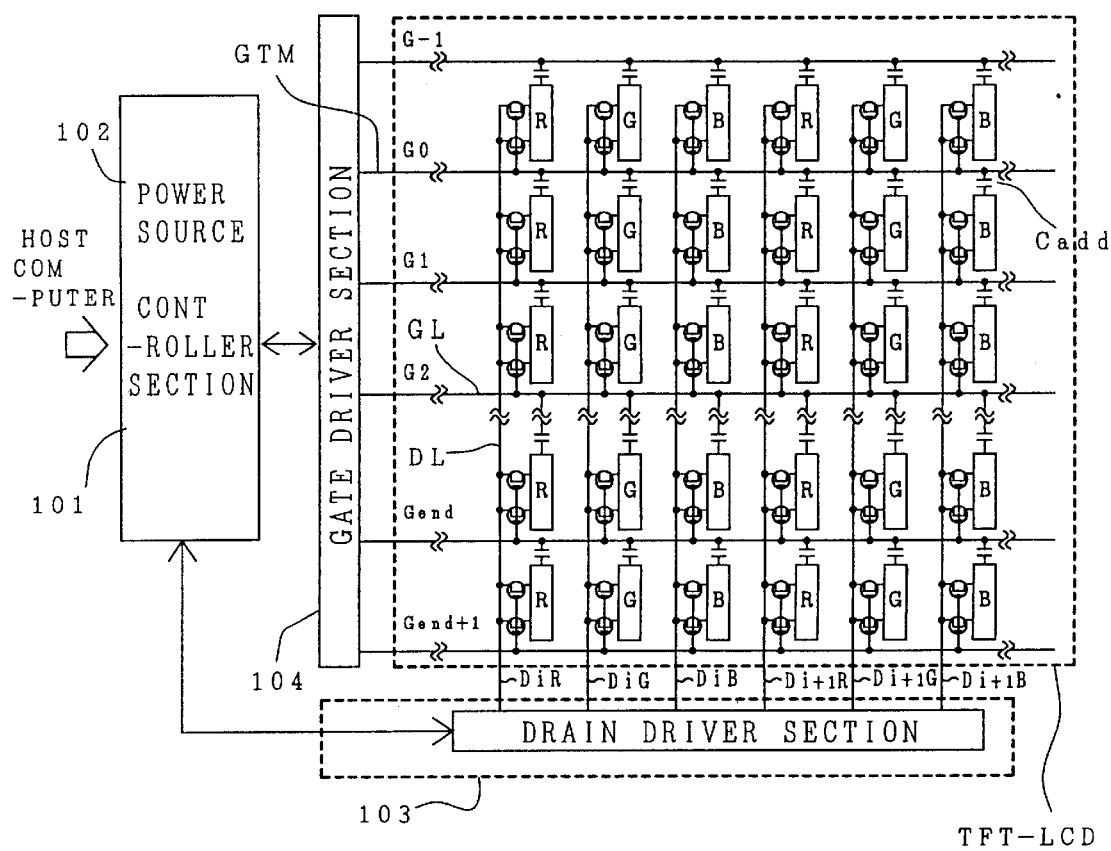
FIG. 43 is a block diagram showing an equivalent circuit of the liquid crystal display module.

FIG. 42 is a block diagram illustrating the liquid crystal display element PNL and the circuit configuration of driver circuits and the like disposed at the outer peripheral portion of the liquid crystal display element PNL, and FIG. 43 is a block diagram illustrating the equivalent circuit of the liquid crystal display module. In this configuration, the drain driver section 103 is disposed only on the underside of the thin film transistor (TFT) type liquid crystal display element PNL (TFT-LCD), and the gate driver section 104, controller section 101 and power source 102 are disposed on one side surface portion of the liquid crystal display element (the number of picture elements: 800×600 pieces) specified under the XGA Specification.

The drain driver section 103 is mounted on the above-described multilayer flexible circuit board which is disposed in the folded manner. The interface circuit board PCB on which the controller section 101 and power source 102 are mounted is disposed on the rear surface of the gate driver section 104 disposed at the outer peripheral portion along the short side of the liquid crystal display element PNL. The reason for this is that since the information processing apparatus has a limitation in terms of the lateral width, the lateral width of the liquid crystal display module MDL constituting the display section of the processing apparatus is also required to be made as small as possible.

As shown in FIG. 43, a thin film transistor TFT is disposed at an intersection region formed by adjacent two drain signal lines DL and adjacent two gate signal lines GL intersecting the two drain signal lines. The drain electrode and gate electrode of the thin film transistor TFT are connected to the associated drain signal line DL and gate signal line GL, respectively.

The source electrode of the thin film transistor TFT is connected to a picture element and the liquid crystal layer is provided between the picture electrode and common electrode, so that a liquid crystal capacitance ($C_{LC}$) is connected between the picture electrode and the source electrode of the thin film transistor TFT. The thin film transistor TFT conducts when a positive bias electrode is applied to the gate electrode, and it does not conduct when a negative bias electrode is applied thereto. A holding capacitance $C_{add}$ is connected between the source electrode of the thin film transistor and the preceding gate signal line.

It should be noted that in this LCD, since the polarity of the bias voltage applied between the source and drain electrodes is inverted during operation of the LCD, the source or drain electrode is changed into the other depending on the inverted polarity of the bias voltage during operation of the LCD. However, for convenience, the following description will be made with one of the electrodes taken fixedly as the source electrode and the other taken fixedly as the drain electrode.

FIG. 44 is a diagram illustrating the flow of display data and clock signals to the gate drivers and drain drivers.

Figure 45:
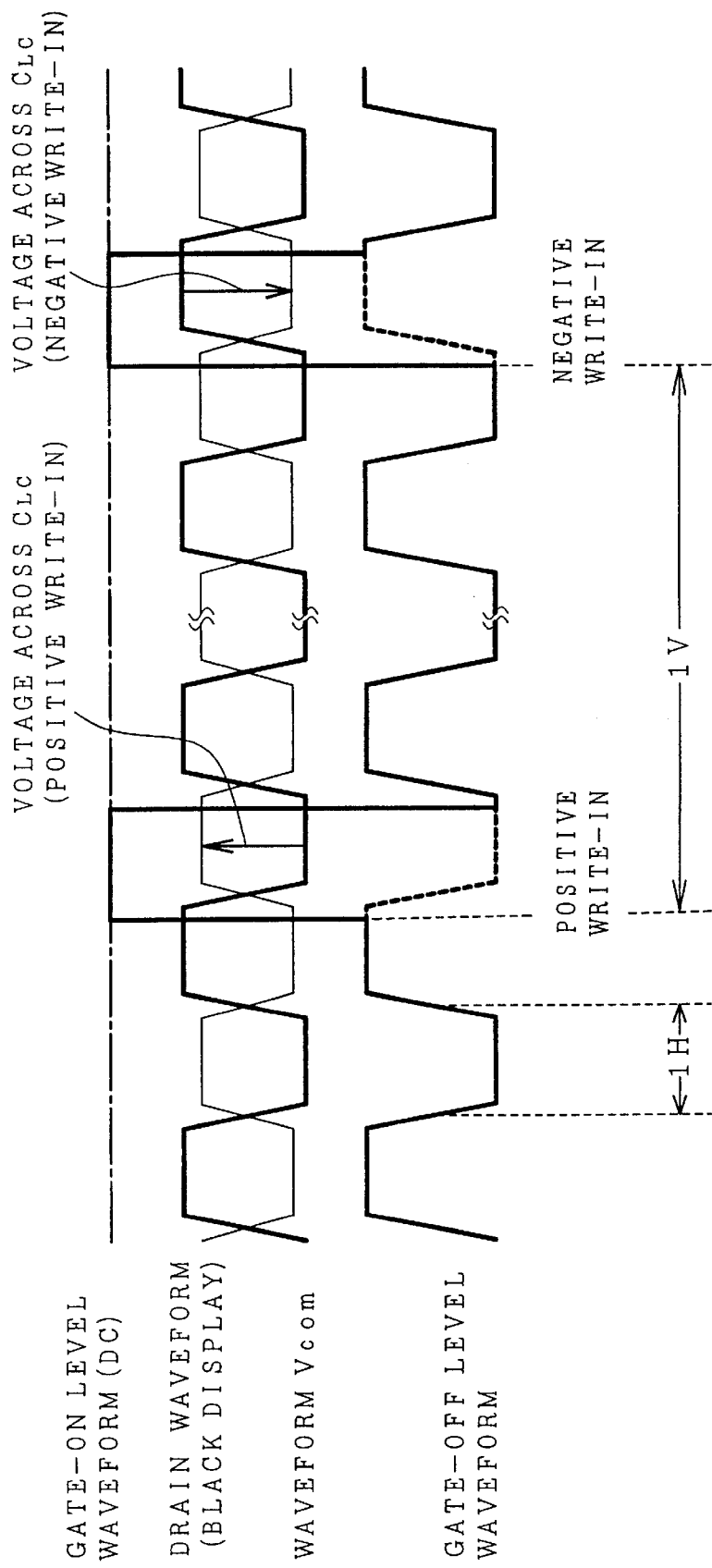
FIG. 45 is a diagram showing the level and waveform of each of a common-electrode voltage, a drain voltage, and a gate voltage.

FIG. 45 is a diagram showing the level and waveform of each of a common electrode voltage, drain voltage, and gate voltage. The drain waveform is that in the case of forming a black image.

Figure 46:
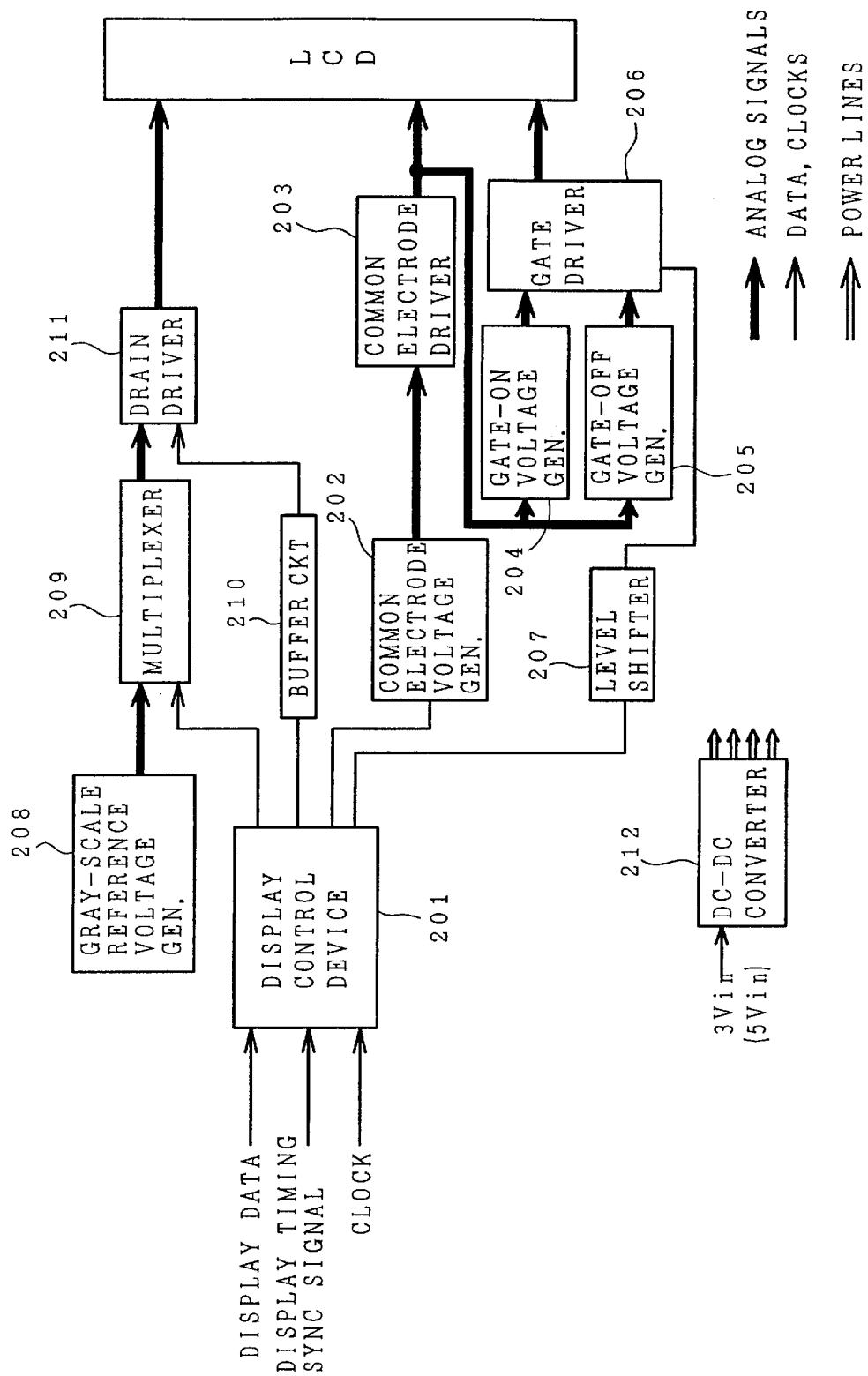
FIG. 46 is a block diagram showing the schematic configuration of each driver of the liquid crystal display element and the flow of signals.
Figure 47A:
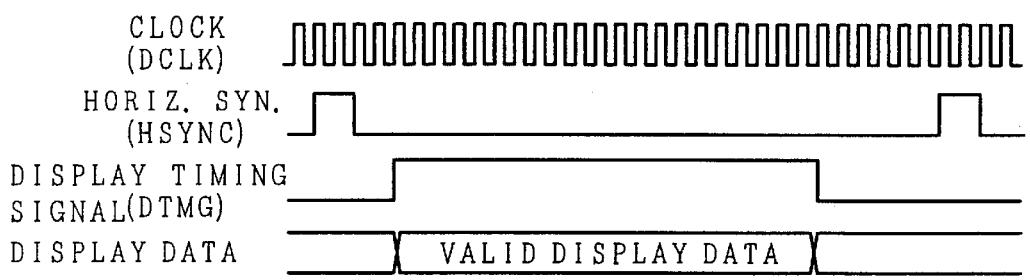
FIGS. 47A and 47C are timing charts showing display data inputted from a host computer into a display control device.
Figure 47B:
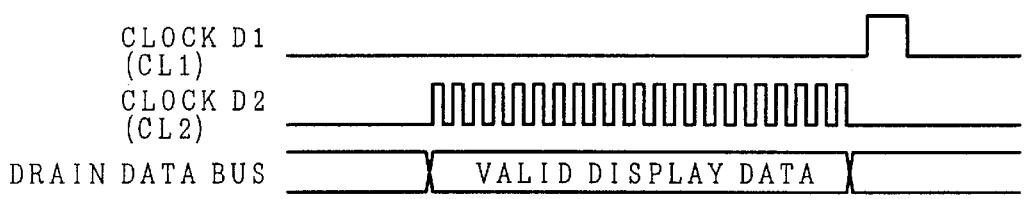
FIGS. 47B and 47D are timing charts showing signals outputted from the display control device into the drain drivers and gate drivers.
Figure 47C:
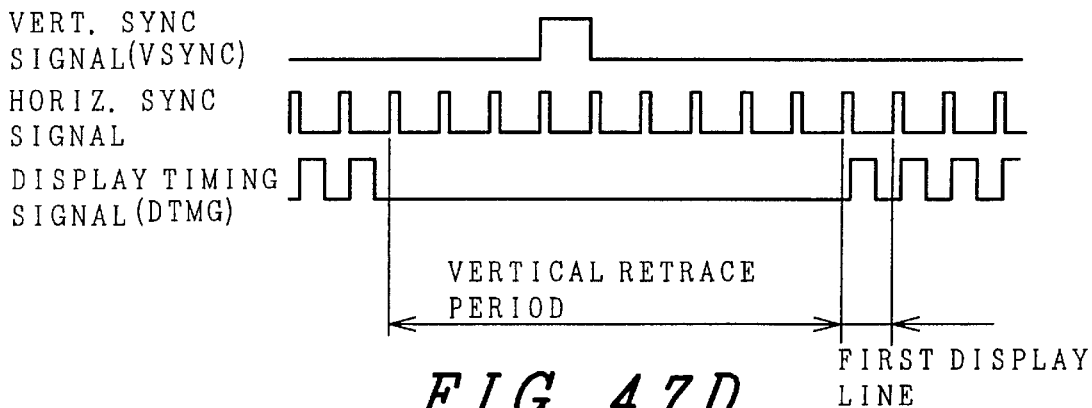
Figure 47D:
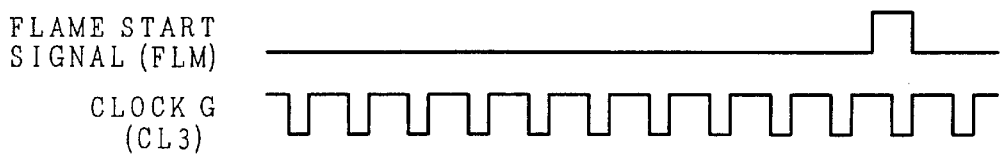

FIG. 46 is a block diagram showing the schematic configuration of each of the drivers (drain driver, gate driver, and common electrode driver) for the liquid crystal display element and the flow of signals thereamong. FIGS. 47A to 47D are timing charts showing display data inputted from a host computer into a display control device 201 and signals outputted from the display control device 201 into the drain drivers and gate drivers.

The display control device 201 and a buffer circuit 210 are provided in the controller section 101 shown in FIG. 42, and the drain drivers 211 are provided in the drain driver section 103 and the gate drivers 206 are provided in the gate driver section 104.

The drain driver 211 is composed of a data latch section for display data and an output voltage generating circuit. A gradation reference voltage generating section 208, a multiplexer 209, a common-electrode voltage generating section 202, a common-electrode driver 203, a level shift circuit 207, a gate-on voltage generating section 204, a gate-off voltage generating section 205, and a DC—DC converter 212 are provided in the power source 102 shown in FIG. 42.

The display control device 201 is adapted to receive control signals (clock signal, display timing signal, and synchronization signal) from the host computer, and to create a clock signal D1 (CL1), a shift clock signal D2 (CL2), and display data as control signals to the drain drivers 211 and simultaneously create a frame start command signal FLM, a clock signal G (CL3), and display data as control signals to the gate drivers 206.

The carry signal from the preceding stage of the drain driver 211 becomes the carry signal of the succeeding stage of the drain driver 211.

As is apparent from FIGS. 47A to 47D, the shift clock signal D2 (CL2) for the drain drivers has a frequency identical to that of each of the clock signal (DCLK) and display data inputted from the host computer, which frequency is as high as about 40 MHz for the display device under the XGA Specification. Accordingly, it becomes important to take a measure against electromagnetic interference (EMI).

Information Processing Apparatus on Which Liquid Crystal Display Module is Mounted FIGS. 48 and 49 are perspective views each showing a notebook type personal computer or word processor on which the liquid crystal display module MDL is mounted. As described above, FIG. 48 shows the case in which the inverter power source IV is disposed in the display section, that is, at the inverter housing section MI of the liquid crystal display module MDL (see FIGS. 20A to 23E), and FIG. 49 shows the case in which the inverter power source IV is disposed in the key board section.

Figure 31:
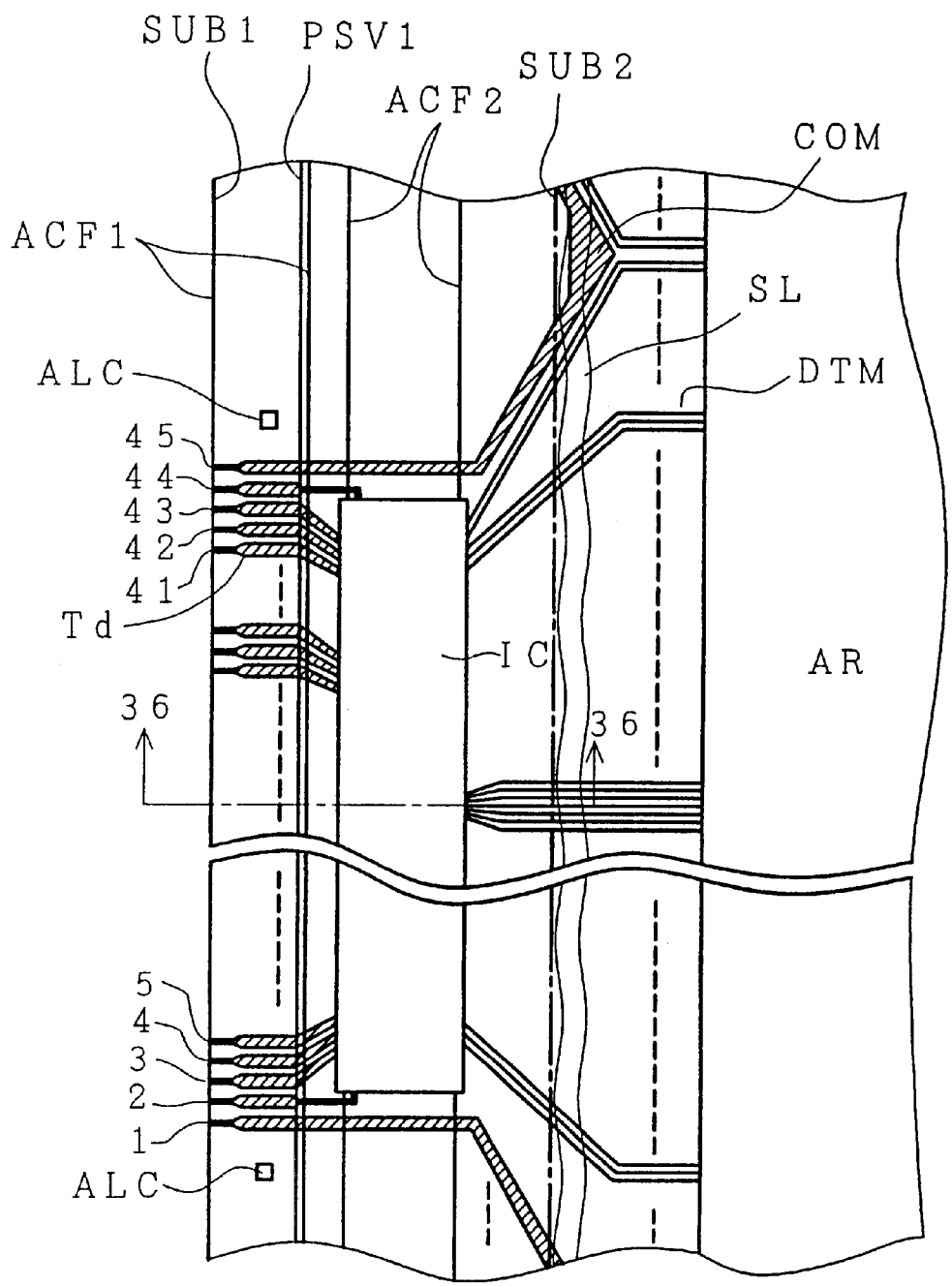
FIG. 31 is a view illustrating a state in which the driver ICs are mounted on the lower substrate of the liquid crystal display element.

Signal from the information processing apparatus are first supplied to the integrated circuit device TCON for display control via a connector positioned at an approximately central portion of the interface circuit board PCB on the left side, to be subjected to data conversion, and the display data flow in the peripheral circuit for drain drives. Since the module MDL adopts the chip-on-glass method and uses the multilayer flexible circuit board as described above, it is possible to solve the limitation of the information processing apparatus in terms of the lateral width and outer shape thereof, and hence to realize the miniaturization and low power consumption of the information processing apparatus. Planar and Sectional Configurations of the Vicinity of Portion on Which Driver IC Chips are Mounted FIG. 31 is an enlarged view of an essential portion showing a state in which the driver ICs are mounted on the lower substrate SUB1 of the liquid crystal display element PNL, and FIG. 32 is a sectional view taken on line 32—32 of FIG. 31. Referring to FIG. 31, the upper substrate SUB2 designated by the chain line is superimposed on the lower substrate SUB1 with a gap put therebetween, wherein a useful display area AR is enclosed by means of a sealing pattern SL and liquid crystal LC is injected in the enclosed area.

An electrode COM on the substrate SUB1 is a wiring electrically connected to a common electrode pattern on the substrate SUB2 side via conductive beads, paste or the like. Drain lines DTM or gate lines GTM are adapted to supply output signals from the driver ICs to interconnections in the useful display area AR. The input lines Td are adapted to supply input signals into the driver ICs. Anisotropic conductive films ACF include a strip-like ACF2 stuck commonly to a plurality of the drivers IC portions arranged in a row and a strip-like ACF1 stuck commonly to the input line pattern portions connected to the plurality of the driver ICs.

Passivation films (protective films) PSV1 and PSV2 are, as shown also in FIGS. 27A and 27B, formed in such a manner as to cover the signal line portions as much as possible for preventing electrolytic corrosion, and the exposed portions from the passavation films are covered with the anisotropic conductive film ACF1.

The peripheries around the side surfaces of the driver ICs are filled with epoxy resin or silicone resin SIL (see FIG. 36) for realizing multiple-protection.

Referring to FIG. 45, each of the gate-on level waveform (DC) and gate-off level waveform is changed between −9 V to −14 V, with the gate-on at 10 V. Each of the drain waveform (upon black display) and common-electrode voltage ($V_{com}$) waveform is changed in its level between about 0 V to 3 V. For example, to change the drain waveform (black display) for each horizontal scan period (1H), logical inversion is performed for one bit by the logical circuit to input the drain waveform to the drain drivers. The gate-off level waveworm is changed at an amplitude and phase which are substantially the same as those of the common-voltage ($V_{com}$) waveform.

FIG. 44 is a diagram illustrating the flow of display data and clock signals to the gate drivers 104 and drain drivers 103. As described above, the display control device 101 is adapted to receive control signals (clock signal, display timing signal, and synchronization signal) from the host computer, and to create a clock signal D1 (CL1), a shift clock signal D2 (CL2), and display data as control signals to the drain drivers 103 and simultaneously create a frame start command signal FLM, a clock signal G (CL3), and display data as control signals to the gate drivers 104.

The carry signal from the preceding stage of the drain driver 103 becomes the carry signal of the succeeding stage of the drain driver 103.

While the embodiments of the present invention have been described in detail, the present invention is not limited thereto, but many changes may be made without departing from the scope of the present invention. For example, in the above embodiments, the present invention is applied to the active matrix type liquid crystal display device; however, the present invention can be applied to liquid crystal display devices of other types such as a simple matrix type. Further, the present invention can be applied not only to the flip-chip method in which driver ICs are directly mounted on a substrate but to the conventional method using the TCP.

As described above, according to the present invention, the reduction in frame border area of a liquid crystal display device can be realized by adopting the electrically connecting structure between the flexible circuit board and upper case, the structure of holding the liquid crystal display element and light guide while ensuring a high resistance against shock, and the crimp-clamping structure of the upper and lower cases.

What is claimed is:

1. A liquid crystal display device comprising:
   a liquid crystal display element having a liquid crystal layer sandwiched between a pair of upper and lower substrates,
   a flexible circuit board disposed around a periphery of a lower of said lower substrate,
   an illuminating light source under said liquid crystal display element,
   an upper case made of metal, having an upper portion provided with a window corresponding to a useful display area of said liquid crystal display element and a sidewall bent from a periphery of the upper portion thereof,
   a lower case made of resin for housing said illuminating light source,
   said upper case and said lower case being clamped by crimping a plurality of nails formed in said sidewall of said upper case at an outer surface of said lower case and having said liquid crystal display element and said flexible circuit board being disposed therebetween,
   wherein an electrical connection between said upper case and a grounding pattern formed on said flexible circuit board is made by at least one component in chip form having a conductive region and being attached to a portion of said grounding pattern bent over said lower substrate, and a metal tape having one end thereof being interposed between opposing portions of said upper and lower cases and an other end thereof being positioned on an upper side of said lower case to be pressed against said conductive region of said at least one component in chip form.

2. A liquid crystal display device according to claim 1, wherein said lower case is provided with a recess for housing each of said at least one component in chip form at said upper side thereof, and a sheet of elastic material interposed between said metal tape and a bottom of said recess.

3. A liquid crystal display device according to claim 1, wherein said at least one component in chip form comprises a ceramic substrate and a metallized film formed on said ceramic substrate.

4. A liquid crystal display device according to claim 1, wherein said at least one component in chip form is a chip capacitor.

5. A liquid crystal display device according to claim 1, wherein said at least one component in chip form is a chip resistor.

6. A liquid crystal display device according to claim 1, wherein said at least one component in chip form is 2 mm at most in length, width and thickness.

7. A liquid crystal display device according to claim 1, wherein said at least one component in chip form is a sheet made of metal.

8. A liquid crystal display device comprising:
   a liquid crystal display element having a liquid crystal layer sandwiched between a pair of upper and lower substrates,
   an illuminating light source comprising a line light source, a light guide and a reflector and disposed under said liquid crystal display element,
   an upper case made of metal, having an upper portion provided with a window corresponding to a useful display area of said liquid crystal display element and a sidewall bent down from a periphery of the upper portion thereof,
   a lower case made of resin for housing said illuminating light source and having a peripheral frame portion for supporting said light guide,
   said upper case and said lower case being clamped by crimping a plurality of nails formed in said sidewall of said upper case at an outer surface of said lower case and having said liquid crystal display element and said flexible circuit board being disposed therebetween,
   wherein a rubber cushion is disposed between a lower side of said light guide and peripheral portions of said lower case at least in the vicinity of portions where said upper case and said lower case are clamped by crimping said plurality of nails.

9. A liquid crystal display device comprising:
   a liquid crystal display element having a liquid crystal layer sandwiched between a pair of upper and lower substrates,
   an illuminating light source under said liquid crystal display element,
   an upper case made of metal, having an upper portion provided with a window corresponding to a useful display area of said liquid crystal display element and a sidewall bent down from a periphery of the upper portion thereof,
   a lower case made of resin for housing said illuminating light source,
   said upper case and said lower case being clamped by crimping a plurality of nails formed in said sidewall of said upper case at an outer surface of said lower case and having said liquid crystal display element and said flexible circuit board disposed therebetween,
   wherein each of said plurality of nails is crimped in a plane parallel with an underside of said lower case and has at least one bend before being crimped in cross section parallel to said plane.

* * * * *